United States Patent [19]

Storch et al.

[11] Patent Number: 5,920,846
[45] Date of Patent: Jul. 6, 1999

[54] METHOD AND SYSTEM FOR PROCESSING A SERVICE REQUEST RELATING TO INSTALLATION, MAINTENANCE OR REPAIR OF TELECOMMUNICATIONS SERVICES PROVIDED TO A CUSTOMER PREMISES

[75] Inventors: Joan A. Storch; Danny L. Storch, both of St. Louis County, Mo.

[73] Assignee: Southwestern Bell Telephone Co., St. Louis, Mo.

[21] Appl. No.: 08/608,838

[22] Filed: Feb. 27, 1996

[51] Int. Cl.$^6$ .............................. G06F 17/60; H04M 3/00
[52] U.S. Cl. .................. 705/7; 705/8; 705/9; 705/11; 379/10; 379/15; 379/1; 379/27; 379/29; 364/468.05
[58] Field of Search ................... 705/7, 8, 9, 11; 364/468.05–468.08; 379/1, 2, 4–6, 9, 10, 14, 15, 18, 26, 27, 29, 32, 33, 34, 258, 280, 399; 370/241, 242, 246, 248, 249, 251; 371/20.1, 20.4, 20.5

[56] References Cited

U.S. PATENT DOCUMENTS

| | | |
|---|---|---|
| 3,914,560 | 10/1975 | Greene . |
| 3,963,876 | 6/1976 | Holtz et al. . |
| 4,017,695 | 4/1977 | Jaconetty et al. . |
| 4,132,863 | 1/1979 | Smith . |
| 4,277,655 | 7/1981 | Surprenant . |
| 4,467,148 | 8/1984 | Stafford et al. . |
| 4,670,902 | 6/1987 | Naiwirt . |

(List continued on next page.)

FOREIGN PATENT DOCUMENTS 630454  4/1994  Japan .

OTHER PUBLICATIONS

*Software Systems for Telecommunications*, Science and Technology Series, Bell Communications Research, Oct., 1992, pp. 34, 35, 53, 54, 58, 82, 83, 87, 93, 99, 100, 111–114, 139, 145, 146, 152, 153, 164–167, 169.

(List continued on next page.)

*Primary Examiner*—Tariq R. Hafiz
*Assistant Examiner*—Tuan Q. Dam
*Attorney, Agent, or Firm*—Polster, Lieder, Woodruff & Lucchesi, L.C.

[57] ABSTRACT

An integrated system and method is provided for processing a service request for installation, maintenance or repair of a local loop maintained by a telecommunications company and providing locally switched service to a customer premise. The system includes a computer network that allows for inputting and processing customer information; generating a service request based upon customer information and information associated with the local loop; assigning to the service request an available appointment time for providing the requested service based upon updated information indicating the availability of qualified outside technicians; dispatching an available technician to the customer premise at or before the assigned appointment time to install or repair outside facilities associated with the local loop or to install or replace a special line conditioning termination equipment at a network interface for the customer premise when loop loss associated with the local loop is not maintained at an acceptable level for the locally switched service, processing completion information input by the technician associated with tasks performed to establish working service, including information indicating whether the special line conditioning termination equipment was installed or replaced; completing the service request once working service is established; storing computer information relating to locally switched services including information indicating whether line conditioning termination equipment is installed at the customer premise; and creating or updating the computer information stored in the computer memory means based upon information associated with the completed service request.

33 Claims, 14 Drawing Sheets

U.S. PATENT DOCUMENTS

| | | |
|---|---|---|
| 4,766,606 | 8/1988 | Bardutz et al. . |
| 4,922,514 | 5/1990 | Bergeron et al. ............................ 379/6 |
| 4,961,218 | 10/1990 | Kiko . |
| 5,052,039 | 9/1991 | Moisin . |
| 5,086,462 | 2/1992 | Oka . |
| 5,218,635 | 6/1993 | Bonvallet et al. . |
| 5,255,317 | 10/1993 | Arai et al. . |
| 5,416,833 | 5/1995 | Harper et al. ............................ 379/201 |
| 5,491,742 | 2/1996 | Harper et al. ............................ 379/201 |
| 5,528,660 | 6/1996 | Heins et al. ............................... 379/21 |
| 5,588,051 | 12/1996 | Berkowitz et al. ...................... 379/243 |
| 5,615,121 | 3/1997 | Babayev et al. ............................ 705/9 |
| 5,640,505 | 6/1997 | Hearn et al. ........................ 395/182.02 |
| 5,644,619 | 7/1997 | Farris et al. ............................... 379/27 |
| 5,687,212 | 11/1997 | Kinser, Jr. et al. ........................ 379/10 |
| 5,751,802 | 5/1998 | Carr et al. ................................ 379/201 |

OTHER PUBLICATIONS

*Colleague & Colleague Plus User's Guide*, Random Corporation, Aug. 1988.

*Boss User Guide*, Southwestern Bell Telephone Company, Aug. 1, 1992.

*CRIS Customer Record Information System: CRIS Accounts*, Southwestern Bell Telephone Company, Mar., 1990.

*Southwestern Bell Telephone Logistics Integrated Control System (LOGIC): PICS Terminal User Guide*, Version 3.0, GSI Transcomm, WMS Group, Feb. 3, 1993.

*Consumer EASE: Functional Requirements Specification*, 2 vols., Document No. Release 02.02.00, Southwestern Bell Telephone Company, Jul. 13, 1993.

*Business EASE: Functional Requirement Specification*, Southwestern Bell Telephone Company, Nov. 9, 1995.

*CABS Customer Access Billing System: CABS System Documentation*, Southwestern Bell Telephone Company Information Services, Dec. 1993.

*Universal Service Order Manual: DOES Methods and Procedures*, Corporate Telecommunications Service Center (CTSC), Southwestern Bell Telephone Company Information Services, Oct., 1987.

*Universal Service Order Manual: SORD General Service Order Overview*, Corporate Telecommunications Service Center (CTSC), Southwestern Bell Telephone Company Information Services, May, 1988.—Portions of this disclosure relating to passwords and sign on procedures have been redacted from Section A, pp. 9–11.

*Numerical Index—Division 190 Operations Centers and Support Systems Operation, Maintenance, and Administration*.

BR 190–000–00, Issue 32, Bell Communications Research, Apr. 1996.

WFA/C: Document Nos. 190–513–090 through 190–513–419, 190–513–425 through 190–513–437, Approximate Page/Fiche Count: 5,338.

WFA/DO: Document Nos. 190–513–421–US, 190–539–001 through 190–539–425, Approximate Page/Fiche Count: 9,029.

NSDB: Document Nos. 190–518–001 through 190–518–008, 190–518–012 through 190–518,013, 190–518–302 through 190–518–303, 190–534–001 through 190–534–421, Approximate Page/Fiche Count: 15,679.

WFA/DI: Document Nos. 190–520–070 through 190–520–420, Approximate Page/Fiche Count: 2,034.

CDOC: Document Nos. 190–520–400 through 190–520–404, Approximate Page/Fiche Count: 264.

MARCH: Document Nos. 190–537–001 through 190–537–914, Approximate Page/Fiche Count: over 2,484.

TIRKS: Document Nos. 190–513–100 through 190–513–307, 190–513–402, 190–513,404, 190–520–070, 190–520–301 through 190–520–308, 190–520–402, 190–520–404, 190–534–301 through 190–534–305, 190–534–401, 190–538–100, 190–539–404, 190–539–405, 190–551–262 through 190–551–264, 190–551–700, 190–573–260 through 190–577–260, Approximate Page/Fiche Count: 3,065.

*Numerical Index—Division 752 Integrated Provisioning Mechanized Systems*.

BR 752–000–00, Issue 19, Bell Communications Research, Jan. 1996.

FOMS: Document Nos. 752–101–901, 752–103–901, 752–104–001, 752–105–001, 752–105–010, 752–105–910, 752–106–010, 752–010–020, 752–106–910 through 752–107–020, 752–107–910, 752–108–130, 752–108–930 through 752–108–945, 752–110–910, 752–111–900, Approximate Page/Fiche Count: 5,734.

SWITCH: Document Nos. 752–101–001 through 752–111–900.

PAWS: Document Nos. 752–208–001 through 752–220–001, Approximate Page/Fiche Count: 350.

Shannon, Kim, *SORD Service Order Distribution (QFD)*, Southwestern Bell Telephone Company, Dec. 28, 1993.

Merz, Sue, *SORD Request Processor (REQ)*, Southwestern Bell Telephone Company, Jul. 7, 1994.

*Universal Service Order Practice: General*, Southwestern Bell Telephone Company, Nov., 1990, pp. 1–4, A1–A4.—description of field identifiers (FIDs).

*Universal Service Order Code Manual: USOC Manual—1995*, Southwestern Bell Telephone Company, 1995, pp. 1–2.

*Uniform Service Order Code: General*, Southwestern Bell Telephone Company, Aug., 1995, pp. 1–4.

Borowiec, Catherine M., Robert J. Martin, Daniel M. Wildman, *Provisioning Analyst Workstation (PAWS) Release 4.0 Requirements*, BD–PAWS–RQT4.0–1, Issue 1, Bell Communications Research, Nov., 1994, Section 1, pp. 7–10, Section 2, pp. 1–2.

*FMS–N System Description*, Southwestern Bell Telephone Company, May, 1989, pp. 1–13.

*FIRST User Documentation*, Southwestern Bell Telephone Company, Dec., 1995, Index, pp. 1–3, Section 1, p. 1, Section 2, pp. 1–2.

*Technician Access Network (TAN) System Configuration Format (TAN CONFIG) ISO Administrative Screen Guide*, Practices, BR 756–130–710, Issue 1, Bell Communications Research, Inc., Oct. 1987, Contents, List of Figures, List of Tables.

*Technician Access Network (TAN) System Administration Format (TAN ADMIN) ISO Administrative Screen Guide*, Practices, BR 756–130–711, Issue 1, Bell Communications Research, Inc., Oct. 1987.

*Technician Access Network (TAN) Statistics Print Format (TAN STAT PRINT) ISO Administrative Screen Guide*, Practices, BR 756–130–713, Issue 3, Bell Communications Research, Inc., Oct. 1987.

*Technician Access Network (TAN) Statistics Scan Format (TAN STAT SCAN) Administrative Screen Guide*, Practices, BR 756–130–714, Issue 3, Bell Communications Research, Inc., Oct. 1987.

*Technician Access Network (TAN) Phrase Dictionary Format (TAN PDICT) User Administative Screen Guide*, Practices, BR 756–130–715, Issue 1, Bell Communications Research, Inc., Oct. 1987.

*Technician Access Network (TAN) Security Database Format (TAN SDB) User Administrative Screen Guide*, Practices, BR 756–130–716, Issue 1, Bell Communications Research, Inc., Oct. 1987.

*Technician Access Network (TAN) User Dictionary Format (TAN UDICT) Administrative Screen Guide*, Practices, BR 756–130–717, Issue 1, Bell Communications Research, Inc., Oct., 1987.

*Technician Access Network (TAN) EST/FST Data Base Format (TAN DB) Administrative Screen Guide*, Practices, BR 756–130–718, Issue 1, Bell Communications Research, Inc., Oct. 1987.

*TAN Craft User Guide*, Practices, BR 756–130–901, Issue 2, Bell Communications Research, Inc., Oct. 1987.

*Technician Access Network System/88 Software*, SWBT–03, Southwestern Bell Telephone Company, Aug. 5, 1987.

*Technician Access Network System/88 Publications*, SWBT–06, Southwestern Bell Telephone Company, Aug. 5, 1987.

*Remote Force Access System (RFAS) Documentation*, Southwestern Bell Telephone Company, approximately 1987.

*ULTRA Universal Technician Remote Access*, Southwestern Bell Telephone Training Course, D–927, Issue 1, Instructor's Guide, SBC Center for Learning, Jan. 1996.

*DataStar*, Southwestern Bell Telephone Training Course, D–927, Issue 1, Instructor's Guide, SBC Center for Learning, Jan. 1996.

*The Melard*, Southwestern Bell Telephone Training Course, D–927, Issue 1, Instructor's Guide, SBC Center for Learning, Jan. 1996.

*Itronix: Southwestern Bell User Guide*, 72–0010–004, Dec., 1994.

*SARTS 2PC3 General Description*, AT&T 666–610–100, Issue 15, Jul. 1993. includes Craft Access System Description: Section 2, pp. 11–15, 94, 117.

*Dictionary of Acronyms*, Information Systems, Southwestern Bell Telephone Company, Dec. 13, 1989, pp. 61, 142, 158. Definitions of CRIS/CABS, LMOS, LOGIC and MLT.

*AT&T Master Index 9–Digit Numbered Documents: Alphabetical and Numerical Listings*, AT&T 000–000–002, Issue 14, Jun. 1994.

MLT: Document Nos. 660–168–200 through 660–168–282.

LMOS: Document Nos. 660–168–010 through 660–168–188.

SARTS: Document Nos. 666–610–100 through 666–615–305.

*TaskMate User's Guide and Reference Manual*, v. 6.0 and v.7.0, Wotech Software Systems, Feb., 1996.

*REACT 2001 Operations Support System RTS–Server Data File Configuration Guide*, HKMN 660–500–003, Hekimian Laboratories, Inc., Jan. 1996.

*Highlights of REACT 2001 Software Release 1.110*, Product Information Release PIR 1118, Services Management Systems for Telecommunications, Hekimian Laboratories, Inc., Dec. 1995.

*REACT 2001 Release 1.110: Product Requirements*, Hekimian Laboratories, Inc., Nov. 30, 1995.

*RTS–SERVER*, SERV1.DOC, Hekimian Laboratories, Inc., Mar. 29, 1995, pp. 1–7.

*Enhanced Customer Report System (ECRS( D–924*, Southwestern Bell Center (SBC) for Learning, approximately Jul., 1993.

*Numerical Index—Division 781 Technical Planning*.

BR 781–000–000, Issue 29, Bell Communications Research, Jan. 1996.

FEPS: Document Nos. 781–551–930 through 781–620–798 Approximate Page/Fiche Count: 6,227.

*13 Step System Flow* and *Additional information*, training memorandum prepared by Southwestern Bell Center Of Learning, approximately 1992.

Storch, Joan, *Service Activation Systems and Work Process Flow for Non–Designed Services*, presentation handouts, Southwestern Bell Telephone Company, approximately Jan., 1995.

Storch, Joan, *Service Activation Work Processing and Completion Flows for Designed Services*, presentation handouts, Southwestern Bell Telephone Company, approximately Jan., 1995.

Storch, Joan, *Service Activation System Flows for Designed Services*, presentation handouts, Southwestern Bell Telephone Company, approximately Jan., 1995.

*MB21–K1 Enhanced Line Powered Amplifier with Manual Balance Operation and Practice*, 812–085–001, CLEI: VRA0ZH2XAA, Wilcom, Feb., 1995.

*Enhanced Line Powered Amplifier with Manual Balance (ELPA–421V) Operation and Installation Practice*, 811–911–01, CLEI: VRA02H0XAA, Wilcom, Aug., 1994.

*Service Activation Flows Designed Services: Data Distribution Flow for Service Orders; Work Pricessing and Completion Flow for Serive Orders; Attachment I; Attachment II;* and *Attachment III*. Handouts provided at Bellcore Presentation to Regional Bell Operating Companies, Nov. 22, 1991.

Rey, R.F., *Engineering and Operations in the Bell System*, AT&T Bell Laboratories, Murray Hill, NJ, 1984, pp. 605–621.

*Corporate Telecommunications—Operations: Complex Minimal Input General (CMIG) Rewrite to Service Order Creation System (SOCS) Methods and Procedures*, Information Systems, Corporate Telecommunications Service Center (CTSC), Southwestern Bell Telephone Company, Jul./Aug. 1989.

*Service Activation PMO Flow Designed Special Services Change Order*, Service Activation Target Team, Southwestern Bell Telephone Company, Oct. 29, 1993–Nov. 1,1993.

*Service Activation PMO Flow Designed Special Services New Connect*, Service Activation Target Team, Southwestern Bell Telephone Company, Oct. 1, 1993.

*Service Activation PMO Flow POTS New Connect* (figure only), Service Activation Target Team, Southwestern Bell Telephone Company, Jul. 26, 1993.

*Service Activation Flow PMO* (figure only), Service Activation Target Team, Southwestern Bell Telephone Company, approximately 1993.

*Numerical Index—Division 753 Information Systems—Loop Provisioning Mechanization*.

BR–753–000–000, Issue 13, Bell Communications Research, Jan. 1996.

PREMIS: Document Nos. 753–200–000 through 753–290–100, Approximate Page/Fiche Count: 23,334.

LFACS: Document Nos. 753–303–200 through 753–303–203, 753–303–276, 753–303–299, 753–303–415, 753–304–364, 753–304–497, 753–304–498, 753–306–288, 753–307–367, 753–307–473, 753–307–474, 753–309–242, 753–309–363, 753–309–451, 753–309–496, 753–309–499, Approximate Page/Fiche Count: 6,888.

SOAC: Document Nos. 753–303–277, 753–303–287, 753–303–302, 753–303–308, 753–303–381, 753–303–384, 753–303–440 through 753–303–445, 753–303–448, 753–303–461, Approximate Page/Fiche Count: 2,556.

LOMS: Document Nos. 753–303–305, 753–307–383, Approximate Page/Fiche Count: 694.

COSMOS: Document Nos. 753–301–610, 753–303–592 through 753–303–744, 753–304–743 through 753–307–393, Approximate Page/Fiche Count: 34,928.

WMC: Document Nos. 753–340–587, 753–304–589, 753–308–593, Approximate Page/Fiche Count: 222.

FACS: Document Nos. 753–303–201–SUP02, 753–303–204 through 753–303–270, 753–303–417 through 753–303–436, 753–303–457, 753–303–822 through 753–304–449, 753–307–356 through 753–308–454, 753–310–241, Approximate Page/Fiche Count: over 41,868.

*Numerical Index—Division 756 Business Information Systems—Trunk and Special Services.*

BR 756–000–000, Issue 26, Bell Communications Research, Jan. 1996.

FEPS: Document Nos. 756–557–001 through 756–557–801, Approximate Page/Fiche Count: 1,804.

TIRKS: Document Nos. 756–551–001 through 756–551–415, 756–551–422 through 756–551–940, 756–553–013, 756–553–305 through 756–553–307, Approximate Page/Fiche Count: 9,495.

PICS: Document Nos. 756–120–362 through 756–140–147, Approximate Page/Fiche Count: over 2,000.

CDOC: Document Nos. 756–554–368, Approximate Page/Fiche Count: 308.

GOC: Document Nos. 756–568–002 through 756–568–796, 756–568–796, Approximate Page/Fiche Count: 2,058.

EXACT: Document Nos. 756–575–260, 756–575–301, 756–580–260, Approximate Page/Fiche Count: 405.

EDIIS: Document Nos. 756–586–001 through 756–586–022, Approximate Page/Fiche Count: 434.

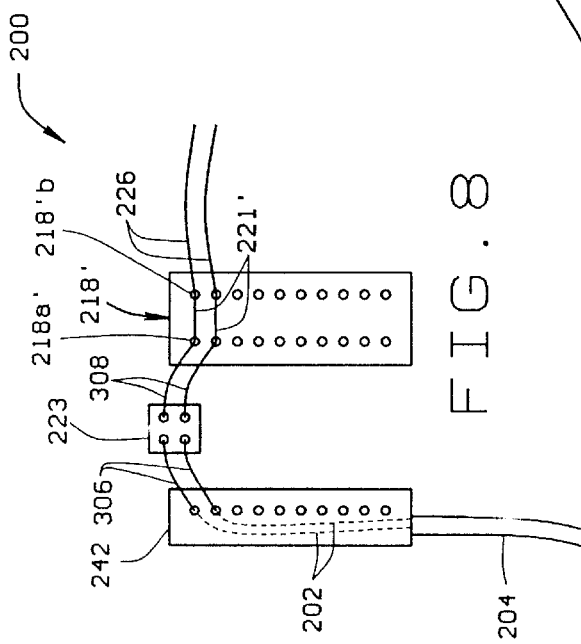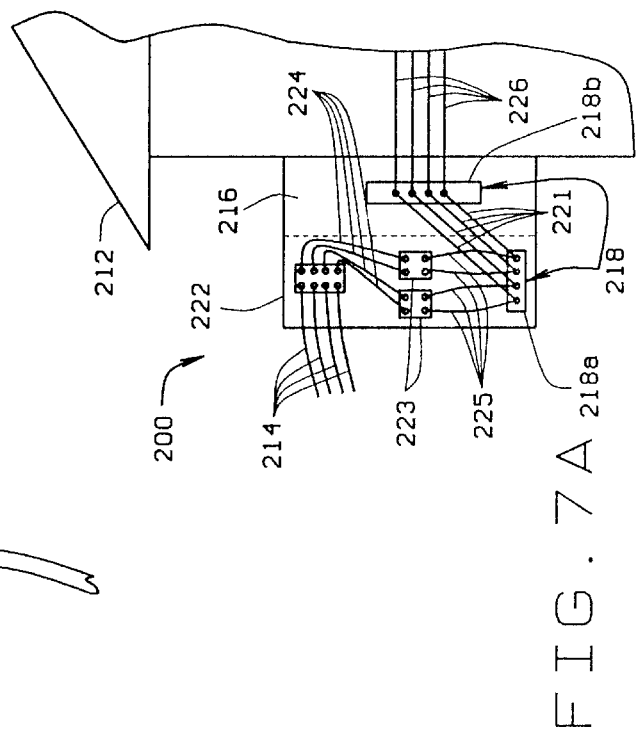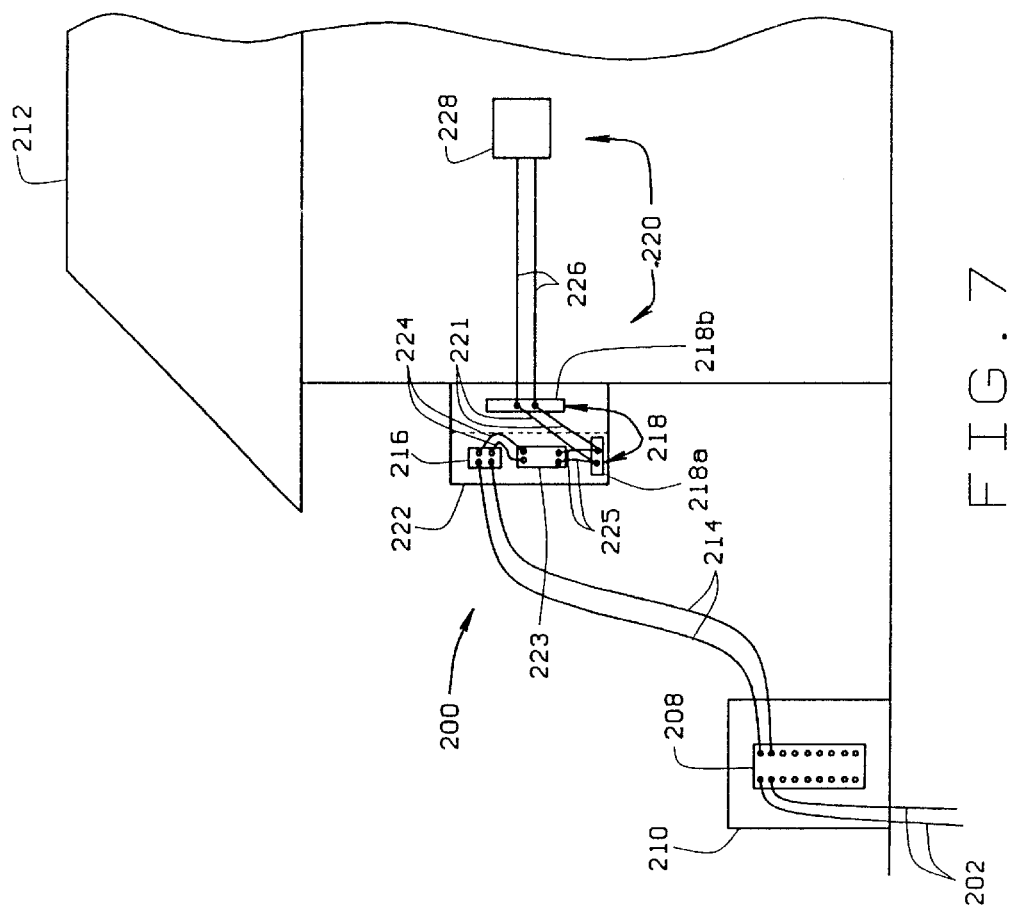

METHOD AND SYSTEM FOR PROCESSING A SERVICE REQUEST RELATING TO INSTALLATION, MAINTENANCE OR REPAIR OF TELECOMMUNICATIONS SERVICES PROVIDED TO A CUSTOMER PREMISES

BACKGROUND OF THE INVENTION

This invention relates to the field of computer programming and data processing systems for processing a service request relating to any locally switched telecommunication service using improved nondesign systems and processes. The service request can relate to installation, maintenance or repair of any analog or digital locally switched service such as Plain Old Telephone Service (POTS), coin and special services. The invention also finds application when processing service requests relating to field cable throws. Scheduling of appointments based on availability of outside technicians is more efficient and accurate using the system and method of the invention. The invention utilizes line conditioning equipment that is installed at a customer premise which provides a stabilized loop loss within a desired range, line balancing and slope equalization at the customer premise based upon the requested service.

The widespread advantages of the invention are better appreciated by examining the drawbacks of prior art telecommunications systems and methods for processing service request relating to prior art designed services provided across transmission equipment extending between a telecommunications company central office (local serving office) and a customer premise (i.e., a local loop). The local loop consists of outside plant facilities including feeder plant facilities or cables, distribution plant facilities or cables, conduit, poles, cable protection devices, terminals and drop wire that allow for signal transmission between the central office and the customer premise. The feeder plant facilities typically extend from central office and terminate at a remote switching module, or hub such as a pair gain system. The distribution plant then extends from the feeder plant termination either to a terminal located inside the customer premise or to an outside terminal disposed in close proximity to the customer premise. Drop wires connect the outside terminal to the customer premise. The transmission equipment associated with the feeder and distribution plant can be, for example, two or four wire copper facilities, coaxial cable, or optical fibers. The feeder plant also may include multiplexing equipment that allows for a number of signals to be multiplexed (e.g., using frequency division multiplexing for analog signals or time division multiplexing for digital signals) into a single transmission medium such as copper, coaxial cable, or optical fiber. The local loop is also referred to as a transmission circuit, channel, line, link or trunk.

In general, public telecommunication networks employ carrier-provided switching systems located in various switching offices to connect, or switch, signal transmissions carried on a first local loop to signal transmissions carried on another local loop. A local serving office connects directly to each local loop. A tandem office connects several local offices. Toll offices are used to switch long-distance or toll circuits between distant cities or geographic areas, and connect various tandem offices and/or local central offices.

Traditionally, the local loop is often the weakest link in the public telecommunication network since it is most susceptible to transmission impairments. As a signal travels outbound from the central office and progresses along the cable pair toward a customer, its power is reduced or attenuated by losses in the cable pair. Loop loss generally is due to dissipation, or reflection due to an impedance mismatch, or both. Other factors that inhibit the successful signal transmission across a cable pair include attenuation as a function of frequency or signal level; crosstalk; echo; transients based on impulse noise, gain hits, phase hits, and dropouts; thermal noise; intermodulation distortion; delay distortion; phase and amplitude jitter; and frequency errors. As the length of the cable pair needed to connect the central office and network interface at the customer premise increases, the likelihood for any particular local loop to have excessive unacceptable losses or transmission impairments also increases.

Therefore, design and testing of local loops has been very important in the telecommunications industry to ensure the loop loss associated with the circuit extending from the central office to the customer premise is maintained within an acceptable range at the network interface for the telecommunications service provided. For example, when certain analog services such as network data lines, local two-way PBX trunks, and PLEXAR® (registered trademark of Southwestern Bell Telephone Company) or CENTREX® central office lines (prior art designed services) are provided across the cable pair, the acceptable range of loop loss is 4 to 4½ dB at the network interface. For POTS, the acceptable range of loop loss at the network interface is 8 to 8½ dB. Additionally, for high speed data transmission, it is very important that the cable appear uniform and balanced to the signal traveling down it. Any discontinuities, impedance mismatch or irregularities will cause reflection losses and echoes which prevent proper signal transmission. To provide balanced lines and minimal reflective losses for special service data transmission, published tariff standards require that the loop loss not exceed 4½ dB.

In the prior art, if an excessive unacceptable loop loss is measured by a technician at the network interface for POTS, a standard or pre-designed amplifier is typically installed at the central office to boost the signal as it emanates from the central office. To provide a lower loop loss for special services and data transmission, a complex prior art design system and method discussed more fully in the prior art section of the DESCRIPTION OF THE PREFERRED EMBODIMENT section hereof is employed. The associated design review process typically requires a design engineer to carefully examine the loop resistance and capacitance of the pair to establish the loop characteristics, and design a customized amplifier or office repeater for installation at the central office to boost the signal to a sufficient level to overcome the excessive unacceptable loop loss and provide impedance matching, equalization, and signal regeneration (of received signals only). If the amplifier or repeater installed at the central office does not provide sufficient amplification of the signal to overcome the unacceptable loop loss, line repeaters or load points are installed at various locations along the local loop in an attempt to further amplify the signal to overcome the transmission impairments, provide timing and equalization, and restore the signal, if necessary.

Drawbacks to using amplifiers and office repeater bays at the central office to boost the analog signal include the fact that the amplifiers and repeaters occupy considerable space at the central office, and often require elaborate cooling mechanisms to keep the circuitry within safe operating temperatures. If the circuitry associated with the amplifier becomes "hot" or overdriven such that an insufficient loop gain/loss is present, a squealing, hissing or singing sound may be heard by the customer over the telephone line. The quality of transmission also can be impaired by noise associated with extraneous unwanted signals appearing in the transmission path between the central office and the network interface. Because many wires runs in a bundle within a single paired cable, the signal is susceptible to leaking electric signal from adjacent wires resulting in crosstalk. Crosstalk occurs when unwanted inductive, capacitive or conductive coupling occurs between any two communication paths. Increasing the amplification at the central office and mixing voice and data signals in the same cable bundle increases the probability of, and the amount of, crosstalk.

Furthermore, as will be discussed below in the following DESCRIPTION OF THE PREFERRED EMBODIMENT, it typically takes at least three to five business days to process a service order using the prior art design processes and install a customized amplifier at the central office. Moreover, installation, repair and maintenance of prior art designed services requires a disproportionately large percentage of the telecommunication company's available work force when compared to prior art nondesigned services. For example, a telecommunication company often processes over twenty million service requests relating to prior art nondesigned services a year, while processing less than one million service requests relating to prior art designed services during the same time frame. Of those service requests relating to prior art designed services, roughly 60% are for locally switched services, with the remaining 40% relating to private lines that are not locally switched. While the number of service requests relating to locally switched designed services is relatively small when compared to the total number of service requests typically processed, a disproportionately large number of personnel and computer systems are involved in a complex and cumbersome prior art design process to satisfy these service requests. Therefore, it is desirable to have a system and a method for processing a service request whereby the service request can be completely satisfied within a reduced time after receiving the customer request, preferably within several hours. It is further desirable that such a system and method provide a more efficient and accurate process for scheduling dates and appointment times for installation of a new service based upon availability of qualified technicians.

Installation of amplifiers and repeaters at the central office and the line repeaters and load points along the cable pair results in increased capital investment costs as well as maintenance costs. Since amplifiers, repeaters and loading coils also amplify noise, the line repeaters or loading coils conventionally are placed close enough together so that the signal itself is available for amplification, and does not become so weak as to be lost in the noise between amplifiers. Repeaters and loading coils are typically housed in apparatus cases located in either manholes or on poles. To insert a loading coil along a cable pair, it is necessary for telecommunications company employees to dig up the cable, or access the cable through a manhole or on a telephone pole. The employees then physically insert the repeater or loading coil in the cable. If 25 cable pairs are contained in the paired cable, typically all 25 pairs are loaded by the single loading coil inserted on the cable, even if only ten cable pairs actually are used for analog signal transmission. On the other hand, repeaters often are inserted only on a portion of the cable pairs in the cable. As a result, when a cable is dug up to install a repeater on one cable pair, it may be necessary to dig up the same cable pair just one or two months later to put a repeater on another cable pair in the same cable. Occasionally, a loading coil is installed in the wrong loop. Furthermore, digging up the cable requires considerable time and expense and often interferes with traffic flow, since most cable pairs are accessed through manholes located in the streets and sidewalks throughout a city.

Another significant drawback associated with using loading coils along a cable is that the loading coil must be removed should a loaded cable pair later be used for digital signal transmission. Digital signals are effectively destroyed when they pass through loading coils, since the induction added by the loading coils severely distorts the digital signal. Whenever a customer wants to convert a subscriber loop to provide digital signal transmission instead of analog signal transmission, the cable pair must be dug up and unloaded (i.e., all bridge taps, load coils, boosters, build out capacitors, and cable stubs are removed) to allow for digital signal transmission. If a new customer moves in, or the existing customer's needs change, such that digital transmission is no longer desired on this cable pair, the cable pair may need to be dug up to reinsert the loading coils or boosters to allow for analog signal transmission at an acceptable loop loss. Similarly, digital regenerators or line repeaters must be removed from a line when a line used for digital signal transmission is converted to allow for analog signal transmission. This creates a circular problem, where one cable pair may be repeatedly dug up to remove or insert loading coils, since digital signal transmission requires the cable pair to be unloaded while analog signal transmission requires the cable pair to be loaded.

Furthermore, the prior art methods and systems for transmitting analog signals across a cable pair are not suitable for networks that are digital from end to end. Totally digital systems require nonloaded outside plant distribution facilities to transmit the digital signals. Therefore, to accommodate digital networks, it is desirous to develop a telecommunications system and method that allows for installation of analog service on unloaded cable pairs so that the cable pair can be easily converted to allow for digital signal transmission at a later time, if necessary. It is also desirable to have a system and method that allows for a subscriber loop to be readily used for either analog or digital signal transmission, without requiring reconfiguration of the cable pair.

In certain exceptional situations in the prior art associated with special service arrangement requests for business customers, a customer powered amplifier with manual balance sold by Wilcom, a subsidiary of NAI Technologies, Inc., has been installed inside the customer premise to maintain the loop loss of the local loop within a acceptable range based upon the class and grade of service provided. When such a unit was used in the prior art prior to divestiture of AT&T, it typically was installed on the customer side of the network interface for remote customer stations connected to a PBX. The prior art Wilcom device is a 400 mechanics circuitry card which requires installation of special slotted shelves such as standard 400 type mounting shelves inside the customer premise for mounting the circuitry card therein. Drawbacks associated with the prior art Wilcom device include that local customer provided alternating current (AC) power is required for operation of the Wilcom device, and it must be mounted inside the customer premise since it does not have a weatherproof construction. TelLabs has developed a similar circuitry card that can be installed in this type of situation for business customers to provide amplification, equalization and impedance matching; however, the TelLabs unit has the same drawbacks of requiring customer provided AC power, and expensive and time consuming special mounting equipment for installation inside the customer premise. In addition, the Wilcom and TelLabs units require a technician to travel to the customer premise each time the characteristics of the local loop change to reset the units. The units must be manually reset to adjust to compensate for changes in the loop loss when the characteristics of the loop change (e.g., when a cable throw is performed). Furthermore, these types of units are not suited for installation at a residential customer premise.

Therefore, it is desirable to develop a telecommunication system and method that allows for installation of improved line conditioning termination equipment at the customer premise that maintains loop loss within a desired range based upon the class and grade of service and provides for slope equalization, impedance matching and line balancing. Such improved equipment is powered by a direct current (DC) power source located at a telecommunications company central office via the local loop, and does not require local customer AC power for operation. It is further desirable that such equipment has a weather-proof construction to allow for installation outside the customer premise. Such a device should be suited for installation at both residential and business customers. It is desired that the weatherproof unit should have dimensions that allow for installation of two units inside a Keptel® SNI-4600 Network Interface Box (sold by Keptel, Inc.) for residential customers. It is further desirable that such a line conditioning termination device is fully automatically resettable for any off hook condition so that a technician does not have to travel to the customer premise to reset the unit when the characteristics of the local loop change.

Moreover, it is desirable to develop a system and method for processing service requests relating to the installation, maintenance or repair of locally switched circuits on which such improved line conditioning termination equipment is or may be installed that does not employ prior art design systems and processes, but instead uses improved nondesign systems and methods to process all such service requests.

It is further desirable that such a system and method can accommodate service requests relating to either analog or digital locally switched services. For digital services, telecommunications companies may utilize digital network channel terminating equipment (NCTE) installed on at the customer premise and central office equipment to provide the requested digital service at a desired speed or baud rate. The NCTE is typically designed or modeled by a design engineer using prior art design systems and methods discussed in the DETAILED DESCRIPTION OF THE PREFERRED EMBODIMENT to regenerate the signal and provide the desired loop loss at the network interface. An improved digital line conditioning termination equipment can be installed at the customer premise to eliminate the need for the NCTE. In this regard, it is desirable to employ digital line conditioning equipment at the customer premise that regenerates the digital signal received at the network interface to correct signal distortion that occurs during transmission, and provides a stabilized loop loss within a desired range at the network interface without requiring any digital repeaters at the central office or along the line, or NCTE. The preferred system and method should be able to distinguish and separately track analog or digital equipment when processing an associated service request.

SUMMARY OF THE INVENTION

The following are among the objects of the present invention:

To provide an improved system and method for processing a service request relating to the installation, maintenance or repair of any analog or digital locally switched telecommunication service using nondesign systems and processes.

To provide a telecommunication system and method for processing a service request whereby the service request can be satisfied and completed in a reduced time after receiving the customer request.

To provide a telecommunication system and method that does not require the use of amplifiers or digital repeaters at the central office, or repeaters or loading coils along the cable pair to provide a stabilized loop loss within a preselected desired range.

To provide a telecommunication system and method for processing a service request that allows for improved construction procedures when a field cable throw is performed.

To provide a telecommunication system and method for processing a service request that provides for a more efficient and accurate process for scheduling appointment times for the installation of a new service based upon the availability of qualified outside technicians.

To provide a telecommunication system and method for processing a service request that allows for installation of a locally switched analog service on an unloaded cable pair, and further allows for an unloaded local loop to be used alternately for either analog or digital signal transmission.

To provide a telecommunication system and method for processing a service request that utilizes fully automatic line conditioning equipment that automatically resets for any off hook condition.

To provide a telecommunication system and method for processing a service request that indicates whether analog or digital line conditioning equipment is or may be needed to be installed at a particular customer premise, and also indicates whether such line conditioning equipment is manually resettable, semi-automatically resettable or fully automatically resettable.

To provide a telecommunication system and method for processing a service request that allows for an outside technician to update records to indicate whether line conditioning equipment is actually installed at a customer premise, and, if such equipment is installed, to correct the information indicating the resettable feature of the equipment, if necessary.

To provide a telecommunication system and method for processing a service request that maintains records indicating those line conditioning units that are left in at a customer premise after service is disconnected so that the units can be retrieved at a later time.

To provide a telecommunications system and method that is cost-effective, easily implemented within a telecommunication company, and which provides prompt and reliable service to the customer.

To provide a telecommunications system and method that requires fewer people to process a service request and install locally switched service to a customer premise.

To provide a telecommunication system and method that maximizes quality of service and growth opportunity in digital markets.

These and other objects will become apparent to those skilled in the art in light of the following disclosure and accompanying drawings.

In accordance with this invention, generally stated, a telecommunication system and method are provided for processing a service request relating to installation, maintenance or repair of a local loop extending from a telecommunication company central office to a customer premise and providing locally switched telecommunication service. The system includes a computer network having a computer data processing means and computer memory means for storing computer information. More specifically, the system includes computer data processing means for inputting customer information. Computer data processing means is further provided for generating a service request based upon the customer information and information associated with the local loop including inside and outside plant facilities supporting the local loop. Computer data processing means assigns to the service request an available appointment date and time for providing the requested service based upon continually updated information indicating the availability of technicians. An available technician is dispatched by computer data processing means to the customer premise at or before the assigned appointment date and time if needed to install or repair outside facilities associated with the local loop or to install or replace a special line conditioning termination equipment when loop loss associated with the local loop is not maintained at an acceptable level for the locally switched service at the customer premise. Computer data processing means processes completion information input by the technician, when dispatched to the customer premise, associated with tasks performed by the technician to establish working service to the customer premise, including information indicating whether the special line conditioning termination equipment was installed or replaced. The system includes computer data processing means for completing the service request once working service is established at the customer premise. Computer memory means is further provided for storing computer information relating to locally switched services provided by the telecommunication company including information indicative of whether line conditioning termination equipment is installed at the customer premise. Computer data processing means creates or updates the computer information stored in the computer memory means based upon information associated with the completed service request.

Another aspect of the present invention is that of a system for providing a locally switched telecommunication service to a customer premise. The system includes a local network for providing the locally switched service to the customer premise including a network element central office switching system and a local loop extending from a telecommunication company local serving office to a customer premise. A weather-proof housing is included in the system that is mounted on an outside wall of the customer premise. A network interface is provided that has a network side effectively coupled to a company side disposed inside the housing. The system includes protection device for protecting the local network, the customer premise, and customer premise equipment located inside the customer premise from excessive voltages disposed inside the housing, and operatively connected between the local loop and the network interface (e.g., lightning). Further included in the system is a special line conditioning termination device for maintaining loop loss associated with the local loop within an acceptable range at the network interface based upon a class and grade of service associated with the service requested by the customer, the special line conditioning termination device being disposed inside the housing and connected between the protection device and the network side of the network interface. Additionally, the system includes a computer system for processing a customer service request for installation of the locally switched service at the customer premise, said computer system including computer data processing means for dispatching a technician to the customer premise to install the special line conditioning equipment between the protection device and the network side of the network interface inside the housing when the loop loss exceeds an acceptable range based upon the class and grade of service associated with the service requested by the customer, and further including computer memory means for storing computer information relating to the locally switched service provided across the local loop to the customer premise including information indicating the special line conditioning termination device is installed at the customer premise.

Still another aspect of the present invention is that of a system for processing a service request for installation of locally switched telecommunication service provided by a telecommunication company at a customer premise. The system comprises computer data processing means for generating a service order based upon customer information including information indicative of a class and grade of service associated with the requested service. The system has computer data processing means for assigning to the service order an available appointment date and time for installation of the requested service based upon updated information indicating the availability of qualified outside technicians. Additionally comprising the system is computer data processing means for assigning information to certain service orders when the class and grade of service associated with the requested service is less than 8½ dB indicating that further evaluation of the service is needed to determine if special line conditioning termination equipment needs to be installed at the customer premise for the requested service to provide a stabilized loop loss within a desired range. Also making up the system is computer data processing means for assigning to the service order information indicating inside and outside plant facilities needed to establish a working circuit from a telecommunication company local serving central office to the customer premise based upon information associated with the service order. Computer data processing means is further included for dispatching a technician to the customer premise at or before the assigned appointment date and time to establish the working circuit when needed to install or replace outside plant facilities or to install the special line conditioning termination equipment. Also included is computer data processing means for processing completion information input by the technician associated with tasks performed by the technician to establish working service to the customer premise, including information indicating whether the special line conditioning termination equipment was installed. Computer data processing means is further included in the system for completing the service order after installation of the requested service to the customer premise. The system also includes computer memory means for storing computer information relating to locally switched services provided by the telecommunication company to the customer premise including information indicative of whether line conditioning termination equipment was installed at the customer premise; and computer data processing means for creating or updating the computer information stored in the computer memory based upon information associated with the completed service order.

The telecommunication system and method of the present invention assists in eliminating the need to use amplifiers at the central office and loading coils or repeaters along the cable pair, thereby allowing for analog signal transmission across unloaded cable pairs. Therefore, the telecommunication system and method is compatible with networks that are digital from end to end. Analog and digital signals may be alternately transmitted across the same cable pair where the repeater or loading coils are removed. When the measured loop loss exceeds an acceptable level at the customer premise, the system and method of the present invention employ control circuitry associated with line conditioning termination equipment to provide a stabilized loop loss within a desired range at the network interface. The control circuitry includes an amplification and equalization network and a balancing network connected to the input of the network interface at the customer premise. Both the network interface and the control circuitry are powered by a direct current power source located at the central office via the subscriber loop. The network interface and control circuitry are disposed within a housing that is either mounted to an outside wall of the customer premise for POT services or inside the customer premise when used in conjunction with services such as a private branch exchange (PBX).

The present invention also provides for a method operating a general purpose digital computer having data storage memory for processing a service request relating to the installation of a locally switched telecommunications service provided to a customer premise at a desired class and grade of service, comprising the steps of: computer data processing generating a service order based on input to data processing of the requested service to be provided to the customer premise; computer data processing scheduling of a due date in computer memory for installation of the requested service based upon availability of an outside technician to install the requested service at the customer premise; computer data processing assigning an identifier to the service order in computer memory when line conditioning equipment potentially needs to be installed at the customer premise to provide the desired class and grade of service; computer data processing assigning into computer memory a code to the service order indicating line conditioning equipment is required; computer data processing assigning into computer memory all necessary inside and outside plant facilities and equipment to the service order to establish a circuit between the customer premise and a telecommunications central office across which the requested service is provided; data storage in computer memory of information indicating installation of those inside and outside facilities and equipment that are assigned and not previously installed; computer data processing dispatch of a qualified technician to install special line conditioning termination equipment at the customer premise based upon the identifier and code; data storing in computer memory information indicating installation of the line conditioning termination equipment when loop loss associated with the circuit exceeds an acceptable level for the requested class and grade of service; data storing into computer memory to update the information associated with the code if the reset information previously assigned to the service order does not properly reflect the reset function associated with the line conditioning equipment installed at the customer premise; computer data processing deleting the equipment code from the service order in computer memory when the equipment code previously was assigned to the service order and the line conditioning equipment is not installed at the customer premise; and computer data processing updating computer memory to accurately reflect whether line conditioning equipment is installed at the customer premise.

Yet another aspect of the present invention includes a method of operating a general purpose digital computer network having data storage memory for processing a customer request for service relating to locally switched telecommunication service provided across a local loop extending from a telecommunication company central office to a customer premise, comprising the steps of: computer data processing customer information into computer memory including a customer name, a customer premise address, telephone number, and information indicative of the customer request for service and activity to be performed in processing the customer request; computer data processing generation of a service request based upon the customer information and information associated with the local loop including information indicating when special line conditioning termination equipment used to provide a stabilized loop loss within a desired range potentially is or needs to be installed at the customer service; computer data processing assignment and storage into computer memory to the service request an available appointment date and time for providing the requested service; computer data processing determination of whether a technician needs to be dispatched to the customer premise on or before the appointment date and time based upon information associated with the service request; computer data processing dispatch of an available technician to install, replace or remove outside facilities associated with the local loop or special line conditioning termination equipment at the customer premise; computer data processing of completion information input by the technician associated with tasks performed by the technician and including information indicating whether special line conditioning termination equipment was installed, replaced or removed, and storage of that information in computer memory; computer data processing completion of the service request; data storing in computer memory of information relating to locally switched services provided by the telecommunication company to the customer premise including information indicating whether line conditioning equipment is installed at the customer premise; and computer data processing update and storage into computer memory information associated with the completed service request.

Other objects and features will be apparent and in part pointed out hereinafter.

BRIEF DESCRIPTION OF THE DRAWINGS

The objects of the invention are achieved as set forth in the illustrative embodiments shown in the drawings which form a part of the specification.

FIG. 7 is a schematic diagram illustrating the wiring configuration of the termination equipment and network interface that can be used in the present invention, located in a housing mounted to the outside of the customer premise shown in FIG. 5;

FIG. 7A is a schematic diagram illustrating the wiring configuration of two termination devices, a protector, and a network interface installed in a housing mounted to the outside of the customer premise for two local loops extending to the customer premise;

FIG. 8 is a schematic diagram showing the wiring configuration of the termination equipment and network interface located inside the customer premise;

Corresponding reference characters indicate corresponding parts throughout the several views of the drawings.

DESCRIPTION OF THE PREFERRED EMBODIMENT

Detailed Description of the Prior Art

I. OVERVIEW

Figure 1:
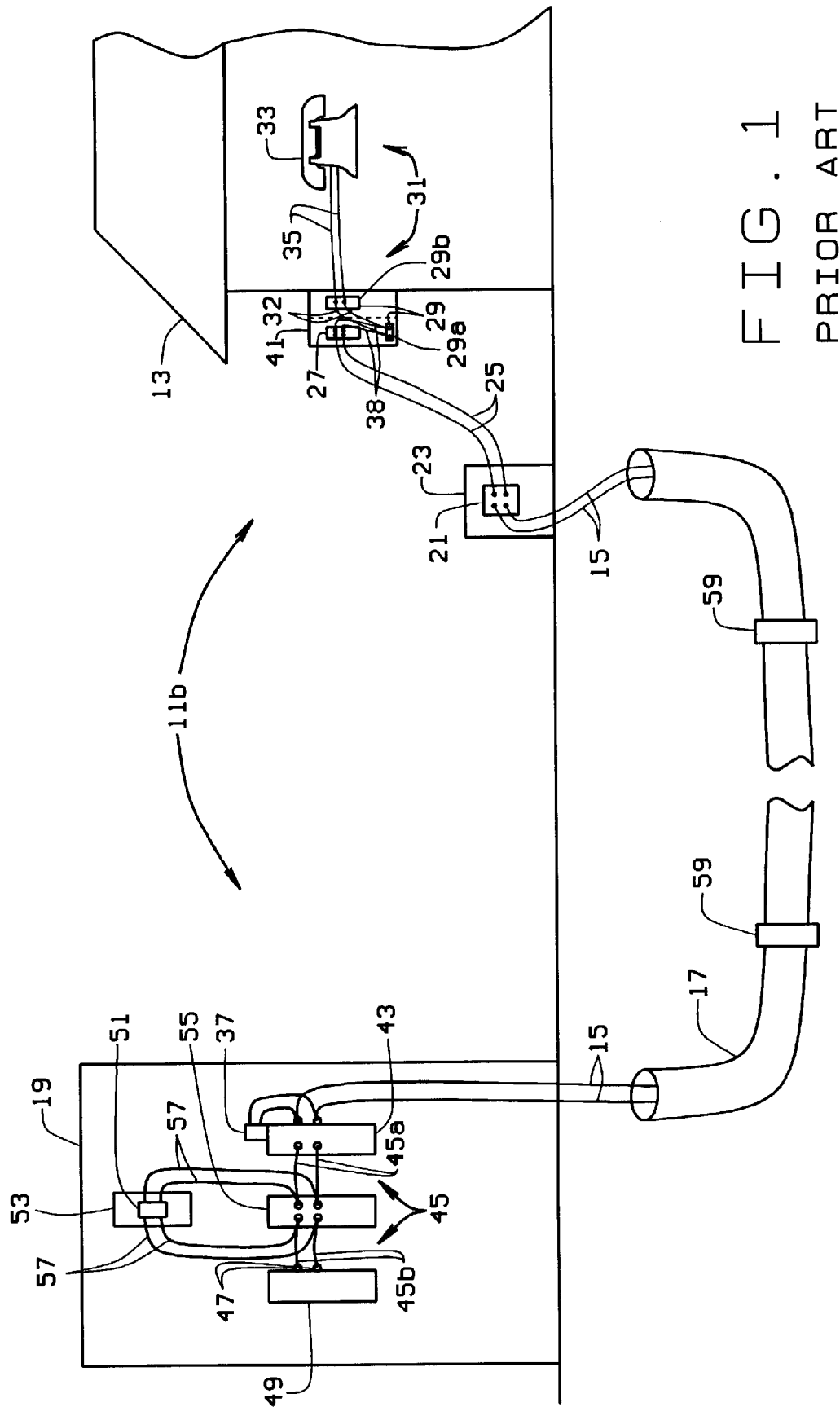
FIG. 1 is a schematic diagram of prior art inside and outside telecommunications facilities and equipment used to provide a prior art designed analog service across a loaded cable pair extending between a central office and a customer premise.
Figure 2:
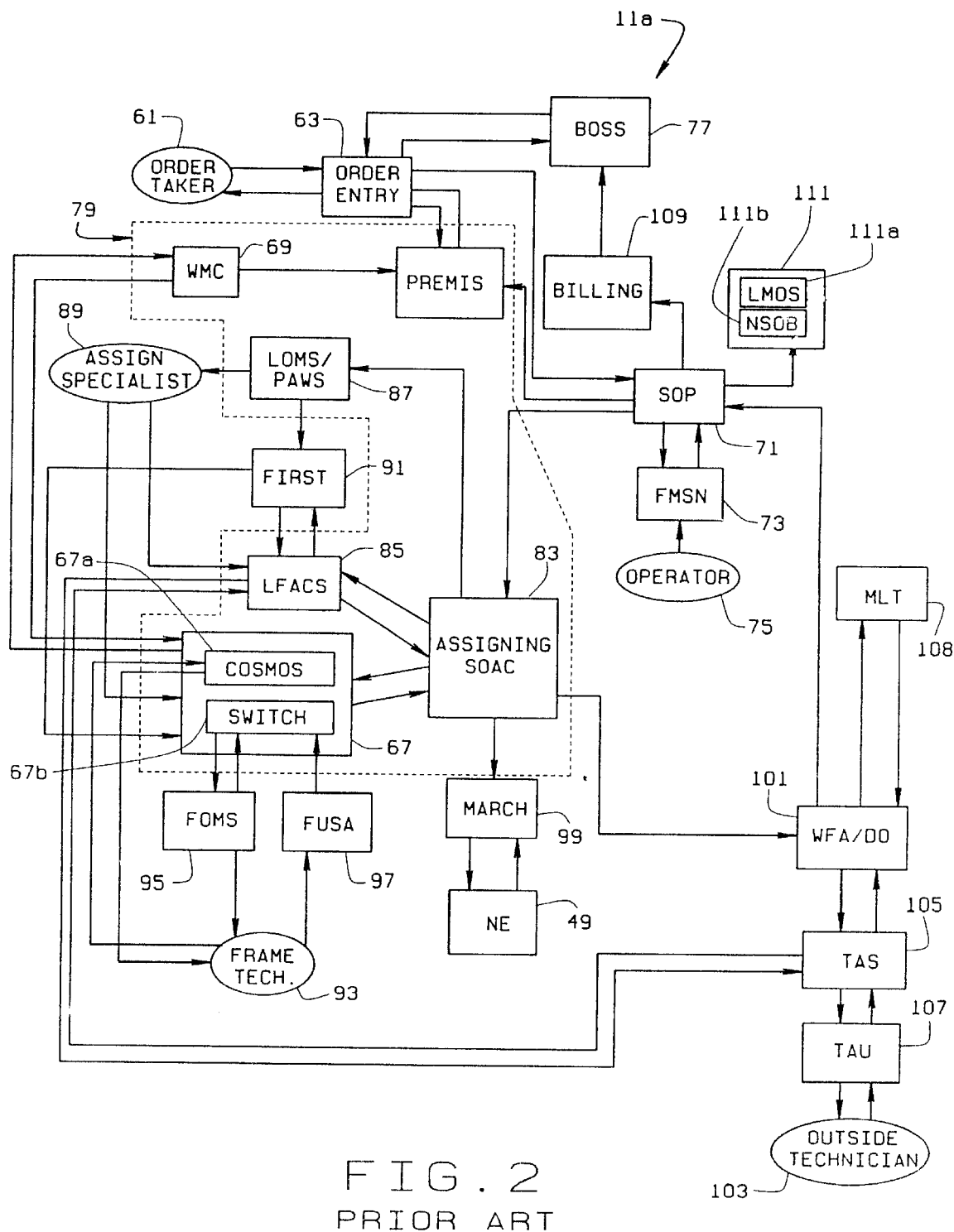
FIG. 2 is a block schematic diagram of a prior art computer network used for processing service requests relating to the installation of prior art nondesigned services.
Figure 3:
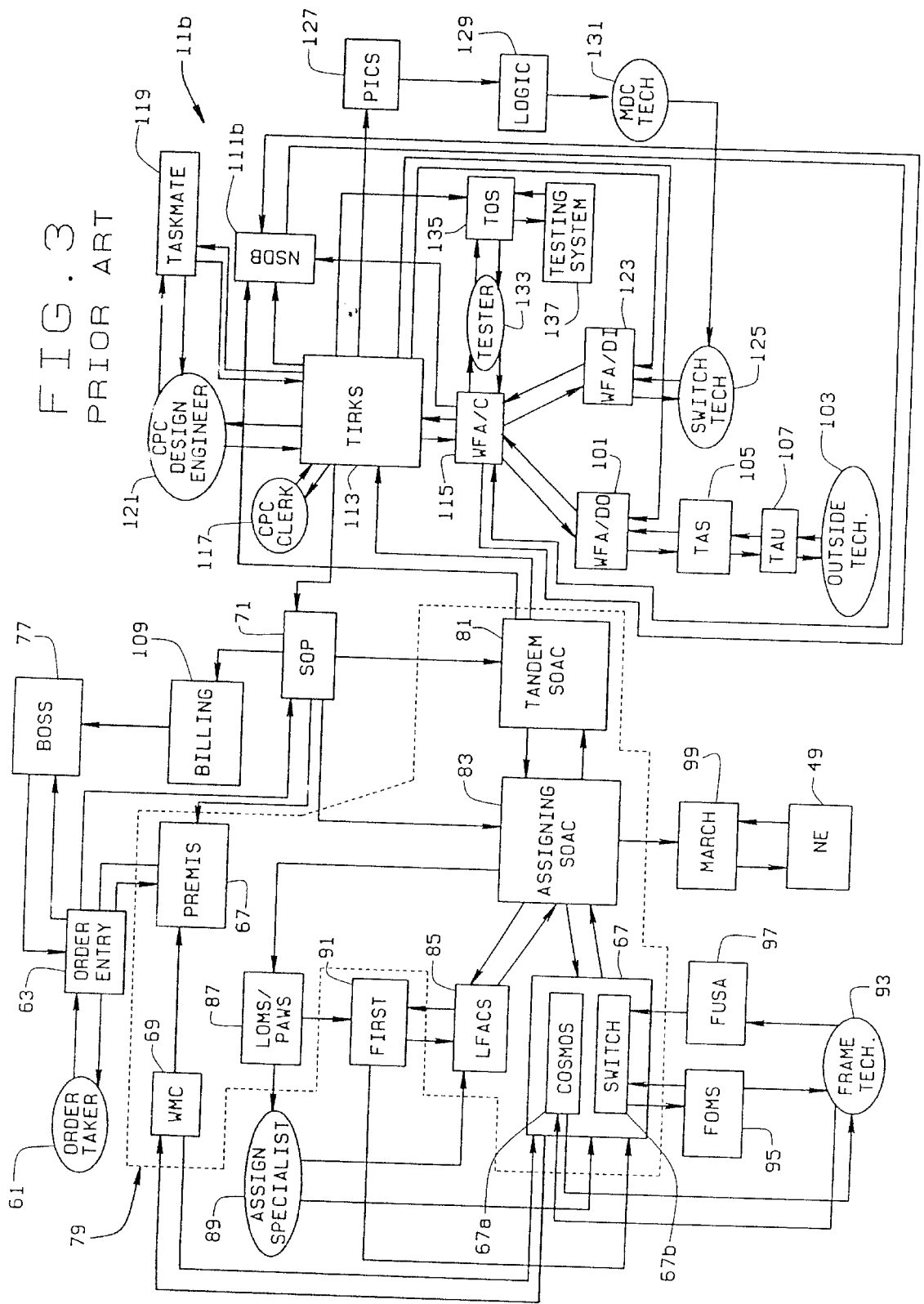
FIG. 3 is a block schematic diagram of a prior art computer network used for processing service requests relating to the installation of prior art designed services.

As discussed above, it is beneficial to first set forth a detailed explanation of the prior art systems and methods currently used in the telecommunications industry for installation, maintenance and repair of analog and digital services in order to better comprehend the tremendous advantages of the present invention and its preferred embodiment. As will be discussed in greater detail below, FIG. 1 illustrates the inside and outside telecommunication facilities and equipment used to provide prior art analog designed service across a local loop. FIGS. 2 and 3 illustrate embodiments of prior art systems, indicated generally at 11, used to process service requests relating to installation of prior art nondesigned services (FIG. 2) or prior art designed services (FIG. 3). The prior art system 11 includes a computer data processing network having a plurality of computer systems that interact to process the service order, inside and outside telecommunications facilities and equipment used to provide the requested service to a customer premise 13, and associated telecommunications company personnel involved in processing the service request. The particular computer systems are set forth for illustrative purposes only. Clearly, any system discussed herein may be replaced with an equivalent computer system or systems, or be incorporated into another computer system, to accomplish substantially similar results. Therefore, while the functions and operations of each computer system shown in FIGS. 2 and 3 are discussed with respect to a particular type of system such as FIRST or LFACS or WFA/DO, it will be appreciated by those skilled in the art that the functions and processes define the core of the prior art computer network (as well as the computer network of the present invention), and reference to particular computer systems should not be interpreted in any limiting sense.

As will be discussed in greater detail below, when a customer requests installation of an analog or digital service, a service order is prepared. In processing and generating the service order, the computer network (and associated personnel) employed in the prior art system 11 may perform two primary functions, namely "assignment" functions and "design" functions. In the "assignment" phase, the computer network performs input, processing, storage, output, and control functions on data associated with each service order to determine whether any inside or outside telecommunications company facilities, equipment or inventory are needed to process the service order, and then assigns such facilities, equipment or inventory to the service order if necessary.

While the computer network performs "assignment" functions on data associated with all service orders, only certain service orders are subject to the "design" functions under the prior art system 11. Therefore, telecommunications services are typically categorized either as "designed services" that are processed by the system 11 using both the "assignment" and "design" functions, or as "nondesigned services" that are processed by the system 11 using only "assignment" functions.

As will be discussed in more detail below, service orders relating to designed services require data processing by many additional computer systems in the "design" phase such as Tandem SOAC, TIRKS® (sold by Bell Communications Research, Inc. (Bellcore) under its registered trademark) of and WFA/C. As is known to those skilled in the art, a telecommunication circuit used to provide designed services often requires design and installation of a customized amplifier at the central office by telecommunications company personnel to maintain the loop loss within an acceptable level. In general, FIG. 1 shows the telecommunications facilities and inventory typically used to provide analog designed services to a customer premise. FIG. 2 sets forth the computer network associated with prior art system 11a for processing a service order requesting installation of a nondesigned service such as typical Plain Old Telephone Service (POTS) or coin service. FIGS. 3 sets forth the computer network associated with a prior art system 11b for processing a service order requesting installation of a prior art designed service such as a voice grade analog special service. FIGS. 2 and 3 both illustrate personnel used to operate systems 11a and 11b, respectively. These telecommunications company personnel are designated by ovals in FIGS. 2 and 3. As will be seen in later discussions describing the present invention, fewer persons are needed to operate the system of the in vent ion than in the prior art system 11b. Prior art systems 11a and 11b are referred to collectively as prior art system 11.

In the prior art, designed special services include, but are not limited to, local two-way Private Branch Exchange (PBX) trunks, direct outward dialing (DOD) PBX trunks, CENTREX® central office lines, and network data lines, direct inward dialing (DID), and Wide Area Telecommunications Service (WATS). When a local loop used to provide POTS ha s a n associated loop loss that exceeds a maximum acceptable level, a customized amplifier is designed and installed at a central office 19. In this situation, the POTS provided to the customer premise 13 is a designed service which is typically referred to as designed POTS or a Local Service (LS) circuit.

Figure 4:
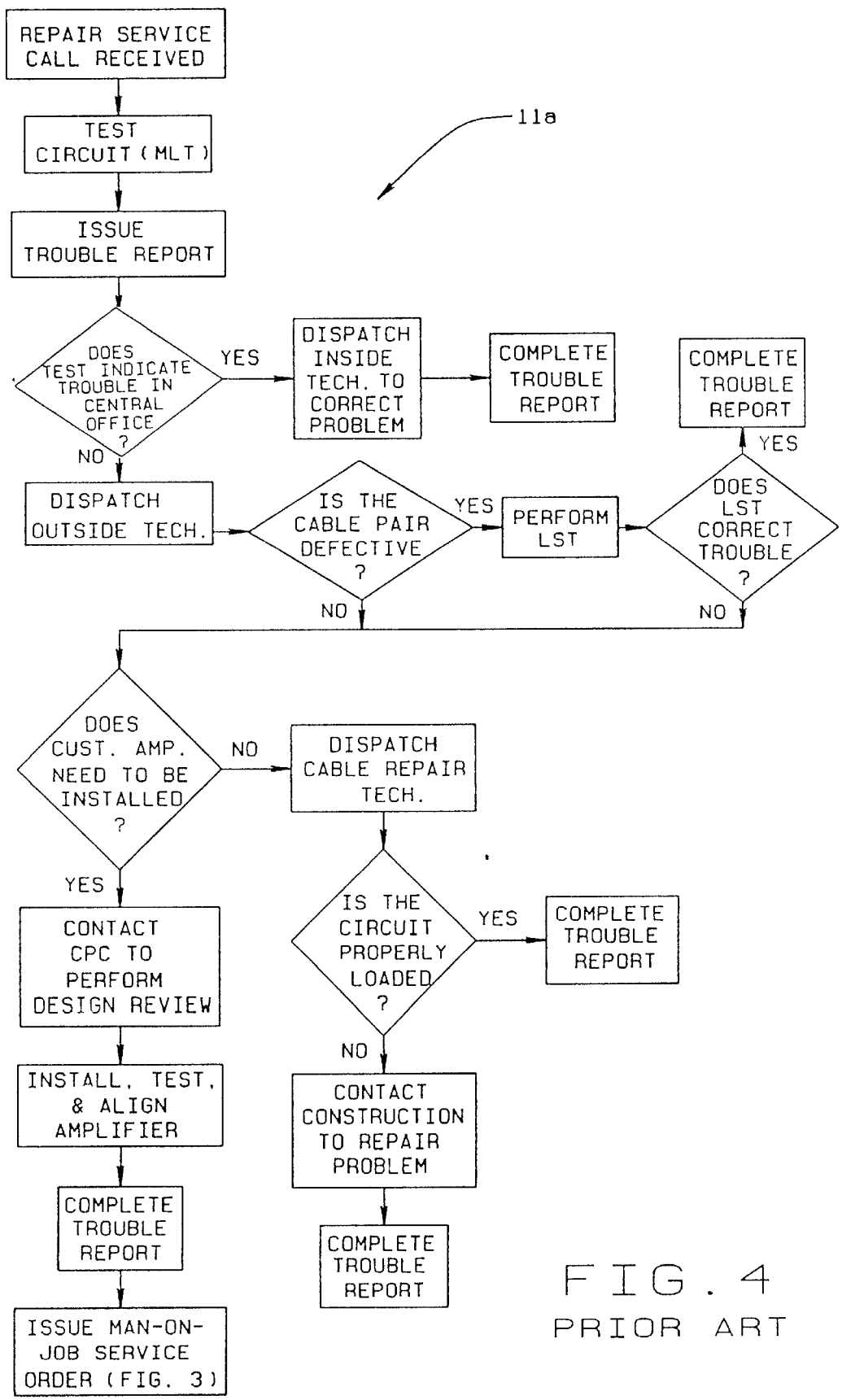
FIG. 4 is a flow chart illustrating a prior art system and method for processing a service request relating to the repair of a local loop used to provide a prior art nondesigned service to a customer premise.
Figure 5:
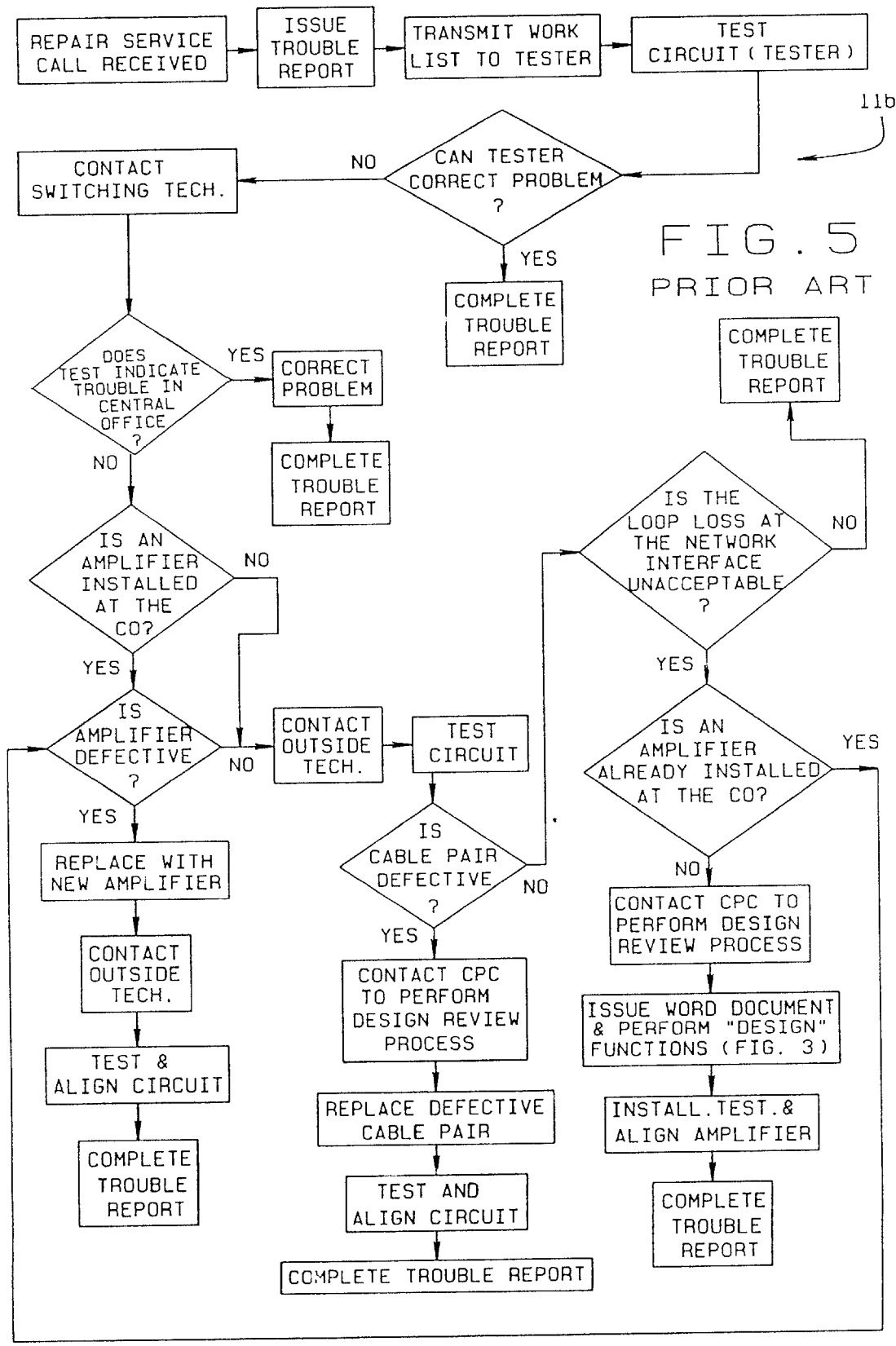
FIG. 5 is a flow chart illustrating a prior art system and method for processing a service request relating to the repair of a local loop used to provide a prior art designed service to a customer premise.

FIG. 4 illustrates a prior art system and method for processing a trouble report founded on a customer complaint relating to a prior art nondesigned service installed using the prior art nondesign system 11a. FIG. 5 sets forth a prior art system and method for processing a trouble report relating to a prior art designed service installed using the prior art design system 11b.

II. PRIOR ART INSIDE AND OUTSIDE FACILITIES AND EQUIPMENT

As mentioned above, FIG. 1 generally illustrates the inside and outside telecommunication facilities and equipment used to provide a prior art analog designed service to a customer premise 13, including a pair of conductors, wires, optical fibers or the like (referred to as a "cable pair") 15 contained in a multi-paired cable 17 effectively extending from a telecommunication company central office building 19 to a terminal interface 21. The terminal interface 21 is typically contained within a housing 23 mounted to a telephone pole (not shown) or located on the ground in the vicinity of a customer premise 13. Alternatively, the terminal interface 21 can be located within the customer premise 13. A pair (or pairs) of aerial drop wires 25 effectively extend the cable pair from the terminal interface 21 to a protector 27 located in close proximity to a network interface 29.

As shown in FIG. 1, the network interface 29 connects a public switched telephone network controlled by the telecommunications company through the central office 19, to customer premise equipment (CPE) 31 that is owned and maintained by a telephone customer. In other words, the network interface is the demarcation point between a network or company side 29a, and a customer side 29b of the telecommunication network. The network side 29a is connected to the customer side 29b via conductors 32. The CPE 31 may include termination equipment 33 such as a telephone set (as shown), modem or facsimile machine, a private branch exchange (PBX), concentration equipment, and intrapremise wiring 35. For nonfiberoptic wire pairs 15, a direct current (dc) power supply 37 located at the central office 19 that supplies constant DC voltage across the local loop is used to supply power to the network interface 29 via the cable pair wires 15 and drop wires 25.

A pair of wires 38 effectively extend the cable pair 15 from the protector 27 to the company side of the network interface 29. The company side of the network interface is operatively connected to the customer side of the network interface. For customers using a Private Branch Exchange (PBX), the terminal interface 21, protector 27 (which is needed if the terminal interface is unprotected), and network interface 29 are typically located inside the customer premise 13. Wires 35 extending from the customer side of the network interface 29 are then connected to CPE 31, such as a telephone, modem, PBX or facsimile machine. For non-PBX customers, the network interface 29 is typically contained within a weather-proof housing 41 mounted to an outside wall of the customer premise 13, as shown in FIG. 1.

Within the central office building 19, each cable pair 15 terminates at a point of termination on a Main Distributing Frame (MDF) 43. As will be discussed below, the MDF 43 houses a plurality of jumper wires 45 that effectively interconnect each terminated cable pair from its point of termination on the MDF 43 to a corresponding switch port or input terminal associated with a network element (NE) or switching system 49 located in the central office 19. "NE" is a generic term used to refer to any central office switching system sold by several vendors such as AT&T or Northern Telecom. The NE 49 interconnects one subscriber with any other subscriber having properly configured CPE 31, by dialing such other subscriber's telephone number.

As will be discussed in more detail below in discussion of FIG. 3, the complex prior art system 11b often involves providing prior art designed services such as voice grade analog special services to the customer premise 13. Designed services often require the installation of a customized amplifier 51 (sometimes referred to as a "plug") located at the central office 19 between the switch port 47 that accesses the NE 49 and the point of termination for the cable pair 15 on the MDF 43. The amplifier 51 can be mounted on a frame 53. Similarly, if a cable pair 15 used to provide Plain Old Telephone Service (POTS) for voice communication has an unacceptable excessive loop loss associated with it, such a customized amplifier 51 is also likewise installed at the central office 19. If the customized amplifier 51 is not needed for designed services or if nondesigned services are provided across the cable pair 15, the jumper wire 45 is still installed to connect the switch port 47 to the point of termination.

For analog designed services that require installation of a customized amplifier 51 within the central office 19, there are two common wiring configurations within the central office. If the MDF 43, the amplifier frame 53, and the NE 49 are located in different rooms or on different floors within the central office 19 as shown in FIG. 1, a first pair of jumper wires 45a interconnects the point of termination on the MDF 43 to a tie pair frame 55 used to house a plurality tie pairs 57 that extend throughout the central office. Tie pairs 57 are wired to and from the customized amplifier 51 located on the amplifier frame 53. A second pair of jumper wires 45b effectively connects the appropriate tie pair 57 on the tie pair frame 55 to the switching port 47 associated with the NE 49. If the MDF 43, the amplifier frame 53, and the NE 49 are all located in the same room, the tie pair frame, and jumper wires 45a typically are not needed. In this configuration, one set of tie pair 57 typically is used to interconnect the terminated cable pair on the MDF 43 to the customized amplifier 51, and then jumper wires 45b interconnect the amplifier 51 and the switch port 47.

For digital designed services requiring installation of digital regenerative repeaters (not shown), the repeaters are installed on office repeater bays connected between the point of termination on the MDF and the NE. Each such office repeater provides impedance matching, equalization, and signal regeneration, and applies power to the line. For digital services, digital network channel terminating equipment (NCTE) typically is installed on the network side of the network interface at the customer premise to provide the requested service at a desired speed or baud rate. The NCTE typically is designed or modeled by a design engineer using prior art design systems and methods discussed below to regenerate the signal and provide the desired loop loss at the network interface.

In the prior art system 11b, switched access maintenance systems (SMAS) also are installed on the loop in the central office to allow a test system to access and test the customer loop.

In the prior art system 11b shown in FIG. 1, if the amplifier 51 used for prior art analog designed services, such as special services or designed POTS, does not sufficiently boost the analog or digital signal to overcome excessive loop losses, analog repeaters or loading coils 59 are installed at various locations on the cable pairs 15 in the cable 17 between the central office 19 and the customer premise 13. The loading coils 59 are used to reduce signal attenuation within the voice band (up to about 3500 Hz). Similarly, the analog repeater 59 receives, amplifies or reshapes and then retransmits the signal to reduce any signal distortion. Repeaters can also be place in the central office 19 to repeat and reshape signals as they are transferred from that central office 19 to another central office. As discussed above in the BACKGROUND OF THE INVENTION section, significant drawbacks and considerable expense are associated with the use of the repeaters, loading coils, and customized amplifiers 51 for prior art designed services. Similarly, the digital office repeaters typically are connected to digital regenerative repeaters installed along the line in feed plant and distribution plant facilities. The line repeaters are powered by the office repeater bays, and provide equalization and timing to restore the pulse shape. As discussed above, the line repeaters and loading points are typically installed in housing positioned in manholes or on poles.

If the prior art system 11 as set forth in FIG. 1 is used to provide nondesigned analog services to the customer premise 13, the amplifier 51 is not installed at the central office. In addition, loading coils 59 may not be needed or installed. Similarly, if the prior art system 11 is used for digital signal transmission, the local loop must be unloaded (all bridge taps, load coils, analog repeaters, build out capacitors, and cable stubs, if any, as well as the customized amplifier are removed) to allow for digital signal transmission.

Therefore, as discussed below, a telecommunication system 200 of the present invention (shown in FIGS. 6–8) has been developed that does not require the use of loading coils, or analog or digital repeaters on the cable pair for any analog or digital signal transmission. System 200 also assists in the elimination of the need to use customized amplifiers 51 or digital repeaters at the central office 19 for prior art designed services. Moreover, system 200 of the invention completely eliminates for locally switched services the computer systems discussed below that are only used to process service orders relating to designed services associated with prior art systems 11b. In other words, system 200 processes service orders relating to analog and digital telecommunication services as "nondesigned" services. As will be discussed in detail with respect to the present invention, many prior art computer systems discussed below that are currently used to process service orders relating to prior art nondesigned services (as shown in FIG. 2) are improved and modified in system 200 to provide for more efficient processing of all service request s relating to any analog or digital locally switched service.

III. PRIOR ART INSTALLATION PROCESSES

Before discussing in detail the prior art systems shown in FIGS. 2–3, it is helpful to note that the prior art computer network used in the "assignment" phase for processing service orders relating to prior art designed services as shown in FIG. 3, incorporates many identical computer systems that are used for processing service orders relating to prior art nondesigned services as shown in FIG. 2. Therefore, much of the following discussion regarding the preparation of the service order and the "assignment" functions performed by the FACS computer system apply to both prior art design and nondesign systems. The following discussion distinguishes between the systems used for processing service orders relating to prior art designed and nondesigned services when necessary.

In the prior art system 11 shown in FIGS. 2–3, when a customer requests installation of analog or digital service such as those associated with local PBX trunks, network data lines, CENTREX® central office lines, direct outward dialing (DOD) trunks, or direct inward dialing (DID) trunks, a person 61 usually referred to as an "order taker" accesses a business and sales support computer order entry system 63 to prepare a service order. Such a service order refers to a packet of computer information that contains data essential to establishing, updating, maintaining, billing and disconnecting all customer service offerings. The service order is also used to convey information and data to various telecommunications company personnel including technicians and specialists so they can perform necessary manual and record work to complete the installation of the requested service.

All information included in the service order is arranged into logical groupings of related data called sections. Typical sections of a service order include: identification (identifies information such as the service order telephone number, order number, due date); listing (includes directory listing of customer name and address); control (contains dates for the installation of special services); directory (contains information for delivery of phone books); traffic (includes information for a telephone recording when a customer moves or changes telephone numbers); billing (sets forth billing name and address, and billing and credit information); remarks (includes information regarding installation instructions or other miscellaneous data); service and equipment (includes USOCs, FIDs, action codes, and/or quantities associated with the service provided by the telecommunications company); statistics (contains information about the actual completion of the service order); and assignment (includes information relating to inside and outside facilities used to provide working service to the customer premise and the facility address). Each of these sections of the service order may also include subsections or field such as a remarks field which may include additional information or instructions relating to that particular section.

Depending on the nature of the requested service and the configuration of the system 11, the prior art computer or computer systems 63 is typically one of the following computer systems known in the art: an Easy Access Sales Environment (EASE) data processing system of Southwestern Bell Telephone Company, a Direct Order Entry (DOE) data processing system, a CABS (Customer Access Billing System) Minimal Input Generation (CMIG) data processing system, or an Exchange Access Control and Tracking (EXACT) data processing system of Southwestern Bell Telephone Company. The computer order entry system 63 performs input, processing, storage, output and control functions on data used to generate a service order. Alternatively, a customer may input a request through a customer direct access computer order entry system.

The order taker person 61 or customer inputs customer information into the computer order entry system 63 such as the customer's name and phone number (if applicable), address, and the type of service requested. Either the computer order entry system 63 or the order taker 61 accesses a computer data processing system known as Premises Information System (PREMIS) 65 that contains address-based information stored in associated databases in its computer memory. The information stored in PREMIS 65 includes customer service address, the central office serving each address, the type and designation of the NE 49 serving the customer address, and the types of services provided by the central office 19 serving that address. PREMIS 65 assists in generating a service order by validating the customer's address, and verifying any telecommunication company services currently associated with that customer address.

PREMIS 65 then transmits the appropriate address-based information to the computer order entry system 63 or the order taker 61. The computer order entry system 63 data processes the customer information input by the order taker or customer and address-based information received from PREMIS into the service order format, or the order taker 61 accesses PREMIS and manually inputs the information from PREMIS into the computer order entry system 63, depending upon the configuration of the system 11.

If a telephone (line) number assignment is required for installation of a new service, the computer order entry system 63 accesses PREMIS 65 to retrieve a list of available telephone numbers. More specifically, PREMIS 65 selects the list of available telephone numbers from a pool of available numbers stored therein based upon the wire center which includes the customer premise. PREMIS transmits this list to the computer order entry system 63 for use in preparing and processing the service order. The order taker 61 selects and assigns a particular telephone number from this list to the service order. Those numbers that are not selected are stored in PREMIS as part of the available pool of numbers to be used for subsequent service orders. Typically, PREMIS retains the selected line number in the pool with an indication that the number has been selected and is no longer available. When the service order is completed and the requested service installed, PREMIS 65 receives a copy of the completed service order from the SOP 71, and PREMIS deletes the number associated with the completed service order from the pool of numbers.

Typically, a clerk located in a line number assignment center monitors the pool of available numbers for each wire center that are stored in PREMIS 65, and downloads additional telephone or line numbers as needed to PREMIS 65 from either a COSMOS computer system 67a or a SWITCH® computer system 67b (registered trademark of Bell Communications Research, Inc.)(referred to collectively as COSMOS/SWITCH 67 and discussed in greater detail below) via a Consolidated Work Manager (WMC) computer system 69. In general, COSMOS/SWITCH 67 is a computer data processing system that performs input, storage, processing, output and control functions on data relating to central office equipment and facilities. As will be discussed below, COSMOS/SWITCH 67 maintains information stored in its computer memory indicating all available telephone numbers utilized by the NE 49 located in central office 19.

If the service request relates to the installation of a nondesigned service, the computer order entry system 63 also inputs a message into a Service Order Processor (SOP) system 71, such as a Service Order Retrieval and Distribution (SORD) system of Southwestern Bell Telephone Company, requesting an available due date and appointment time for installation of the nondesigned service based on the availability of an outside technician. As will be discussed further below, the SOP system 71 is a real-time computer data processing system used for data processing the service order. In the prior art system 11, the SOP 71 obtains the due date from a Force Management System Network (FMSN) 73. FMSN 73 is a data processing system used to maintain records stored in its computer memory regarding the availability of inside and outside technicians to assist in the installation of a nondesigned service. An outside operator 75 periodically inputs and updates information stored in its computer memory to indicate the number of outside technicians available to work on a particular day for a geographic area corresponding to at least one wire center. Typically, at several times throughout a day (e.g., every two hours), FMSN 73 inputs information regarding the availability of technicians into the computer memory of the SOP 71. However, this information is often out-dated and does not accurately reflect the current availability of the technicians since the information is only periodically updated by the operator and not downloaded to the SOP 71 on a dynamic basis. Nonetheless, the SOP 71 data processes the message from the computer order entry system 63 to determine if technicians are available to complete the service order. The SOP 71 transmits a message to the computer order entry system 63 indicating available appointments for the technician work force over a predetermined range of days. Once the computer order entry system 63 receives this information from the SOP 71, the customer selects an available appointment date and time, and the order taker 61 then inputs this information into the computer order entry system 63. The computer order entry system 63 data processes this information into the service order.

For designed and nondesigned services, the computer order entry system 63 or order taker 63 also transmits a message to a Business Office Support System (BOSS) 77 requesting information relating to the customer's credit history and records of service(s) previously installed at the customer premise 13, if such information exists. BOSS 77 is a data processing system that maintains current customer billing and service records in its computer memory. BOSS 77 accesses its computer databases to obtain the requested information. BOSS 77 then transmits the information to the computer order entry system 63. The computer order entry system 63 data processes the information into the service order, if appropriate.

After the computer order entry system 63 gathers and processes the necessary information to generate a service order, the computer order entry system 63 inputs this necessary information into the computer memory of the SOP 71. The SOP 71 data processes this information and generates a service order that is stored in its associated database. It is also possible to bypass the computer order entry system 63, whereby the order taker person 61 gathers and inputs all customer information directly into the SOP 71, and the SOP 71 generates the service order.

Each service order can include a plurality of Universal Service Order Codes (USOCs) and Field Identifiers (FIDs) that are assigned to the service order by the order taker person 61 or the SOP 71. The USOCs and FIDs are used by the system 11 to process the service order. The USOCs include information indicating many parameters to be considered in installing the requested designed or nondesigned service for a particular subscriber loop or circuit. These parameters typically include service and equipment information relating to the class and grade of service the customer requested, how the service will be used, and what equipment needs to be installed. FIDs provide information identifying a multitude of system components by codes including, but not limited to, such as TN for telephone number, CA for cable 17, and PR for cable pair 15.

In addition, the order taker person 61 enters into the computer order entry system 63 or the SOP 71 a Common Language® Circuit Identification (CLCI) (registered trademark of Bell Communication Research, Inc.) service code corresponding to the particular type of special service requested by the customer for designed or nondesigned special services. For example, several of the many service codes that may be assigned by the order taker person 61 in the prior art system 11 when there is a request for installation of a new service include: TK for local two-way PBX trunk services, DO for direct-out-dial (DOD) services, CL for CENTREX® central office line services, and ND for network data line services. If the special service is existing, the computer order entry system 63 retrieves the service code from the database stored in the computer memory of BOSS 77 that contains the customer service records.

The order taker person also inputs an action code for work to be performed for the service and equipment associated with the USOCs and FIDs. The action code is a single alphabetic character that indicates the activity applicable to a specific service order entry. For example, action codes that can be input into the service order by the order taker person 61 include I for "installation," C for "change" and T for "to," O for "out" and R for "recap."

As will be appreciated by those skilled in the art, certain USOCs and FIDs input by the order taker person 61 are used by other computer systems in processing the service order. For example, a USOC such as CQ4 can be input by the order taker person 61 when conditioning is needed for an ND circuit to provide 4 dB loop loss. When the service order passes to the Assigning SOAC (discussed below), the CQ4 USOC triggers tables in the Assigning SOAC to recognize and translate this USOC as a line class code, indicating the line class needs conditioning or outside facilities assigned by LFACS or SWITCH® The USOCs, FIDs and action codes are also associated with billing codes used by the billing system such as CRIS (discussed below) to determine billing rates for the service provided.

As mentioned above, the SOP system 71 is a real-time computer data processing system which controls the preparation and distribution of the service order, and maintains a direct access file of pending service orders. Some of the input-output functions are performed by computer subsystems or databases associated with the SOP 71, such as a Request Processor (REQ) module and a Queued for Distribution (QFD) module that are used in the SORD system. In the SORD system 71, the REQ system edits and verifies information contained in the service order to determine if the information is in the correct format, and determines if a service order contains the appropriate USOCs and FIDs indicating a customer request for a particular service. Based on the information relating to the service order request, the REQ system also determines which other systems in the computer network will receive copies of the service order.

The QFD system analyzes the service order to determine if the service order related to a designed service or a nondesigned service. If a designed service is requested, the QFD system then assigns dates and information to the service order indicating deadlines associated with processing the customer request such as the dates for designing, ordering, shipping, testing and installing the customized amplifier 51. The deadlines extend backwards in time from the date on which the service order is to be completed (i.e., the due date). For example, the QFD system is programmed to calculate and propagate critical dates such as a Record Issue Date (RID), a Service Order Issue Date (SID), a Plant Test Date (PTD), a Frame Continuity Date (FCD), a Designed, Verified and Assigned (DVA) date, and a Wire Office Tested (WOT) date based on the date the special service is to be installed at the customer premise. The REQ system also automatically propagates a FID known as ADSR (Administration of Design Services Review) on the service order for all designed service requests. Alternatively, the order taker person 61 can manually enter the ADSR code in the service order. All service orders that relate to designed service include the ADSR code, regardless of the type of SOP system 71 employed in the system 11.

In the prior art system 11, the SOP system 71 then transmits the service order to Facility Assignment and Control Systems (FACS) 79. FACS 79 includes a plurality of on-line computer data processing systems that interact with each other to perform the "assignment" functions discussed above. These systems 79 perform input, processing, storage, output, and control functions on data relating to inside and outside telecommunications company facilities, inventory and equipment that can be used for a particular customer to provide the requested service to a particular customer premise 13. FACS 79 is used to process all service orders, regardless of whether the requested service is designed or nondesigned. As will be discussed in greater detail below, the computer data processing systems comprising FACS 79 include: COSMOS/SWITCH 67, Loop Assignment and Control Systems (LFACS) 85, Tandem Service Order Analysis and Control (Tandem SOAC) 81, Assigning Service Order Analysis and Control (Assigning SOAC) 83, PREMIS 65, LOMS/PAWS 87, and WMC 69.

More specifically, the SOP 71 typically transmits a copy of the service order to either to the Tandem SOAC 81 for designed services (see FIG. 3) or nondesigned services requiring interoffice facilities (not shown), or to the Assigning SOAC 83 for locally switched nondesigned services (see FIG. 2). The receiving (Tandem or Assigning) SOAC 81, 83 is programmed to determine what information is needed to fulfill the customer request based on the USOCs, FIDs and service codes transmitted by the SOP 71. If the service order request relates to designed services or nondesigned services requiring interoffice facilities, the Tandem SOAC 81 determines which of many Assigning SOACs 83 are involved in processing the service order, and then transmits a copy of the service order to the appropriate Assigning SOAC computer system(s) 83. If the service order request relates to a locally switched nondesigned service, then the SOP 71 transmits a copy of the service order directly to the appropriate Assigning SOAC 83.

As mentioned above with respect to FACS 79, the Assigning SOAC 83 is a computer data processing system that performs input, processing, storage, output and control functions on data contained in the service order. In general, the Assigning SOAC 83 interprets, validates, and decomposes inputs received from other computer systems. The Assigning SOAC 83 distributes, retrieves and gathers information to and from other computer systems that perform outside plant facility assignments, central office facility assignments, and inventory functions. More specifically, the Assigning SOAC 83 is programmed to analyze certain information contained in the service order such as the customer's address and the wire center servicing that particular address. Based on files stored in an Assigning SOAC database, the Assigning SOAC 83 determines if outside plant facilities are required, and, if so, then determines which of many Loop Facility Assignment and Control Systems (LFACS) 85 contains items such as information relating to cables 17 and cable pairs 15 servicing the customers location. The Assigning SOAC 83 then transmits a copy of the service order to the appropriate LFACS 85.

LFACS 85 is a data processing computer system that performs input, processing, storage, output, and control functions to accomplish a sequence of operations on data relating to all cable pairs 15 and cables 17 extending to various locations in a geographic area or wire center. LFACS 85 maintains records in an associated database of all attributes associated with a particular outside cable 17 and cable pair 15, such as the location of the pair 15 within a particular cable 17, whether the pair 15 is loaded or unloaded, and whether the pair 15 is drop connected through (CT). Based on these records and the type of service requested, LFACS 85 then selects an appropriate cable 17 and cable pair 15 to provide the requested service to the customer premise 13. However, as will be further discussed below, problems often later arise when the service is actually installed on the selected cable pair 15 since the records in LFACS 85 sometimes reflect incorrect or out-dated attributes for the selected cable 17 or pair 15. The particular cable 17, the cable pair 15, and associated attributes (collectively referred to as outside plant facility assignments) are then transmitted by LFACS 85 to the Assigning SOAC 83.

The Assigning SOAC 83 also determines if central office facilities are required, and, if so, then determines which of many COSMOS/SWITCH computer systems 67 contains the central office facility information such as switch ports 47 and the cable pair 15 point of termination on the MDF 43 within the central office 19 servicing the customer premise 13.

As mentioned above, COSMOS 67a and SWITCH® 67b are computer data processing systems that perform input, processing, storage, output, and control functions to accomplish a sequence of operations on data relating to items such as the location of each terminating cable pair 15 and switch port 47 within each central office. In general, COSMOS/SWITCH 67 supports inventory, assignment, and administration of central office facilities, inventory, and equipment. The prior art system 11 may be configured to use either COSMOS 67a or SWITCH® 67b. SWITCH® 67b is a newer system that is known in the art and sold by Bell Communications Research, Inc. (Bellcore) to replace COSMOS 67a. Once the appropriate COSMOS/SWITCH system 67 is selected, the Assigning SOAC 83 transmits a copy of the service order to the appropriate COSMOS/SWITCH system 67. This information is used by COSMOS/SWITCH 67 to select the central office facilities and equipment that will be used for installation of the requested service.

More specifically, COSMOS 67a or SWITCH® 67b computer system is used in the prior art for data processing information relating to central office operations such as MDF 43 records containing terminating cable pairs 15, line equipment, telephone numbers, tie pairs, etc. Based on the information contained on the service order, COSMOS 67a or SWITCH® 67b is programmed to access its appropriate database, and determine the point of termination on the MDF 43 in the central office 19 corresponding to the selected cable pair 15. COSMOS/SWITCH 67 also determines the location of an available switch port 47 for the NE 49. The locations of the point of termination on the MDF 43 and available switch port 47 are referred to collectively as part of the central office facility assignments. The central office facility assignments are then transmitted by COSMOS/SWITCH 67 to the Assigning SOAC 83. As will be discussed in more detail below, the location of the point of termination on the MDF 43 and the available switch port 47 are used by an inside frame technician 93 to install a jumper wire 45 connecting the switch port 47 to the outside cable pair 15 point of termination on the MDF 43. Furthermore, the central office facility assignments are also used by a switching technician 125 in determining the location for installation of the amplifier 51.

In the prior art system 11, if LFACS 85 or COSMOS/SWITCH 67 determines a problem or inconsistency exists based on the information stored in their respective computer databases, such as inconsistent records or a data mismatch, LFACS 85 or COSMOS/SWITCH 67 transmits a message requesting manual assistance to the Assigning SOAC 83. When the Assigning SOAC 83 receives this request for manual assistance, the Assigning SOAC 83 then transmits a message requesting assistance to a Loop Assignment Center Internal Operations Management System (LOMS). Some prior art systems 11 are configured to use a Provisioning Analysis Work Station (PAWS) system instead of LOMS. PAWS is known in the art and sold by Bellcore as a more efficient data processing system to replace LOMS. Therefore, LOMS and PAWS are referred to collectively as LOMS/PAWS 87. In general, LOMS/PAWS 87 refers to a computer data processing system that analyzes the request, and then distributes the request to either a facility assignment specialist person 89 or to a FACS Internal Resolution System Technology (FIRST) computer system 91 for resolution.

If LOMS/PAWS 87 determines that FIRST 91 is capable of correcting the problem, LOMS/PAWS 87 transmits the request including the error message to FIRST 91 for resolution and correction. FIRST 91, of Southwestern Bell Telephone Company, is used to provide for computerized handling and resolution of certain problems associated with service order requests that LFACS 85 or COSMOS/SWITCH 67 determine s should be handled manually by a facility assignment specialist person 89. More specifically, FIRST is an artificial intelligence (expert) system that emulates the transactions and decisions typically made by a facility assignment specialist person 89 to resolve requests for manual assistance generated by LFACS 85 or COSMOS/SWITCH 67. FIRST 91 is also used to provide consistency and integrity of information stored in LFACS 85 or COSMOS/SWITCH 67 computer database. FIRST 55 also continuously monitors and updates circuit location data stored in databases associated with LFACS 85 and TIRKS® 113 (discussed below in detail) to guarantee this data is synchronized. If FIRST 91 is able to resolve the problem, FIRST 91 accesses the LFACS 85 or COSMOS/SWITCH computer database to update or correct the information stored therein.

If FIRST 91 is not able to resolve the problem or if LOMS/PAWS 87 determines the problem is beyond the scope of FIRST's 91 capabilities, the message requesting assistance is input from LOMS/PAWS 87 to the facility assignment specialist person 89 via a computer printout or a computer monitor screen. The facility assignment specialist person 89 then analyzes the error message and manually resolves the problem. The resolution of the problem may require correction of the service order, updating and/or correcting LFACS 85 or COSMOS/SWITCH 67 databases, etc.

After COSMOS/SWITCH 67 determines the necessary central office facility assignments, this information is then transmitted to an inside frame technician 93 in one of two ways, depending upon whether COSMOS 67a or SWITCH 67b is used. If COSMOS 67a is used in the system 11, COSMOS 67a transmits the facility assignments associated with the service order and a request for installation of a jumper wire 45 to the frame technician 93 via a computer printout or monitor.

If SWITCH® 67b is used in the system 11, SWITCH® 67b inputs the service order to a computer controlled Frames Operation Management System (FOMS) 95 which is known in the art and sold by Bellcore. FOMS 95 is a computer system that stores the service order in its computer memory until a date or time that is predetermined by the SOP 71. On the set date, FOMS 95 transmits the facility assignments and a request for installation of the jumper wire 45 to the frame technician 93 via a display screen or a computer printout.

For designed services, COSMOS 67a or SWITCH 67b does not transmit this information to the frame technician 93 until the appropriate day or time as determined by the SOP 71. For example, if the SOP system 71 used is the SORD system, the QFD subsystem establishes a Frame Continuity Date (FCD) or Wire and Office Tested (WOT) date based on the due date. In this situation, the COSMOS 67a transmits this information to the technician 93 on the FCD or WOT date. For nondesigned services, the QFD system is not employed since the triggering date for the transmission of any information within the system 11 is the due date.

Upon receiving the notification from FOMS 95 or COSMOS 67a, the frame technician 93 installs the jumper 45 from the point of termination on the MDF 43 to the switch port 47, as determined by COSMOS/SWITCH 67. The frame technician 93 then logs onto a Frame User Assignment System Access (FUSA) computer system 97 if SWITCH® 67b is used in the system 11, or directly into COSMOS 67a. The frame technician 93 inputs into the computer memory of either FUSA 97 or COSMOS 67a information indicating that the jumper 45 installation is complete. FUSA 97 then transmits this information to the computer memory of SWITCH® 67b. COSMOS/SWITCH 67 updates and stores this information in its appropriate database. As will be discussed below, a switching technician 125 can fulfill the duties of the frame technician 93 in this situation to install the jumper 45.

When the Assigning SOAC 83 receives the outside plant facility assignments and the central office facility assignments, the Assigning SOAC determines which computer systems need to receive information relating to the service order to process and complete the installation of the requested service. The Assigning SOAC generates parsed service orders typically referred to as a SOAC image or SMIG for each downstream computer system involved in processing the service order. Each SMIG contains the necessary information that will be used by the particular downstream system receiving the SMIG, and is prepared in a format readable by that system. An image copy of the service order is appended to each SMIG in case additional information is required. If a particular system does not need the service order, the system discards the service order and retains the SMIG. In the discussion that follows, the image copy of the service order and SMIG are referred to collectively as the service order.

Once the Assigning SOAC 83 receives the outside plant facility assignments and central office facility assignments, the Assigning SOAC 83 determines if the NE 49 is involved with the service request. If the NE 49 is required, the Assigning SOAC 83 transmits information indicating the customer's telephone number and other attributes associated with the service order such a s the type of service requested to a computer memory management system known as a MARCH computer system 99. The MARCH computer system 99 formulates this information into computer commands referred to as translation packets in a format readable by the NE 49. The MARCH computer system 99 stores the translation packets in its computer memory until a set date. On the set date, the MARCH system 99 is programmed to transmit the translation packets to the NE 49. The NE 49 transmits an acceptance message to the MARCH system 99 acknowledging receipt of the translation packets.

It is also conventional practice in the prior art in the telecommunications industry to classify the transfer of information associated with processing a service order into one of three tiers. Tier 1 (or NET 1) typically refers to the initial general transmission of information relating to the service order to all the computer systems before any inside or outside facility assignments or work related functions are performed. In Tier 1, all computer systems are notified of the existence of a service order which may later require data processing functions by each system. A Tier 2 distribution of the service order is triggered in one of two situations: 1) when assignment information is required and generated by LFACS and/or COSMOS/SWITCH indicating what facilities are required to provide the requested service, and 2) when the Assigning SOAC determines assignment information is not required from LFACS or COSMOS/ SWITCH. Tier 3 (or NET 3) refers to the transmission of completion information to all computer systems indicating that the service order is complete, and the requested service and associated equipment has been installed.

A. Prior Art Nondesign Processes

Up to this point, the discussion of the prior art system 11 focused primarily on the processes used for designed and nondesigned services for generating a service order and assigning any necessary inside or outside facilities or equipment to the service order. Now the discussion of the prior art system 11 will focus primarily on the differences between computer systems used to process service orders relating to either prior art nondesigned services (FIG. 2) or prior art designed services (FIG. 3).

FIG. 2 sets forth the typical prior art system 11a that is currently used to provide installation of prior art nondesigned services such as POTS and coin services. In the prior art system 11a, Tier 1 distributions include the transmission of a copy of the service order from the SOP 71 to the Assigning SOAC 83, and then from the Assigning SOAC 83 to the computer memories of LFACS 85 and COSMOS/SWITCH 67.

Tier 1 also includes the transmission of a message (referred to as "Message 1") from the Assigning SOAC 83 to a Work Force Administration/Dispatch Out (WFA/DO) system 101. The WFA/DO system 101 is a computer data processing system that sorts, manipulates, processes, stores, inputs, outputs, and controls data relating to the work load and dispatching of outside technicians 103 for designed and nondesigned services. Message 1 notifies WFA/DO 101 that a pending service order exists for which WFA/DO 101 may be required to dispatch an outside technician 103. When WFA/DO receives Message 1, the service order is job logged and statused with a code such as pending facility assignments (PFA) indicating that WFA/DO is waiting notification in the Tier 2 distribution of whether facility assignments are required.

When WFA/DO receives the Tier 2 distribution of the service order from the Assigning SOAC, WFA/DO 101 analyzes the nature of each service order and the associated tasks to be performed, and dispatches an appropriate outside technician, if required. To determine whether an outside technician needs to be dispatched, WFA/DO is programmed to: (1) route the service order to determine which dispatch center is responsible for handling the service order to see that the work is completed; (2) map the service order to determine in which geographic area associated with the dispatch center the job is located (based on the customer address), and which manager, supervisory group and technician crew is associated with the particular area; (3) price the service order to determine how much time (in minutes), if any, is associated with the job to perform the work function; and (4) screen the service order to determine whether a field visit by an outside technician is needed based upon the time assigned when pricing the service order. If a technician does not need to be dispatched, WFA/DO changes the status code from PFA to pending autocomplete (PAC). If a field visit is necessary, WFA/DO changes the status code from PFA to pending load or pending dispatch. If manual assistance is needed to dispatch, WFA/DO changes the status from PFA to pending screen.

WFA/DO 101 also is programmed to establish a job type. The job type generally describes the basic type of work to be performed on the service order. For example, a job type may be IBEA which indicates Installation, Business, Exchange, Analog work type. To determine the job type, WFA/DO 101 first evaluates the type of job to determine the first character of the job type (I for installation, M for maintenance or R for routine). To determine the second character, WFA/DO evaluates the service order to determine whether the requested service is a prior art designed service having an ADSR FID. Since the ADSR FID is not used for prior art nondesigned services, WFA/DO evaluates the class of service (not the service code) to generate the second character of the job type which indicates the service order relates to a nondesigned, special, residence, business or coin service. While the service cod e remains on the service order, it is not considered in creating the job type since WFA/DO 101 processes the service order as a nondesigned order based on the class of service. The third character in the job type may be used to further defines the job (e.g., whether the job relates to cable trouble, fiberoptic, video or T.V.). The fourth character can be based on information associated with field identifiers used in the pricing and typing tables of WFA/DO.

After establishing the job type, WFA/DO 101 prioritizes or weights the service order to determine the order of processing and dispatching based upon the urgency with which the service order should be completed. For example, higher priority levels are typically associated with emergency situations or missed appointments, or can be established such that all service orders relating to business customers are processed before residential customers.

WFA/DO 101 also performs date and time calculations to determine information such as when the job must be started to satisfy the due date promised to the customer, the time (minutes) remaining until the due date, and whether special access is required at the customer premise for installation of the service (e.g., technician must be at customer premise between 8 a.m. and 10 a.m.). A work load manager may adjust date and time calculations for a particular job if overtime work needs to be performed to satisfy a due date or if the job needs to be started before the scheduled due date to satisfy the due date.

A work request is created in WFA/DO (in a usable format for WFA/DO) based on information associated with the service order and gathered in steps (1)–(4), the job type, and date and time calculations, indicating necessary information to dispatch a proper technician at the proper time to perform the necessary work to complete the service order.

Based on information contained in the work request, WFA/DO 101 performs force and work load selection when dispatch of an outside technician is required to determine which technician will work the service order. WFA/DO evaluates the geographic area in which the job is located to determine which supervisory group serves this area. WFA/DO then determines which technicians within the supervisory group have a technician profile that corresponds to the particular job type associated with the service request. For example, if the job type is IBEA, a technician having a profile of IA indicating the technician can perform tasks associate with any Installation of Analog services would be selected by WFA/DO, along with technicians having the profiles such as IBEA or I* (where * can be any character). For those technicians whose profiles match the job type, WFA/DO determines which days and hours these technician work, and which are available for this particular job. WFA/DO then weights the job and determines which available technician to dispatch based on factors such as the level of experience of each available technician (e.g., if a job takes approximately one hour to complete on average, a newly hired technician may require two hours to complete the job and an experience technician may require only 30 minutes), the type of account requesting installation of the service, and each available technician's distance from the job site.

When an outside technician accesses WFA/DO 101 via a technician access system (TAS) 105 and a technician access unit (TAU) 107 (discussed below), the technician inputs an employee code which is used by WFA/DO to identify the technician requesting a job. WFA/DO then determines the most suitable job for that technician based upon the factors discussed above. When WFA/DO 101 determines the best job match for the technician, WFA/DO transmits a copy of the service order to technician via the TAU 107 and TAS 105. WFA/DO 101 also changes the status of the job from "pending load" or "pending dispatch" to "dispatched."

If WFA/DO 101 determines that no tasks need to be performed by an outside technician, then WFA/DO 101 tests the cable pair for a new installation to ensure the requested service is working properly via a Mechanized Loop Testing (MLT) computer system 108. More specifically, WFA/DO transmits a list of telephone numbers to the MLT system 108 for testing. The MLT system accesses the cable and pair on the MDF to conduct a series of tests. The MLT system 108 verifies the condition of the loop and characterizes any trouble by performing numerous tests under computer control and transmits the test results to WFA/DO 101. For example, the MLT system 108 determines if the jumper(s) was installed by the frame technician, and whether the cable pair tests defective.

If a trouble condition is not indicated, WFA/DO 101 automatically completes the service order, and notifies the SOP 71 that the service order is complete.

If WFA/DO 101 determines that an outside technician needs to be dispatched, WFA/DO 101 selects an available outside technician 103 based upon the factors discussed above. The tables stored in WFA/DO can be configured to dispatch for certain action codes, USOC codes, and/or FIDs. Each outside technician accesses WFA/DO by logging onto a technician access system (TAS) 105 via a technician access unit (TAU) 107. The TAS 105 is a computer data processing system that is designed to assist the outside technician by performing functions such as transferring information and data between WFA/DO 101 and the outside technician 103 so that the outside technician can obtain new or current job information from WFA/DO, return jobs, or close out jobs.

Examples of technician access systems include a Technician Access Network (TAN) sold by Bellcore, an Universal Technician Remote Access (ULTRA) unit of Southwestern Bell telephone Company, and a Remote Force Access System (RFAS) of Southwestern Bell Telephone Company.

The technician accesses the TAS 105 using the TAU 107 such as a portable hand held unit or handset having a dual tone multifrequency key pad or any asynchronous device with dual tone multifrequency capabilities or through the use of various data devices such as lap top computers. Examples of TAUs include a Craft-Access unit sold by AT&T, a Melard unit, and a Random Colleague device. The TAS 105 allows the technician to communicate with other computer systems such as LFACS to perform a cable pair change for a line and station transfer (LST) for nondesigned services (discussed below), the MLT system 108 to request mechanized loop tests, and LMOS 111 (discussed below) to examine customer line records.

When the technician 103 logs into the TAS 105 via the TAU 107 and requests a new job, the TAU 107 accesses WFA/DO 101 and requests a new job or information on an existing job. WFA/DO 101 transmits a copy of the service order to the TAU 107 via the TAS 105. A copy of the service order appears on the screen of the TAU 107 for the selected technician 103.

The outside technician 103 then travels to the customer premise 13 to perform the tasks required to complete the service order. In addition, the technician 103 also conducts a series of tests which can include measuring loop loss, checking for dial tone, ring-back tests, and noise analysis. If the cable pair 15 is defective, the technician 103 performs a Line and Station Transfer (LST) to a different cable pair within the cable 17 using the TAS 105 via the TAU 107 to access LFACS 85. In this situation, LFACS 85 assigns a new cable and pair to the service, and updates the service order and all associated systems requiring the information indicating the new cable and pair including WFA/DO 101. If LST affects the point of termination on the MDF 43, different central office equipment must be assigned by SWITCH® 67b. In this situation, LFACS sends notification to SWITCH® 67b via the Assigning SOAC indicating that the office equipment will change. The frame technician is notified via FOMS to change the jumpers 45 based upon the new cable pair.

In the prior art system 11a, if the loop loss measured still exceeds an acceptable level after a LST, the technician 103 holds the service order for facilities and transfers the service order to cable repair to determine if there are excessive bridge taps, missing loading coils, and defective cable pairs. If cable repair is unable to correct the problem, the service order is sent to engineering to be processed using prior art design processes discussed below with respect to FIG. 3.

Once the technician 103 completes the tasks at the customer premise 13, the technician 103 logs into the TAS 105 via the TAU 107 and inputs completion information in response to a series of questions such as information indicating the length of time needed to perform regulated or deregulated work, whether an LST was performed, whether a drop-wire was present or needed to be installed, etc. The TAU 107 then transmits this completion information to the computer memory of WFA/DO 101. WFA/DO 101 data processes this information to complete the service order, and then transmits completion information to the computer memory of the SOP system 71.

The SOP 71 transmits the completion information associated with the completed service order, in a Tier 3 (NET 3) distribution to the Assigning SOAC 83. The Assigning SOAC 83 then notifies LFACS 85 and COSMOS/SWITCH 67 that the service order is complete. The SOP 71 also transmits a copy of the completed service order to the computer memory of a billing system 109, such as a Customer Record Information System (CRIS) or a Customer Access Billing System (CABS). In general, the billing system 109 is a computer data processing system that inputs an appropriate charge on the customer's account for any service order activity, such as establishing, rearranging or changing a service. The billing system 109 also generates bills for that customer based upon the completion information data.

In addition, the SOP 71 inputs a copy of the customer service record into the computer memory of a Loop Maintenance Operations System (LMOS) 111a or a Network Services Data Base (NSDB) 111b, depending on the configuration of the system 11a. LMOS and NSDB, referred to as LMOS/NSDB 111, are data processing systems having databases that contain historical information, including records indicating the types of services provided to a customer and the dates of installation for such services. LMOS/NSDB 111 store this information in their respective computer memories which may be accessed at a future time if maintenance or repair work is needed for the circuit. Typically, LMOS is used to store records in its computer memory relating to services installed using nondesigned services, and, as will be discussed below, NSDB 111b and TIRKS® 113 are used to store records relating to services install ed using designed services.

If the service order relates to a request to disconnect a prior art nondesigned service, the service order is processed using the prior art systems 11a set forth in FIG. 2. When the service order is transmitted to WFA/DO 101 on a Tier 2 basis, WFA/DO automatically completes the service order. The drop wire s extending to the customer premise usually are not removed so that service easily can be reactivated to the customer premise at a later date, if desired. A computer transaction is executed to turn off the switch and deactivate the service from the central office. Typically, no outside technician needs to be dispatched to disconnect the service.

B. Prior Art Design Processes

The discussion now shifts focus to examine the interaction and operations of the computer systems involved in processing service orders relating only to prior art designed services. As will be appreciated by those skilled in the art, the prior art design processes are extremely complex. Many aspects of the interrelationships between the prior art design systems are beyond the scope of necessary disclosure to understand the operation and advantages of the present invention in view of the prior art design processes and systems. It is not necessary to explore the detailed interrelationships of these prior art systems to understand the operation and advantages of the invention since the invention completely eliminates those systems used only in prior art design processes. The following discussion of the prior art design system is set forth as a general description of the prior art to illustrate the complexity of the prior art design processes, and to provide a greater appreciation for the simplicity and efficiency of the invention. As previously discussed, the systems discussed below are set forth to illustrate the functions, processes and methods used in the prior art to process service orders relating prior art designed services. Some systems, such as TIRKS®, are widely used throughout the telecommunications industry, while other systems may be unique to a certain telecommunication company or several companies. It is important to recognize that while the particular names and interconnections of the systems may vary from company to company, the underlying processes, functions and procedures are present throughout the industry. Specific types of computer systems are discussed herein to illustrate one possible configuration of the prior art system 11.

FIGS. 3 sets forth the typical prior art system 11b that is currently used to provide installation of prior art designed services to a customer at an acceptable loop loss across the cable pair 15. This prior art system 11b illustrates the complex prior art design process used in the telecommunication industry for: generating a service order in a computer network when a customer requests installation of an analog or digital telecommunication service at the customer premise 13; having the computer network access various databases to select a cable pair 15 to be used for installation of this service for that customer and locate the point of termination on the MDF 43 corresponding to that cable pair 15 at the central office 19; determining whether the design of a customized amplifier 51 or digital repeater is necessary to compensate for unacceptable loop loss based on the subscriber loop characteristics; designing an amplifier 51 or digital repeater when necessary; having the computer network access and search various computer databases to track and locate an amplifier 51 or digital repeater that satisfies the design requirements; shipping and subsequently inventorying the amplifier in the computer network; utilizing the services of at least one inside technician, an outside technician and a tester to properly install, test and adjust the amplifier 51; and then using the computer network to complete the service order and update all necessary customer records stored in various computer databases to reflect the installation of the amplifier 51 and the design settings used on the amplifier 51 to reduce excessive loop loss.

Prior art system 11b (FIG. 3) generally includes a computer network containing a plurality of computer systems having a various databases stored in associated computer memory. System 11b also can employ the services of a design engineer and/or CPC clerk, a frame technician, an inside switching technician, an outside technician, a Material Distribution Center (MDC) technician, and a tester, depending upon the nature of the service requested by the customer. The prior art system 11b uses or accesses a Trunks Integrated Records Keeping System (TIRKS®) computer data processing system 113 to process a service order, and NSDB 111b and a Work Force Administration Control (WFA/C) computer system 115 to maintain customer line records that indicate information such as the type of service (s) provided to the customer, dates of installation, cable and cable pair information, central office equipment and connections. As will be appreciated by those skilled in the art, it is also possible to configure the prior art system 111b such that the customer line records are maintained by WFA/C 115 and TIRKS® 113 without using NSDB 111b. However, this alternative configuration of the prior art system 11b (bypassing NSDB 111b) is not discussed herein.

In general, TIRKS® 113 is a computer system that performs input, processing, storage, output and control function on data associated with all service orders relating to designed services. TIRKS® 113 also stores, maintains and updates all designed service circuit information including interoffice tie pairs (if any) and settings for the customized amplifier 51 in its databases. As will be appreciated by those familiar with prior art design processes and systems shown in FIG. 3, TIRKS® is a very complex system including many modules or subsystems such as GOC (Generic Order Control), CDOC (Circuit Document for Operations Craft), EDIIS (Event Driven Interproject Interface System) that generate and transmit various information to other computer systems, often simultaneously. In the following prior art discussion, reference typically is made to TIRKS® in a general sense, without making specifically referencing the operation of each module associated with TIRKS®.

NSDB 111b is used in the prior art system 11b as a computer data processing system that includes historical information and records stored in its computer databases indicating information such as types of services provided to a customer, all information relating to communications services that are pending installation or previously installed, and dates of installation of such services. The NSDB system 111b performs input, processing, storage, output and control functions on data associated with each service order.

WFA/C 115 is a computer data processing system that analyzes the nature of each service order and the associated tasks to be performed to determine if the services of an inside technician 125, and/or and outside technician 103, and/or a tester are required to complete a service order. WFA/C 115 determines the dispatching center that provides the loading and scheduling control for the communications company's work force, and transmits a copy of the service order to the appropriate dispatching center(s). WFA/C tracks the tasks to be performed by each dispatch center, and tracks critical dates associated with each task. The interaction of these systems is set forth in greater detail below.

Prior art system 11b uses many computer databases and systems in addition to those previously discussed with respect to the prior art system 11a for nondesigned prior art services, some of which are sold by Bell Communications Research, Inc. (Bellcore), and are widely used throughout the telecommunication industry. Other computer databases and systems used in system 11b have been created by telecommunications companies or other vendors. While the particular computer systems or databases employed at each telecommunications company may vary in name, title or configuration, the overall function of each system and/or content of each database (represented by the blocks in FIG. 3) typically is present in the prior art systems 11b used in the telecommunication industry to generate and process a service order relating to the installation of analog or digital designed services across a cable pair 15.

As discussed above, when the service order relates to designed services, the SOP 71 transmits a copy of the service order to the Tandem SOAC 81 instead of the Assigning SOAC 83. The Tandem SOAC 81 then transmits a copy of the service order and a request for assignment information to the appropriate Assigning SOAC 83 (Tier 1). The operations of the other computer systems comprising FACS 79 shown in FIG. 3 are identical to those discussed above with respect to prior art system 11a shown in FIG. 2. For Tier 1 distributions relating to designed services, the Tandem SOAC 81 also simultaneously transmits a copy of the service order to TIRKS® data processing system 113 and the NSDB system 111b. When NSDB 111b receives the service order from the Tandem SOAC 81, NSDB transmits a SMIG or parsed copy of the service order to the computer memory of WFA/C 115. WFA/C then transmits a SMIG or parsed copy of the service order to WFA/DO 101. In an alternative embodiment of prior art system 11b (not shown), the Assigning SOAC 83 can directly transmit the entire service order to WFA/DO 101.

Referring now to Tier 1 distributions to TIRKS® 113, the Tandem SOAC 81 transmits a Message 1 to TIRKS® 113 including a copy of the service order and a request for acknowledgment of receipt of the service order. When TIRKS® 113 positively acknowledges to Tandem SOAC 81 receipt of Message 1, the Tandem SOAC 81 transmits a Message 2 to TIRKS® 113 confirming the positive acknowledgment from TIRKS® 113.

As discussed above with respect to FACS 79, the Assigning SOAC 83 gathers necessary assignment information indicating any outside plant facility assignments (e.g., the cable 17, cable pair 15, and cable pair 15 attributes) from LFACS 85 and/or central office facility assignments (e.g., location of the switch port 47 associated with the NE 49, and location of the point of termination on the MDF 43) from COSMOS/SWITCH 67. The Assigning SOAC 83 transmits this information to the Tandem SOAC 81, and then the Tandem SOAC 81 transmits a Message 3 (at TIER 2 distribution) to TIRKS® 113 which conveys the assignment information.

Upon receipt of the information contained in Message 3 (Tier 2), TIRKS® 1113 is programmed to generate a copy of the service order which includes the assignment information, and transmit this service order to either a printer to obtain a hard copy of the service order or to a display terminal for design review. As will be discussed below, TIRKS® 113 generates a Work Order Record and Details (WORD) document indicating the design parameters of the circuit based on the circuit characteristics. Prior to issuance of the WORD document, TIRKS® 113 sends notification to NSDB and WFA/C (either directly or through NSDB) indicating that issuance of the WORD document is pending (i.e., a "pending WORD" notifier). TIRKS® also transmits WFA/C 115 any critical dates that need to be satisfied prior to the installation of the service, such as the DVA, WOT, and RID dates so that WFA/C 115 can track these critical dates. Each date represents a deadline requiring the services of at least one work group or technician that has to be satisfied in a particular sequence prior to the installation of the designed service.

When generating the WORD document for certain types of service requests, the prior art system 11b may be configured such that either a clerk 117 typically located in a Circuit Provisioning Center (CPC) or an expert system such as a TaskMate computer system 119 accesses a work list created by and stored in TIRKS® indicating all circuits that require design or review for design. TaskMate 119 provides for computerized handling of certain design parameters stored in TIRKS® 113 associated with high volume locations and circuit types that otherwise would be handled repeatedly by either the clerk 117 or a design engineer 121 on a manual basis. The CPC clerk 117 or TaskMate 119 enters a command into TIRKS® 113 to send information relating to the circuit (e.g., cable, pair, customer location, type of service requested) to a module of TIRKS® called a Facility and Equipment Planning System (FEPS). FEPS maintains and processes prescription designs for certain circuit models associated with high volume addresses or locations, including design parameters for customized amplifiers or digital repeaters, if needed.

Each FEPS model sets forth the design parameters for those cable pairs extending to the same address or customer premise such as large office buildings so as to eliminate the need for a design engineer to perform repetitive design tasks each time a request for installation of certain designed service to that address is processed. If a predesigned model exists in FEPS for the type of service requested, TaskMate 119 or the clerk 117 extracts the model from FEPS, and inputs the model information into a TIRKS® module called Circuit Document for Operation Craft (CDOC) (discussed in greater detail below) so that CDOC can use this information when generating a WORD document. However, problems can arise when using the FEPS models if the cable pair extending from the central office to the customer premise is changed, and the associated FEPS model is not updated or modified to reflect the changed circuit characteristics.

If no model exists in FEPS or if the requested service is not modeled in FEPS, a design engineer 121 typically located in the CPC analyzes the service order, and designs the circuit based on the characteristics of the selected cable 17 and pair 15 that appear in the assignment section of the service order. The CPC design engineer 121 analyzes the information provided, and estimates the loop loss that would be present at the network interface 29 located at the customer premise 13 for the subscriber loop on which the designed service is to be installed. Unfortunately, this process of estimating the loop loss for a particular circuit often is inaccurate and nothing more than an educated guess, since the records maintained in LFACS 85 are often outdated, or the records do not accurately reflect the actual characteristics of the particular cable pair 15 such as missing load points, inaccurate loadings, or bridge tap.

If the design engineer 121 estimates the loop loss to be within an acceptable range at the network interface 29 for signal transmission associated with the requested designed services, an customized amplifier 51 or digital repeater does not need to be designed by the engineer 121 to overcome any unacceptable excessive loop loss. These services and circuits are still considered "designed" since they pass through the design review processes, regardless of whether any equipment is installed at the customer premise, central office or along the line. However, since the range of acceptable loop loss for designed services is very narrow, an increased risk of unacceptable signal transmission across the cable pair 15 exists if the engineer 121 mistakenly classifies the circuit as not requiring an amplifier 51 for analog service or a repeater for digital service.

If the design engineer 121 estimates that the loop loss exceeds approximately 4 dB to 4½ dB for designed analog special services, the engineer 121 designs a customized amplifier 51 for installation at the central office 19 between the switch port 47 and the point of termination on the MDF 43 as shown in FIG. 1. For digital service, the design engineer designs regenerative repeaters for installation at the central office and/or along the line based upon factors such as the loss along the line, cable characteristics, and the distance between the central office and the customer premise. Certain new models developed by a design engineer are entered into FEPS when the requested service is provided to a high volume location to avoid the need to redesign a comparable circuit for a subsequent service request. As previously discussed, regardless of whether a customized special equipment is required to condition a particular circuit, the circuit and service are considered "designed," and, as will be discussed below, the records are maintained in TIRKS® 113, NSDB 111b and WFA/C 115.

After analyzing the circuit characteristics, the engineer 121 can log into the TIRKS® system 113 and input information indicating whether the designed service requires installation of an amplifier 51 at the central office 19 for analog services or repeater for digital services. If the amplifier 51 or regenerator is needed, the engineer 121 also inputs into TIRKS® 113 the design requirements indicating the type and settings of the equipment. Alternatively, the engineer can build a model in FEPS, and reinitiate processes associated with extracting model information from FEPS via TaskMate 119 (or a clerk 117) to create the WORD document.

The CDOC computer module associated with the TIRKS® computer system 113 generates the WORD document that is stored in TIRKS® 113 based on the model information received from FEPS or design information input by the design engineer. The WORD document includes design parameters indicating whether an amplifier or digital repeater is needed, and, if so, the design requirements associated the amplifier or digital repeater such as type of amplifier needed and settings on the amplifier. The WORD document also includes information relating to the nature of the requested service, circuit work location, equipment counts, and certain critical dates. TIRKS® 113 then transmits the WORD document to other computer systems used in the prior art system 11*b* as discussed below.

When Tier 2 distribution occurs, Tandem SOAC 81 also transmits to NSDB 111*b* the assignment information. NSDB transmits a copy of the Tier 2 distribution information to WFA/C 115. WFA/C 115 transmits a parsed copy of the service order (SMIG) with an indication that a WORD document is pending to WFA/DO 101. In an alternative configuration of the prior art system 11*b* (not shown), the Assigning SOAC can directly transmit a copy of the entire service order to WFA/DO.

When TIRKS® generates and issues the WORD document, TIRKS® transmits a copy of the WORD document to the computer memory of WFA/C 115 and NSDB 111*b*, and a parsed copy of the WORD document including critical dates and due dates to a Work Force Administration/Dispatch In (WFA/DI) computer system 123 (discussed below) and WFA/DO 101 via the CDOC module. If there are any changes to the critical dates or due dates, WFA/C 115 transmits a message to WFA/DO 101 and/or WFA/DI 123 indicating any changes to approaching due dates. The WORD document is also appended to the service order stored in SORD by TIRKS®.

As mentioned above with respect to prior art system 11*a*, WFA/DO 101 is a computer data processing system that sorts, manipulates, processes, stores, inputs, outputs, and controls data relating to the scheduling of outside technicians 103. When WFA/DO 101 receives the WORD document, WFA/DO changes the status of the service order from pending WORD to pending load or pending dispatch. WFA/DI 123 is a computer data processing system, that sorts, manipulates, processes, stores, inputs, outputs and controls data relating to the scheduling of inside switching technicians 125 in processing service orders to manage the work force and tasks that need to be performed. WFA/DI 123 generates daily work loads for switching technicians based on the number of tasks to be performed and the amount of time associated with each task WFA/DI also receives from TIRKS® (CDOC) copies of CDOC drawings illustrating the circuit configuration and counts indicating the quantities of equipment that need to be installed (e.g., four jumpers and one amplifier).

Based on the issued WORD document, TIRKS® (through its EDIIS module) notifies a Plug-in Inventory Control System (PICS) 127 through a TIRKS/PICS interface (TPI) that a certain type of customized amplifier (or plug) 51 is required. PICS 127 is known in the art and sold by Bellcore, and is used in the prior art systems 11*b* as an administering and controlling system to continuously monitor and track the inventory of plugs or amplifiers 51 that are typically treated as capital investments (including amplifiers 51) within a telecommunication company. PICS 127 accesses tables stored in its computer memory to determine whether any spare amplifiers 51 are present at the central office 19 where the amplifier 51 needs to be installed (i.e., the serving central office). If no amplifiers (plugs) 51 are available at the serving central office 19, PICS 127 accesses inventory records stored in its computer memory to determine if the inventories of adjacent central offices, or inventories of central offices within close proximity contain any available amplifier that satisfy the requested type.

If still no spares are available or located, PICS 127 transmits a request to a computer controlled warehouse inventory control system such as Logistics Integrated Control (LOGIC) 129. Based on the requirements set forth in the service order, LOGIC checks its database to see if a suitable amplifier is available at the warehouse, and if so, its location within the warehouse. LOGIC notifies a Material Distribution Center (MDC) if a suitable amplifier is available at the warehouse. The LOGIC system 129 is an integrated warehouse control system that uses bar coding and radio frequency (RF) terminals to improve the date accuracy of material flow at the MDC.

If MDC has any amplifiers or plugs 51 in inventory that satisfy the design requirements of the WORD document, an MDC technician 131 retrieves it from a shelf at the MDC and sends it to the appropriate central office 19. If no amplifier 51 is available at the MDC that satisfies the requested type, a MDC technician 131 orders the amplifier from the manufacturer or vendor. It typically takes between three to five business days after the order is entered into LOGIC 129 to receive the amplifier 51 from the MDC at the appropriate central office 19. When the amplifier 51 arrives at the serving central office 19, a switching technician 74 receives the amplifier 51, and then installs the amplifier 51 between the switch port 47 and the point of termination on the MDF 43 on or before the appropriate critical date (e.g., the wire office and tested (WOT) date).

When the WORD document is issued by TIRKS 113, WFA/C transmits messages to WFA/DI and WFA/DO (if required) indicating the WORD document is no longer pending. WFA/DI and WFA/DO then change their status from pending WORD to pending dispatch or pending load. On the appropriate critical dates, WFA/DI and/or WFA/DO dispatch necessary inside and/or outside technicians.

More specifically, on the date the cable and pair must be wired and office tested (the WOT date), WFA/DI dispatches an inside switching technician to wire the amplifier in the central office, if required. The inside switching technician 125 is notified of the service order, due dates and information regarding the cable pair 15, location of the point of termination on the MDF 43 at the central office 19, and the location of the switch port 47 of the NE 49 by logging directly into the WFA/DI system 123. No additional access equipment or system is needed. If the amplifier is installed, the switching technician logs into WFA/DI to indicate the amplifier is installed. If an amplifier is not required, the switch technician responds on the WOT date that no amplifier is needed. If the technician needs additional information that is not included in the parsed WORD document, the technician can access WFA/DI, and WFA/DI retrieves a copy of the nonparsed WORD document from WFA/C which is then transmitted to the switching technician via WFA/DI.

On the WOT date, FOMS 95 or COSMOS 67*a* sends a work request to the inside switch technician or the frame technician to install one or more frame jumpers. The technician installs the jumpers as discussed above and shown in FIG. 1 between the MDF 43 and switch port 47 and between the tie frame, if necessary. When the jumper(s) is installed, the frame technician accesses FUSA 97 or COSMOS 67*a* to input information indicating the work request is complete.

When the inside switching technician 125 inputs information into WFA/DI 123 indicating the central office equipment is installed and the WOT date is satisfied, WFA/DI 123 notifies WFA/C 115. WFA/C 115 then creates a work list for a tester 133 indicating the inside technician completed his or her duties associated with the WOT date. The tester 133 logs into a Test Operating System (TOS) 135 that is used for testing analog and digital special services, such as a Remote Access Test (REACT) system sold by Hekimian Laboratories. The TOS 135 system then accesses one or more analog or digital testing systems 137 such as a Switched Access and Remote Test System (SARTS). Alternatively, the tester can directly access the testing vehicles 137 such as SARTS. The testing vehicle(s) 137 conducts a series of tests to verify the continuity of the cable (the cable is operational and contains no shorts or grounds). The testing vehicles 137 are used by the tester 133 or TOS 135 to measure cable pair 15 attributes such as decibel loss on a cable pair 15, the current supplied across the pair 15, the presence and amount of loading on the pair 15, and the bit error rate of digital signal transmission.

When the testing system 137 completes the tests, the tester manually inputs the test results into WFA/C 115. If the tests fail, WFA/C notifies WFA/DI that the switch technician must correct any problems at the central office. WFA/DI transmits this information to the switch technician, and the technician correctly wires and retests the cable. When the problems are corrected, the switch technician inputs information into WFA/DI indicating that the work is completed, and WFA/DI notifies WFA/C. WFA/C generates another work list that is sent to the tester, and the tester retests the cable using the testing vehicles 137. When the tests indicate the cable is operational, the tester inputs the test results into WFA/C, WFA/C posts a frame continuity date (FCD) indicating all tests indicate continuity of the cable.

On or before a plant test date or the due date, WFA/C 115 transmits a copy of the service order to WFA/DO if outside technician involvement is indicated. WFA/C 115 also generates another work list, and transmits that work list to the tester. The tester then contacts the switch technician 125 and the outside technician 103 to coordinate their schedules and set up appointments so that the inside switching technician located at the central office, the outside technician located at the customer premise and the tester access the line at the same time to conduct a series of tests on the circuit until the proper gain and slope are obtained to provide working service with a 4 dB loop loss at the network interface located at the customer premise. These tests require the services of these three people 133, 125, 103 for generally at least 45 minutes, and can take as long as several hours to complete.

When outside field work needs to be performed, WFA/DO 101 selects and dispatches an outside technician on the plant test date and/or due date, and transmits a parsed copy of the WORD document and service order to the outside technician via the TAS 105 and the TAU 107. If an outside technician does not need to be dispatched, the service order is statused to the tester 133.

As mentioned above with respect to prior art system 11a, WFA/DO 101 analyzes the nature of each service order, the associated tasks to be performed, and dispatches an appropriate outside technician, if required. More specifically, WFA/DO 101 is programmed to: (1) route the service order to determine which dispatch center is responsible for handling the service order to see that the work is completed; (2) map the service order to determine in which geographic area associated with the dispatch center the job is located (based on the customer address), and which manager, supervisory group, and technician crew is associated with this area; (3) price the service order to determine how much time (in minutes), if any, is associated with the job to perform the work function; and (4) screen the service order to determine whether a field visit by an outside technician is needed based upon the time assigned. WFA/DO also changes the status code from PFA to pending load or pending dispatch (or pending screen if manual assistance is needed to dispatch).

As in prior art system 11a, WFA/DO then establishes a job type. The job type generally describes the basic type of work to be performed on the service order. As in the prior art system 11a, a job type may be ISEA which represents a Installation, Special, Exchange, Analog work type. To determine the job type, WFA/DO first evaluates the type of job to determine the first character of the job type (I for installation, M for maintenance or R for routine). To determine the second character, WFA/DO examines the service code to determine if the requested service is a prior art designed service having the ADSR FID associated with the service order. Since all service orders processed under prior art system 11b include the ADSR FID, WFA/DO does not consider the class of service USOC. The third character in the job type may be used to further define the job (e.g., whether the job relates to cable trouble, fiberoptic, video or T.V.). The fourth character often is used to further define the job, and can indicate information associated with field identifiers used in the pricing and typing tables of WFA/DO.

As discussed above with respect to prior art system 11a, after establishing the job type, WFA/DO 101 prioritizes or weights the service order to determine the order of processing and dispatching based upon the urgency with which the service order should be completed. WFA/DO also performs date and time calculations to determine information such as when the job must be started to satisfy the promised due date, the time (minutes) remaining until the due date, and whether special access is required at the customer premise for installation of the service.

A work request is created in WFA/DO based upon the information associated with the service order, the information gathered in steps (1)–(4), the job type, and date and time calculations, indicating necessary information to dispatch a proper technician at the proper time to perform the necessary work to complete the service order.

Based on information contained in the work request, WFA/DO 101 performs force and work load selection when dispatch of an outside technician is required using the procedures discussed above with respect to prior art system 11a to determine which technician will work the service order based on information such as the technician profile, technician availability, priorities associated with the job, due dates, time commitments, technician experience and qualifications, geographic area worked, and travel distance.

The outside technician 103 can transmit to, or receive from, WFA/DO 101 information relating to the installation of the special service via the TAU 107 and TAS 105. As discussed above with respect to prior art system 11a, the TAS is a computer data processing system that is designed to assist the outside technician by performing functions such as transferring information and data between WFA/DO 101 and the outside technician 103 to obtain new or current job information from WFA/DO, return jobs, or close out jobs. The technician accesses the TAS 105 using the TAU 107 such as a portable hand held unit or handset having a dual tone multifrequency key pad or any asynchronous device with dual tone multifrequency capabilities or through the use of various data devices such as lap top computers.

When the outside technician accesses WFA/DO 101 via the TAU 107 and TAS 105, the technician inputs and employee code which is used by WFA/DO 101 to identify the technician requesting the job. WFA/DO then determines the most suitable job for that technician based upon factors discussed above. When WFA/DO determines the best job match for the technician, WFA/DO transmits a copy of the service order to the technician via the TAU 107 and TAS 105. WFA/DO 101 also changes the status of the job from pending load or pending dispatch to dispatched. Based on the information transmitted to the TAU 107 by the TAS 105, the outside technician 103 connects the selected cable pair 15 to the network interface 29 located at the customer premise 13. When the outside technician completes the necessary work at the customer premise to provide working service, the technician inputs necessary completion information into the TAS 105 via the TAU 107. The TAS 105 then transmits the information to WFA/DO 101.

The completion information input by the outside technician and the inside technician is transmitted from WFA/DO and WFA/DI 123, respectively, to the computer memory of WFA/C 115. When working service is established, the tester 133 logs into WFA/C to complete the work list in WFA/C. The tester also completes the service order in WFA/C after WFA/DI and WFA/DO transmit the completion information to WFA/C. WFA/C is accountable for the entire circuit. If multiple work locations (customer premise) are involved, WFA/C holds the service order until each work location has completed the necessary work for installation of the service.

When all work locations are statused complete, WFA/C 115 then processes the completion information data to TIRKS® 113. When TIRKS 113 receives the completion information from WFA/C 115, TIRKS® changes the status of the service order from pending to complete. Then, either an installation control clerk or an expert system such as FIRST 91 or TaskMate 119 accesses TIRKS® 113, and requests a report indicating all service orders whose status changed yesterday from pending to complete. This report is typically called an Orders Completed Yesterday (OCY) report. Information based on the OCY report is then input into the SOP by either the clerk or the expert system. More specifically, the clerk can manually input this completion information into the SOP, or the expert system can extract completion information from the OCY report and automatically transmit this information to the SOP. As will be appreciated by those familiar with the prior art, it is also possible to configure the prior art system 11b such that WFA/C 115 transmits the completion information directly to the SOP 71. As discussed above, the transmission of the completion information to the various computer systems is often referred to as Tier 3 distributions. The SOP 71 generates Tier 3 completion information and inputs the completion information to the computer controlled billing system 109 such as a Customer Record Information System (CRS) or a Customer Access Billing System (CABS). The billing system 109 processes the completion information data, and inputs an appropriate charge on the customer's account for installation of the special service. The billing system send this information to BOSS 77 to update the customer records stored in its computer memory.

In Tier 3, the SOP 71 transmits completion information to the Tandem SOAC 81. The Tandem SOAC 81 transmits the completion information to the Assigning SOAC 83.

The Assigning SOAC 83 inputs this information to LFACS 85 and COSMOS/SWITCH 67. In system 11b, Tandem SOAC 81 inputs the completion information into NSDB 111b. NSDB 111b then processes this information to complete and update the customer records to reflect the installation of the designed service. NSDB 111b stores in its computer memory all customer information, records of customer equipment, and circuit design information. The information stored in the computer memory of NSDB 111b may later be accessed for any repair service reports.

NSDB 111b inputs the completion information in to WFA/C 115. In system 11b, TIRKS® 113 transmits this information to WFA/C 115. WA/C 115 acknowledges receipt of the service order completion information to NSDB 111b. WFA/C then purges part of the service order from its memory, while retaining header information indicating the circuit number, the working status of the circuit, and other basic information used to identify the circuit. When a repair request is processed by the system 11b, WFA/C 115 is programmed to access to NSDB 111b to retrieve the customer line records indicating any information associated with the circuit, if needed, to facilitate the repair.

After the completion information is transmitted to the appropriate systems, the service order is purged from the SOP 71 since it is already stored in some capacity in the computer memory associated with LFACS 85, SWITCH® 67b or COSMOS 67a, the billing system 109, TIRKS® 113, NSDB 111b, and WFA/C 115.

If the service order relates to a request to disconnect a prior art designed service, the service order is processed using the prior art systems 11b set forth in FIG. 3. If a customized amplifier is installed at the central office, PICS sends a shipping notifier (via mail) to the central office indicating the customized amplifier associated with the service that was disconnected needs to be returned to the MDC. The notifiers are filed and tracked based on the due date. However, often the amplifier is not removed at the time of disconnect since customers frequently request reinstallation of the service shortly after it is disconnected. If another customer requests installation of a prior art designed service requiring installation of an amplifier before the amplifier associated with the disconnected circuit is returned, that amplifier may be reused on the new circuit and never shipped back to the MDC. Notifiers and records relating to amplifiers that are reinstalled and not returned to the MDC often are not properly updated to reflect the reinstallation of the amplifier. As a result, many amplifiers are not properly accounted for in the inventory records. Other problems arise when the customer changes the date for disconnecting the service. In this situation, PICS sends a first notifier to the central office to remove the amplifier on the original due date, and then sends another notifier to the central office to remove the amplifier on the later rescheduled date. The central office must check manually the status of the service order each time a notifier is sent from PICS to determine if the service order is valid or has been canceled. Clearly these procedures for tracking and returning amplifiers associated with disconnected services are inefficient and require tremendous manual intervention.

IV. PRIOR ART MAINTENANCE AND REPAIR PROCESS

The invention finds application not only for installation of locally switched services, but also for maintenance and repair of circuits installed using prior art nondesign or design systems 11a, 11b, or the system 200 of the present invention. Therefore, it is necessary to examine the systems and processes used in the prior art to fully appreciate the advantages of the present invention. The following discussion generally sets forth typical embodiments of prior art repair systems for repair of services installed using prior art nondesign and design systems.

A. Trouble Report Relating to Service Installed Using Prior Art Nondesign Processes As shown in FIG. 4, when a repair service call is received at the telecommunications company relating to a circuit providing prior art nondesigned services, a customer service representative or the customer (through an interactive voice response system) accesses a computer system such as an Enhanced Customer Reporting System (ECRS) of Southwestern Bell Telephone Company to assist in preparing a trouble report. The customer or service representative inputs the circuit number and the nature of the trouble into ECRS. ECRS accesses LMOS 111a or NSDB 111b to retrieve the customer line records for that circuit. The ECRS system properly formats the line record information and information input by the service representative or customer for computer systems handling the trouble report. ECRS then inputs the information into the computer memory of LMOS/NSDB. LMOS/NSDB processes the information to generate a trouble report. Alternatively, the customer service representative can directly access LMOS/NSDB to generate a trouble report.

Prior to the issuance of the trouble report, LMOS 111a transmits necessary information for testing including the customer telephone number to a computer testing system 137 such as the Mechanized Loop Testing (MLT) system 108 that is known in the art. When the testing system 137 completes the test to determine the condition of the line (e.g., whether the line is open, short, grounded, and/or unbalanced), the testing system 137 transmits test result information to LMOS. LMOS 111a examines the test results and determines the severity of problems, formats the test information, and appends the information to the trouble report. LMOS then transmits this information and the trouble report to WFA/DO.

WFA/DO 101 examines the information, and determines if an outside technician 103 needs to be dispatched. If the circuit tests open in the central office, an outside technician does not need to be dispatched. In this situation, the inside technician is contacted to correct the problem and completes the trouble report. If an outside technician needs to be dispatched, WFA/DO statuses the trouble report as pending dispatch.

To determine whether an outside technician 103 needs to be dispatched, WFA/DO 101 performs functions similar to those discussed above with respect to prior art installation procedures. More specifically, WFA/DO typically performs the following functions: (1) routing to determine which dispatch center is involved; (2) mapping to determine which geographic area, manager, supervisory group, technician crew are involved; (3) zoning to further subdivide the geographic area involve to a cable and pair level; (4) job typing to establish a job type; (5) pricing to determine the average length of time to repair the service based upon the job type and test result codes; (6) prioritizing to determine the order of processing and dispatching; (7) assigning handling codes based on tables stored in WFA/DO; and (8) statusing the trouble report as pending load or pending screen (if manual assistance is needed to dispatch).

After completing the functions associated with (1)–(8), WFA/DO 101 dispatches an appropriate and available technician based on the force and workload selection procedures discussed above for prior art installation procedures when the technician logs into WFA/DO via the TAS 105 and TAU 107. WFA/DO 101 then restatuses the trouble report from pending load or pending dispatch, to dispatched. When, and if, the technician clears the trouble, the technician accesses the TAS 105 through the TAU 107 to input information indicating the nature of the trouble, how the trouble was corrected, the cause of the trouble, and any other pertinent information. The TAS 105 transmits this information to WFA/DO 101. WFA/DO, in turn, transmits the information to LMOS, and LMOS updates information stored in the LMOS customer line records to indicate information such as the last case of trouble.

If a cable pair is defective, the technician accesses LFACS 85 via the TAS 105. LFACS assigns a new cable pair (and possible a new cable), and updates the service order and all associated systems requiring the information indicating the new pair including WFA/DO 101. Based upon the new cable pair assignment, the technician 103 performs a Line and Station Transfer (LST) to the new cable pair. LFACS transmits (typically on a nightly basis) a common update file including completion information indicating the new cable and pair to LMOS/NSDB 111 via the Assigning SOAC 83 to update the customer line records to reflect any changes.

If a customized amplifier 51 needs to be installed on a circuit that previously did not have an amplifier installed thereon to correct the trouble with respect to a prior art nondesigned service, the outside technician typically contacts a maintenance (or dispatch) center, and the maintenance center contacts an outside plant engineer. The outside plant engineer contacts a Circuit Provisioning Center (CPC) for design review to determine what needs to be done to establish a working circuit. If the customized amplifier will correct the problem, then an appropriate amplifier is installed by the inside switch technician. Since this is an emergency situation, a spare amplifier located at the central office is typically used. After the amplifier is installed, the tester 133, outside technician 103 and switch technician 125 access the line to conduct a series of tests and make any necessary adjustment to provide working service to the customer premise. An order taker person 61 is contacted to issue a man-on-job service order to remove the service from nondesigned inventory to designed inventory. The entire prior art design process discussed above with respect to installation of a designed service is triggered, including the assignment functions performed by the FACS system 79 and the "design" functions performed by systems such as TIRKS®. This is necessary to update the inventory records to show the new circuit is assigned to a designed service. It is again noted that prior art nondesigned inventory typically is maintained by the FACS system and by LMOS, while prior art designed inventory typically is maintained by FACS 79, TIRKS® 113, WFA/C 115, PICS 127 and NSDB 111b.

In this situation, after the service order goes through the Tier 1 and Tier 2 distributions, a person such as a tester or individual at an installation control center must access WFA/DO and complete the service order using the outside technician information such as the technician crew number, time spent, and statistical information on the service order to trigger a Tier 3 distribution.

If the outside technician 103 dispatched to the customer premise 13 is unable to correct the problem at the customer premise by changing the cable pair (i.e., performing a Line and Station Transfer), or by adding a customized amplifier 51 or a digital repeater, the technician does not complete the trouble report to WFA/DO. Instead, the technician sends information to WFA/DO via the TAU 107 and TAS 105 indicating a cable repair technician needs to be dispatched. WFA/DO 101 then selects and dispatches a qualified cable repair technician based on force and work load selection processes associated with WFA/DO. The cable repair technician tests the cable to determine if it is necessary to dig up the cable to correct the problem (e.g., dig up the cable to add, remove, or correct loadings, or to remove a bridge tap to balance the line). If loadings need to be adjusted, the repair technician contacts outside plant engineers to determine which loading points may need to be replaced, added or removed. If the loading problems were created because an incorrect routine order (construction work order) was issued, then a subsequent work order must be issued. The routine order is referred to a construction management center (CMC), and construction personnel then are dispatched to correct loading problems and correct the customer problem.

B. Trouble Report Relating to Service Installed Using Prior Art Design Processes When a repair service call is received at the telecommunications company relating to a circuit providing prior art designed services, a customer service representative or the customer (through an interactive voice response system) accesses a computer system such as an Enhanced Customer Reporting System (ECRS) of Southwestern Bell Telephone Company. ECRS provides a common screen access to WFA/C 115 and LMOS 111a for the customer service representative to enter information associated with a trouble report. The customer or service representative inputs the circuit number and the nature of the trouble into ECRS. ECRS accesses WFA/C 115 and retrieves the header information stored in WFA/C. ECRS then creates and formats a trouble report based upon the nature of the trouble reported and the header information stored in WFA/C for that circuit. In the system 11b shown in FIG. 3, WFA/C 115 retrieves any additional information from the customer line records stored in the NSDB system 111b (or LMOS, depending upon the configuration of the system 11b) that are necessary to facilitate the repair of the circuit. Once WFA/C 115 receives all necessary circuit information, WFA/C 115 generates a work list, and transmits that work list to the appropriate tester 133. The tester 133 accesses TOS 135 which, in turn, access appropriate testing vehicles 137 based on the type of circuit to determine whether the source of the problem can be identified. Alternatively, the tester can directly access the testing vehicles 137.

If the tester 133 cannot determine what is wrong with the line, the tester 133 communicates by telephone with the inside switching technician 125 located at the central office 19 to request assistance. The tester 133 and the inside switching technician 125 both accesses the line at the same time, and the switching technician 125 conducts a series of tests to try to identify and correct the problem. If the circuit tests open in the central office, the inside switching technician corrects the problem and completes the trouble report.

If the amplifier 51 is defective, the switching technician 125 ascertains whether a maintenance spare amplifier 51 is available at that central office 19. If none is available, the switching technician 125 transmits a request to PICS 127 to see if PICS 127 can locate a spare amplifier 51 that satisfies the design requirements for this circuit. If no spare is available through PICS 127, PICS 127 transmits a request to LOGIC 129 and the MDC. The MDC technician 131 processes this special request immediately and ships the amplifier 51 using a priority mailing service. In the meantime, the switching technician 125 searches through other pending service orders, looking for an amplifier 51 that has similar design requirements that can be used instead of waiting for the amplifier 51 being shipped from the MDC.

As the new amplifier or plug 51 is installed by the switching technician 125 between the switch port 47 and the point of termination on the MDF 43, the tester 133 logs into WFA/C 115, and inputs a request for the assistance of an outside technician 103. WFA/C transmits the request and the trouble report to WFA/DO 101, and WFA/DO 101 transmits a copy of the trouble report to an outside technician 103 through the TAS 105 and TAU 107. Since this is a crisis situation, the outside technician 103 is also paged on a beeper and informed that a trouble report is coming which needs immediate attention. The outside technician 103 then travels to the customer premise 13 and calls the tester 133 upon arrival. The tester 133 then calls the switching technician 125, and all three access the line 15 together to test the circuit, identify the source of the problem, and establish working service. As discussed above with respect to the installation process, these tests and adjustments typically require the services of the tester 133, inside switching technician 125 and outside technician 103 for generally at least 45 minutes, and likely for several hours.

If the tester 133 and the switching technician 125 are not able to correct the problem and the amplifier is not defective, the tester 133 logs into WFA/C 115 and inputs a request for the assistance of an outside technician 103. As discussed above, WFA/C transmits the request and the trouble report to WFA/DO 101, and WFA/DO 101 transmits a copy of the trouble report to an outside technician 103 through the TAS 105 and TAU 107. The tester also pages the outside technician 103 to let him know that a trouble report is coming which needs his immediate attention. The outside technician 103 then travels to the customer premise 13 and calls the tester 133 upon arrival. The tester 133 then calls the switching technician 125, and all three access the line 15 together to test the circuit and try to realign the circuit.

If a cable pair 15 is defective (or changed while repairing the circuit), a line and station transfer is not performed. In this situation, the design requirements of the entire circuit may change when the cable pair changes, since the entire design is originally based on the attributes associated with the now defective cable pair 15. Therefore, the design process must be triggered. Typically, the outside technician contacts the tester 133, and the tester, in turn, communicates a request to the assignment specialist person 89 to select a new cable and/or pair. The CPC design engineer 121 is then contacted, and accesses the FEPS computer system associated with TIRKS® 113 to see if a model exists based on the new parameters associated with the new cable pair 15. If no FEPS model exists, the design engineer then redesigns the entire circuit. Once the new design is determined, the clerk or engineer 121 issues a new WORD document in the TIRKS® system 113. TIRKS® distributes the WORD document to the same systems in the same manner discussed above with respect to the installation of the designed service using the prior art system 11b in FIG. 3. The tester examines the WORD document to determine if there are any changes to the amplifier settings based upon the new cable pair. If the amplifier settings change, the tester contacts the switching technician 125 to reset the amplifier, and contacts the outside technician to perform a line and station transfer. The tester, switching technician and outside technician 103 located at the customer premise 13 access the new line 15 simultaneously to conduct a series of tests and adjustments until working service is established.

When the circuit is repaired and operational, the outside technician accesses the TAS 105 via the TAU 107. The outside technician changes the status of the trouble report from dispatched to completed, and provides necessary information regarding what was done to correct the problem. The TAS transmits this information to WFA/DO 101, and WFA/DO, in turn, transmits the information input by the outside technician to WFA/C. The tester also accesses WFA/C to input completion information such as test results. WFA/C 115 transmits the information input by the tester and outside technician to NSDB. NSDB 111b updates its history stored in the customer line records to indicate the nature, type and timing of repair.

If an outside technician is not involved in the repair process, and if repairs are made within the central office, the tester completes the repair report in WFA/C and posts the repair report as completed.

If a customized amplifier needs to be installed on a circuit used to provide prior art designed service that previously did not have an amplifier installed thereon to correct the trouble, typically the tester or the outside technician contacts the CPC to instruct the CPC to issue a work request to install the amplifier. The CPC accesses TIRKS®, designs the circuit, and creates in TIRKS® a work request to install the amplifier. The entire "design" process discussed above with respect to the prior art installation processes for designed services requiring the installation of a customized amplifier at the central office is triggered, including the steps associated with determining the amplifier settings based on FEPS models or calculations by a design engineer, locating and shipping an available amplifier that satisfies the design requirements using PICS and LOGIC, having the inside switch technician install the amplifier, and employing the services of the inside switch technician, the outside technician, and the tester to conduct a series of tests and make any necessary adjustments to provide working service to the customer premise. No "assignment" functions associated with the FACS system 79 discussed above are needed in this situation. When the amplifier is installed and the work request is completed, completion information is transmitted to TIRKS®, NSDB, and WFA/C (not to the SOP or other provisioning systems associated with FACS).

V. PRIOR ART CONSTRUCTION PROCESSES FOR FIELD CABLE THROWS

The invention finds further application in the area of construction procedures used for field cable throws where the outside plant facilities that connect a particular customer premise to the central office are rearranged and/or changed. Since it is necessary to examine the systems and processes used in the prior art to fully appreciate the advantages of the present invention, the following discussion generally sets forth typical embodiments of prior art construction systems and processes used for field cable throws relating to cable pairs used to provide prior art nondesigned and designed services.

A. Field Throws of Cable Pairs Used to Provide Prior Art Nondesigned Services

When a cable transfer or throw is to be performed on a cable pair used to provide prior art nondesigned services, an outside plant engineer prepares cable throw work prints indicating the specific cable pairs that will be involved in the throw. The outside plant engineer sends the work prints to a construction management center (CMC) and the loop assignment center (LAC). The assignment specialist person 89 at the LAC inputs cable throw information into LFACS 85 in a pending status, and notifies the central office 19 if the central office is involved. The CMC schedules the date for the throw.

If the cable pair(s) 17 involved in the throw terminates at the MDF 43, then the assignment specialist person 89 sends a copy of the cable throw work prints to the central office since the throw requires rewiring in the central office by the frame technician 93. For nondesigned services, the frame technician 93 bridges the old cable pair and the new cable pair together with a jumper on the MDF 43 prior to the throw. After the splicer cuts to the new pair(s) and working service is established, the jumper is removed.

Prior to the scheduled date for the throw (typically at least one week prior), the LAC generates throw sheets based upon the work prints, and sends the throw sheets to the CMC. The CMC sends a copy of the throw sheets and work prints to an outside splicer.

On the scheduled date for the throw, the splicer performs the cable throw. The splicer then mails completion information to the CMC indicating the throw is complete and the new cable and pair associated with the service. The CMC notifies the assignment specialist person 89 at the LAC of the completed throw, and the assignment specialist person updates records associated with the LFACS 85 database to change the status information associated with the throw from pending to completed.

LFACS 85 transmits (typically on a nightly basis) a common update file including completion information indicating the new cable and pair to LMOS/NSDB 111 via the Assigning SOAC 83 to update the customer line records to reflect any changes.

B. Field Throws of Cable Pairs Used to Provide Prior Art Designed Services

When a cable transfer or throw is to be performed on a cable pair used to provide prior art designed services having a customized amplifier installed at the central office, an outside plant engineer prepares cable throw work prints indicating the specific cable pairs that will be involved in the throw. The engineer retrieves an abbreviated cable record report from LFACS 85 that lists all prior art designed services associated with the cable pairs involved in the throw based upon the ADSR FID stored in the assignment section of LFACS. The engineer determines the attenuation of the cable before and after the throw.

If the attenuation changes as a result of the throw, information regarding the cable throw and the change of the cable makeup is sent to the circuit provisioning center (CPC). A CPC engineer redesigns the circuit based upon the new attenuation of the cable, and enters information relating to the design characteristic into TIRKS® 113.

At the same time, the outside plant engineer sends copies of the work prints a construction management center (CMC) and a loop assignment center (LAC) to notify them of the pending cable throw. An assignment specialist person 89 at the LAC enters information relating to the pending cable throw into the LFACS 85 database in a pending status. The CMC then schedules the date for the cable throw.

If the cable pair(s) involved in the throw terminates at the MDF 43, then the assignment specialist person 89 sends a copy of the cable throw work prints to the central office since the throw requires rewiring in the central office by the frame technician 93. The tester 113 also notifies the frame technician of the cable throw number(s) indicating which cables are involved in the throw. For prior art designed services, the old cable pair is not bridged together with the new cable pair since the resulting loop loss would be excessive. Instead, each cable pair is thrown separately, on a pair by pair basis. In other words, the first cable pair is thorn, tested, and aligned (requiring the services of an inside switching technician, the outside technician and the tester while the splicer waits to throw the next pair), and then the next pair is thrown by the splicer.

Prior to the scheduled date for the throw, the LAC prepares throw sheets based upon the work prints that included to/from information (indicating the cable pair is being transferred "from" one cable "to" another cable). The throw sheets typically are sent to the CMC to post in their databases, and to the CPC to determine if the circuit needs to be redesigned. The outside plant engineer can alternatively send notification to the CPC that special services are involved. The SSC tester receives a copy of all special services involved in the cable throw and the scheduled throw date from TIRKS® 113 via WFA/C 115, and WFA/C generates a work list for the tester 133. The CMC mails a copy of the throw sheets and work prints to an outside cable splicer.

After the CPC engineer enters the design information into TIRKS® 113, TIRKS creates a new WORD document (through the CDOC module), and the WORD document is sent to the central office switching technician via WFA/DI.

On the day the throw occurs, WFA/DO 101 dispatches an outside special services technician 103 via the TAS 105 and TAU 107. The tester coordinates the cable throw by contacting the outside technician, the central office switch technician, and the splicer to set up a time for all of these parties to access the line to perform the cable throw. At the agreed upon time, the splicer throws the cable pair, and the tester, central office technician, and the outside technician conduct a series of tests to reset and/or realign the customized amplifier.

When the cable throw is complete, the splicer mails completion information indicating the throw is complete and the new cable and pair to the CMC. The CMC notifies the assignment specialist person 89 to update information stored in LFACS 85 to indicate the cable throw is complete. All downstream systems are updated with the new cable and pair information. More specifically, LFACS notifies the Assigning SOAC 83, the Assigning SOAC notifies COSMOS/SWITCH 67 and the Tandem SOAC 81, the Tandem SOAC notifies NSDB 111b and TIRKS® 113, TIRKS® notifies WFA/C 115, and WFA/C notifies WFA/DO 101 and WFA/DI 123.

The Present Invention

I. OVERVIEW

As the above discussion of the prior art illustrates, the prior art system 11 for processing service requests relating to the installation, maintenance and repair of prior art designed services is extremely complex and costly. Therefore, a system and method has been developed for processing a service request from the time the request is received at a telecommunications company through its completion relating to installation, maintenance or repair of any locally switched communications service using only new and improved nondesign processes. The invention also allows for improved construction procedures when a field cable throw is performed. The nondesign processes of the present invention apply to any analog or digital locally switched service, such as POTS, special, and coin services, including those services previously treated as prior art designed services. As used herein, the term "service request" includes, for example, service orders relating to installation of a new service or disconnection of an existing service, trouble reports relating to repair of an existing service, requests for maintenance of an existing service, or cable throw requests. These service requests are also sometimes called "work requests."

The system, referred to generally at 200, processes installation service requests relating to locally switched services in a more efficient manner than the prior art systems 11b by eliminating those systems, processes and functions associated with TIRKS® 113, Tandem SOAC 81, NSDB 111b, WFA/C 115, WFA/DI 123, TOS (REACT/SARTS) 135, PICS 127, LOGIC 129, and TaskMate 119. The system 200 also eliminates the need for systems such as TIRKS®, WFA/C and WFA/DI during repair of circuits used to provide services installed using the system. While the name and configuration of some of these prior art computer systems may vary throughout the telecommunications industry, all computer systems used in the prior art to perform the functions or operations associated with these systems, or used to perform only "design" processes or functions, are eliminated in the system 200. In addition, many of those computer systems used in the prior art systems 11a and 11b for assignment functions, such as those systems comprising FACS, are configured or programmed in the system 200 to operate differently and more efficiently than the prior art computer systems used for assignment functions. The system 200 also includes a new computer system (referred to as DUDAS 266) not present in the prior art system 11. DUDAS is designed to replace FMSN 73, and provide a more efficient and accurate process for managing dates and appointment times for the installation of a new service based upon technician availability.

The invention also eliminates the need for manual assistance previously performed by design engineers 121, testers 133, MDC technicians 131, FMSN operators 75, and inside switching technicians 125 in the prior art system 11. Moreover, the invention eliminates the use of a customized amplifier 51 or digital repeater at the central office 19 for prior art designed services. The invention also eliminates the need for the installation of digital network channel terminating equipment (NCTE) at the network interface for digital signal transmissions. Clearly, the system 200 provides a more efficient and less expensive alternative to the prior art systems 11a and 11b for installing, maintaining and repairing the circuits used to provide all locally switched telecommunications services by using improved nondesign processes, functions, and systems. The services performed by the SSC tester, the inside switching technician, the outside technician and CPC engineer for cable throws involving cables used to provide prior art designed services also are eliminated by the invention.

The disclosure of the preferred embodiment as set forth herein is not intended to be limiting, in that computer systems used in the present invention can be programmed in several alternative manners to achieve the same results, functions and/or operations as disclosed herein. Moreover, the specific types of computer systems set forth in the preferred embodiment can be replaced with equivalent computer systems or combinations of computer systems having different names or configurations so long as such computer systems perform in similar manner to achieve the substantially similar results, functions and/or operations as taught by the present invention.

While the invention is discussed in terms of its application to telecommunication services that are locally switched by one central office and do not require the use of any interoffice facilities to provide the requested service, it will be appreciated by those skilled in the art that the invention can easily apply to other services that are not locally switched and require interoffice facilities. In this situation, the inventory and information relating to interoffice facilities would be removed from TIRKS®, and maintained and assigned by SWITCH® 258b and LFACS 284. When a foreign servicing office (FSO) and a local serving office (LSO) are involved for multiple customer locations, two service orders would issue (one for the FSO and the other for the LSO) since an outside technician may need to be dispatched to each location. The interoffice facilities and assignments would be assigned on the service order for the customer premise served by the FSO. System 200 can be applied to services switched by a FSO that provides access to the local network if the facilities stored in TIRKS® are moved to SWITCH® (registered trademark of Bell Communications Research, Inc.) and LFACS. Situations involving interoffice facilities include when a FSO serves a single premise or off-premise extension, and when two customer locations are served by two central offices but those locations are locally switched out of only one central office.

II. INSIDE AND OUTSIDE FACILITIES AND EQUIPMENT

Figure 6:
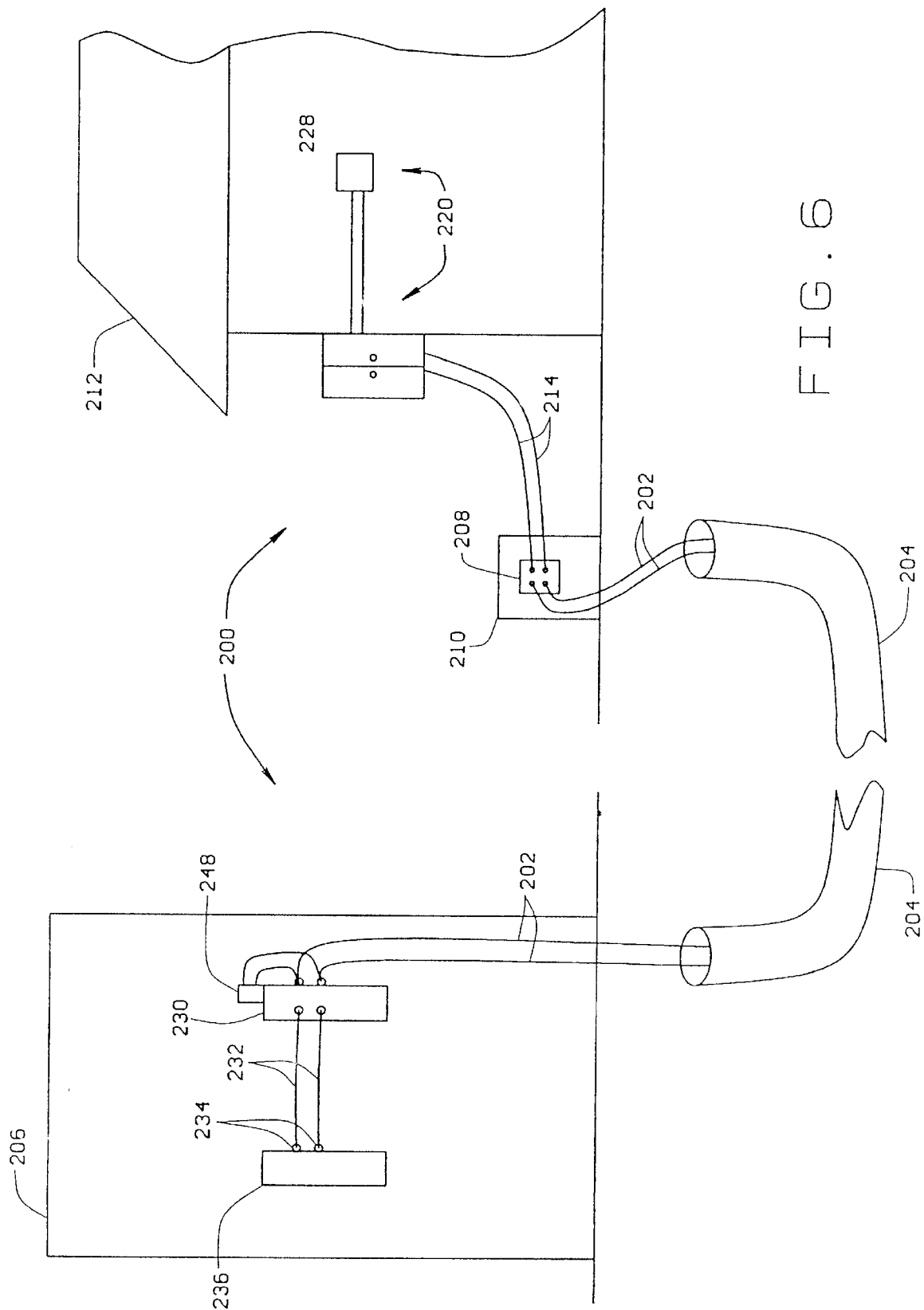
FIG. 6 is a schematic diagram of inside and outside telecommunications facilities and equipment used in the present invention to provide locally switched analog or digital analog service across an unloaded cable pair extending between a central office and a customer premise.

FIG. 6 schematically shows the inside and outside telecommunication facilities and equipment used to provide locally switched analog and digital services across a pair of conductors, wires, optical fibers or the like (referred to as a "cable pair") 202 located within a multi-paired cable 204. The cable pair 202 effectively extends from a central office building 206 to a terminal interface 208. The terminal interface 208 is generally contained in a housing 210 mounted to a telephone pole (not shown) or located on the ground in close proximity to a particular customer premise 212 to which the service in question is provided. Alternatively, the terminal interface 208 can be located within the customer premise 212.

Within the central office 206, each cable pair 202 terminates at a point of termination on a Main Distributing Frame (MDF) 230. As will be discussed below, the MDF 230 houses a plurality of jumper wires 232 that interconnect each terminated cable pair 202 from its point of termination on the MDF to a corresponding switch port or input terminal 234 associated with a network element (NE) or switching system 236 located in the central office 206. As mentioned earlier, "NE" is a generic term used to refer to any central office switching system sold by several vendors, such as AT&T or Northern Telecom. The NE 236 interconnects one subscriber with any other subscriber having properly configured CPE 220, by dialing such other subscriber's telephone number.

At this point it is noted that comparison of the FIG. 1 prior art system 11b to FIG. 6 of the present invention illustrates that the wiring configuration of the present invention within the central office building eliminates the need for the frame 85 that houses the customized amplifiers 51, the customized amplifiers 51, the tie pairs 57 connecting the customized amplifier 51 to the MDF 43 and NE 49, and the need for the switching technician 125. The system 200 of the present invention also eliminates the need for switched access maintenance systems (SMAS) associated with prior art designed system 11b installed on the loop in the central office that allow a test system to access and test the customer loop. The present invention therefore saves considerable time and expense when installing special services previously treated as prior art designed services, since the aforementioned central office facilities and employees are no longer needed for any service installation.

At the customer premise 212, a pair (or pairs) of aerial drop wires 214 effectively extend the cable pair 202 from the terminal interface 208 to a protector 216 located in close proximity to a network interface 218 (see FIG. 7). The network interface 218 connects a public switched telephone network controlled by the telecommunications company through the central office 206 to customer premise equipment (CPE) 220 that is owned and maintained by a customer. The network interface 218 is the demarcation point between the network or company side 218a and the customer side 218b (customer installation). The company side 218a is connected to the customer side 218b via conductors, wiring or bridge clips 221. For residential and small business customers, the network interface 218 can be contained inside a weather-proof housing 222, such as a network interface box mounted to an outside wall of a customer premise 212 as shown in FIGS. 6 and 7. The protector 216 can be mounted within the housing 222. Alternatively, the network interface 218 can be located inside the customer premise (e.g., for CENTREX® or PBX customers).

In certain situations (as will be discussed in greater detail below), special line conditioning termination equipment referred to as "Smart Terminating Equipment" or "STE" 223 is installed by an outside technician 244 between the protector 216 and the company side 218a of the network interface 218 at the customer premise 212. FIG. 7 illustrates the wiring configuration used to install an STE unit at the customer premise when the network interface is contained in the weather-proof housing 222 mounted to an outside wall of the customer premise. In this situation, a pair of wires 224 connect the protector to the STE unit 223. The STE unit is then connected to the network side 218a of the network interface 218 via wires 225. The STE 223 output signal does not experience additional losses before entering the network interface 218, since the STE is disposed in close proximity, most preferably within two to six inches (5.08 to 15.24 cm), to the network interface 218. When the STE unit 223 is not needed, the protector 216 is connected directly to the company side 218a of the network interface.

It is important to note that while the STE 223 is preferably contained within the housing 222 containing the network interface 218 in this situation, the STE 223 and protector 216 can be mounted outside the housing 222 since the STE 223 and protector preferably have weatherproof constructions. For residential customers, housing 222 is preferably a KEPTEL® SNI-4600 Network Interface Box sold by Keptel, Inc. When the KEPTEL Network Interface Box is used, up to two STE units can be installed in the housing 222. For customers requiring more than two STE units, (e.g., business customers), housing 222 preferably allows for installation of more than two STE units therein (see FIG. 7A). The STE units alternatively can be disposed inside a weatherproof box mounted to an outside wall of the customer premise in close proximity to the housing 222 that contains the network interface and protector 216. Multimounts for 4 and 24 STE units are available from Atlantic Cable, Inc. (ACI).

Alternatively, the network interface 218 for residential or business customers can be located inside the customer's premise as shown in FIG. 8. For example, if the CPE 228 includes a private branch exchange (PBX) which is often used for corporate or business customers, a protected terminal interface 242 (or protector 216) and a network interface 218' generally are located inside the customer premise 212 in close proximity to the PBX. In this situation, the weatherproof housing 222 is not required, since the network interface is not exposed to the outside environment. Similarly, the weatherproof construction of the STE 223 is not required when it is mounted inside the customer premise 212, although the weatherproof construction is preferred in such a situation for the reasons set forth below.

The company side 218b of the network interface 218 is connected to the customer side of the network interface via conductors 224. Wires 226 extending from customer side of the network interface 218 are then connected to the CPE 220. The CPE 220 can include termination equipment such as a telephone set, a private branch exchange (PBX), modem or facsimile machine used for analog or digital signal transmission, concentration equipment, intrapremise wiring 226, or even an entire subnetwork.

As will be discussed in more detail below, one of two types of STE units, namely an analog STE 223a or a digital STE 223b (referred to collectively as STE 223), is installed by an outside technician 244 when needed for analog or digital signal transmissions, respectively. For analog signal transmission, the analog STE 223a is installed when the loop loss associated with the cable pair 202 used for locally switched analog services is not maintained within an acceptable range at the network interface 218 for the service to be provided. For example, when certain analog services such as network data links, local two-way PBX trunks, direct outward dialing (DOD), and PLEXAR® (registered to Southwestern Bell Telephone Company) or CENTREX® central office lines (prior art designed services) are provided across the cable pair, the acceptable range of loop loss must be maintained within the range of 4 to 4½ dB at the network interface. This loop loss allows for acceptable voice volume as well as for high speed analog data transmission associated with certain special services. For POTS, the acceptable range of loop loss at the network interface is 8 to 8½ dB. As will be discussed later, if the loop loss measured at the network interface exceeds the acceptable range for the analog service provided, the analog STE 223a is installed to amplify, balance and/or equalize the signal received from the network so that the loop loss is maintained within the acceptable range. When the loop loss exceeds the acceptable level, the STE unit adds the necessary gain to the signal such that the signal is maintained with the acceptable range.

When the analog STE 223a is used for analog telecommunication services, it automatically amplifies the analog signal and equalizes variations in loop loss to compensate for linear distortions associated with analog signal transmission across the cable pair 202 via an amplification and equalization network. The analog STE 223a also includes a balancing network that balances the wires 202 to compensate for any impedance mismatch. The analog STE 223 can be installed and operated properly regardless of whether the cable pair 202 is loaded, unloaded or misloaded, since the presence of loading does not affect the ability of the analog STE 223a to provide a stabilized loop loss. The analog STE 223a generates an analog output signal representative of the signal transmitted from the central office. The loop loss associated with the output signal is maintained within a predetermined acceptable range. Preferably, the analog STE 223a adds sufficient gain to the transmitted signal to maintain the loop loss within the desired acceptable range for the service requested.

For digital signal transmission, the digital STE 223b can be installed to regenerate the signal received from the network when the received pulse is distorted or smeared due to excessive losses associated with the cable pair. The digital STE 223b preferably includes regenerative repeater circuitry that equalizes variations in loop loss and balances the line to compensate for any impedance mismatch. The digital STE also provides a stabilized loop loss within a predetermined desired acceptable range. The digital STE 223b can be installed and operated properly regardless of whether digital repeaters are installed at the central office or along the line. Similarly, NCTE is not needed when the digital STE is installed at the customer premise. While the system 200 can be used to provide analog services across any loaded or unloaded cable pair 202 regardless of whether loading points are missing or inaccurate, the cable pair 202 must be unloaded (i.e., bridge taps, build-out capacitors, load coils, and cable stubs are removed from the cable pair 202) to allow for the transmission of digital signals associated with digital services. Similarly, if a cable pair previously used for digital signal transmission is converted to allow for analog signal transmission, all digital repeaters and digital NCTE must be removed.

The STE unit 223 must be reset when the attributes of the cable pair change to compensate for any variations in the loop loss and maintain the loss within the acceptable range. For example, the unit may need to be reset when a cable throw occurs, or when load coils are removed. The STE unit can be manually resettable, semi-automatically resettable, or fully automatically resettable. As will be discussed below, the invention allows for the indication on the service request and in the customer line records of whether a manually resettable, semi-automatically resettable, or fully automatically resettable STE unit is installed at the customer premise, and whether the STE unit is an analog STE 223a or a digital STE 223b.

In the preferred embodiment, the STE 223 is fully automatically resettable such that the unit resets and automatically adjusts the loop loss when any off hook condition is detected by the STE (e.g., when a user lifts a telephone handset from its cradle to obtain dial tone or when an incoming call is answered so as to establish a complete path or circuit). In this embodiment, when the CPE goes off hook, the STE unit instantaneously evaluates the condition of the line, and adjusts the gain to compensate for any deficiency to maintain the loop loss within the desired range. Therefore, in the preferred embodiment, the STE unit 223a, 223b is fully automatically resettable for any type of service provided by the telecommunications company, including all in-dial services and terminal hunt groups. For the reasons set forth below, the use of an STE unit that automatically resets for any of these conditions is preferred in the present invention.

As discussed below in greater detail, when the STE unit is manually resettable or semi-automatically resettable, an outside technician (or splicer) travels to the customer premise after a change in the condition of the line occurs (e.g., a cable throw) that may effect the loop loss. The technician then resets the STE unit such that the unit increases or decreases the gain applied to the received signal based on the current condition of the loop.

The version of the STE unit that is semi-automatically resettable also can be used in the invention. An example of a semi-automatically resettable STE unit is a two-wire line conditioning repeater sold by Teltrend, Inc., having a model number of LCR4002, and referred to by the registered trademarked name of Cyber Block®. The Teltrend device provides gain and slope equalization to maintain the loop loss for long loops within an acceptable range, adding up to 5 dB of gain to the loop. To reset such units when the line characteristic change, a technician 244 can travel to the customer premise, and dial the central office milliwatt number and pushes a button to provide automatic gain and slope compensation. The technician also dials quiet termination number and pushes a button to automatically balance the cable pair. Alternatively, if the customer has an outdial service, the customer can be instructed to dial the milliwatt and quiet termination numbers and push the button to reset the STE unit.

A manually resettable STE unit requires an outside technician or cable splicing technician to travel to the customer premise to reset the unit when the loop loss associated with the cable pair changes. An example of a manually resettable analog STE unit 223a that can be used in the present invention to provide stabilized loop loss for analog signal transmission in the subscriber loop may be an enhanced line powered 2-wire amplifier sold by Wilcom, a subsidiary of NAI Technologies, Inc., having a model number of MB21-K1. The circuitry used in the MB21-K1 is more fully described in U.S. Pat. No. 4,961,218, the disclosure of which is incorporated herein by reference. Model MB21-K1 includes an electronic hybrid voice-frequency repeater having slope equalization, impedance matching coils, and a line balancing network. To accommodate business or residential customers having the network interface 218 located within the housing 222 mounted to the outside of the customer premise 212, Model MB21-K1 has a weather-proof construction, and is designed to fit within the housing 222 where the housing 222 is preferably the KEPTEL SNI-4600 Network Interface Box. Alternatively, the Model MB21-K1 can be mounted outside the housing 222.

To reset STEs such as Wilcom's Model MB21-K1, the outside technician (or cable splicer) must manually push and turn certain buttons associated with the unit after dialing the central office milliwatt number and the quiet termination numbers to reset the unit and realign the circuit. Visual indicators are provided to indicate when the circuit is properly aligned.

When the network interface 218 is located within the customer premise 212, the weatherproof embodiment of the STE unit (e.g., Wilcom's Model MB21-K1) may be installed directly on a wall or on a mounting bracket. It is also possible to employ a STE unit that does not have a weatherproof construction inside the customer premise, such as the manually resettable enhanced line power amplifier circuitry (set forth in U.S. Pat. No. 4,961,218 and sold by Wilcom) as embodied in Model ELPA-421V. Model ELPA differs for the Wilcom device discussed in the BACK-GROUND OF THE INVENTION section since the Model ELPA-421V is line powered (not customer powered). Wilcom's Model ELPA-421V differs from its Model MB21-K1 in physical construction in that Model ELPA-421V is a 400 mechanics circuitry card which requires special slotted shelves such as standard 400 type mounting shelves for mounting the Model ELPA-421V circuitry card therein. The nature of the circuitry card and mounting shelves associated with Model ELPA-421V is not conducive for installation outside the customer premise 212 since they are not weatherproof, and therefore unable to tolerate environmental conditions such as rain, snow, dust and dirt. Furthermore, the non-weatherproof Model ELPA-421V circuitry card is approximately 2½ to 3 times larger than the weatherproof Model MB21-K1 unit, thereby requiring additional space within the customer premise 212 for installation. No mounting shelf is required for installation of the preferred weatherproof STE unit such as Wilcom's Model MB21-K1. The Model MB21-K1 unit is also preferred over the Model ELPA-421V unit since it can be used for both inside and outside installation at the customer premise so as to reduce inventory, storage space, the extent of technician training, and eliminate the need for separate tracking procedures for two types of equipment.

For nonfiberoptic cable pairs 202, a direct current (dc) power supply 248 located at the central office 206 supplies a constant DC voltage across the cable pairs 202. In this situation, the DC power source 248 supplies the necessary current to operate the STE 223 via the cable pair 202 and drop wires 214. When fiberoptic cable is used, any power source that can supply ringing current to the customer premise is used to provide power to the STE unit 223. The power source can be provided by either the customer or the telecommunications company. For example, this power source may be located at the central office such that power supplied to the customer premise via a copper wire that is embedded in the fiber, or may be an independent power source with a separate wire running to the customer premise. If the fiber does not extend all the way to the customer premise such that the fiber terminates at a remote terminal site, the power source can be located at the remote terminal and power supplied to the STE via a cable pair extending between the remote terminal and the terminal interface.

III. NONDESIGN PROCESSES OF THE PRESENT INVENTION

Figure 9:
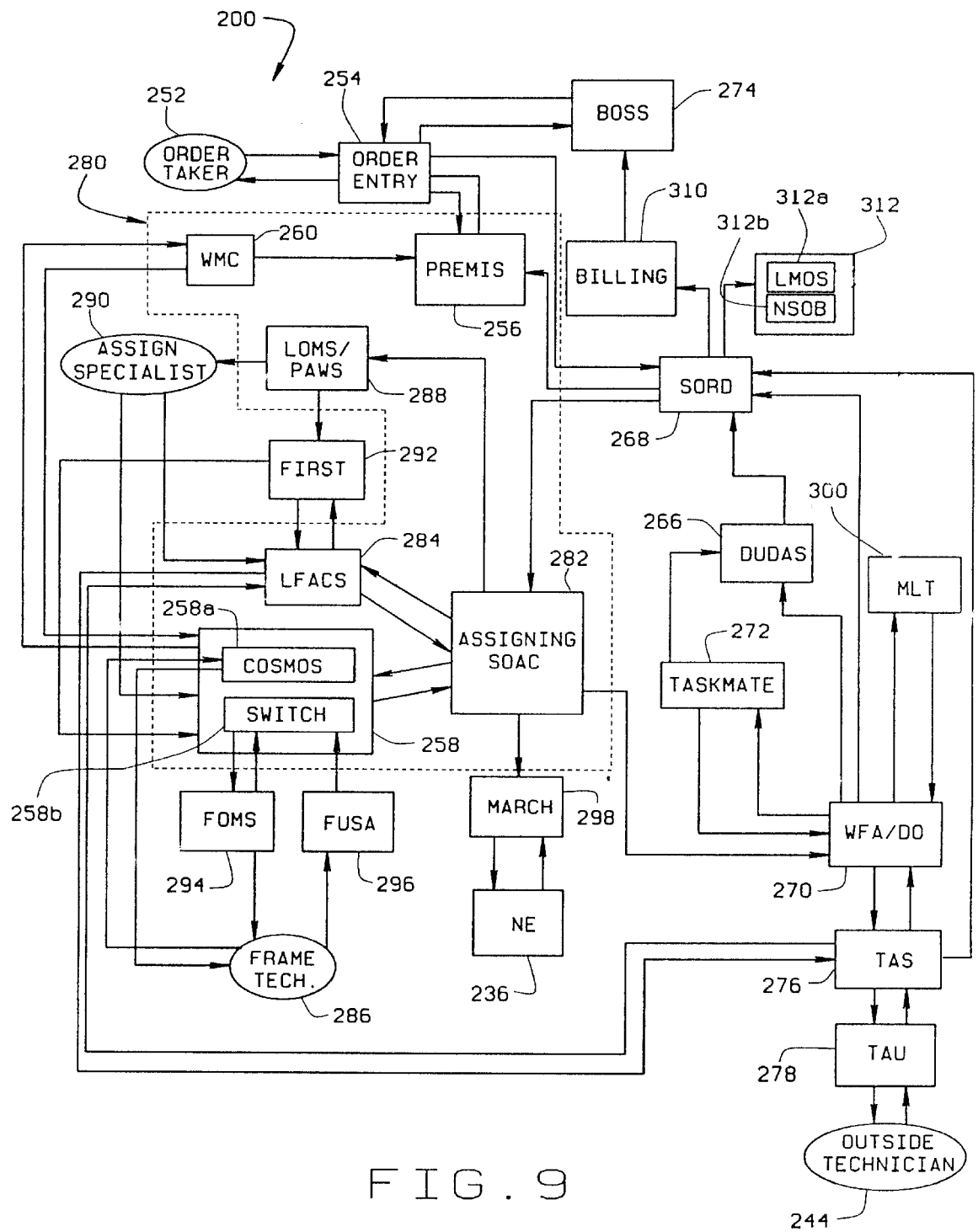
FIG. 9 is a block schematic diagram of the computer network of the present invention used for processing service requests relating to the installation of locally switched analog or digital telecommunication services.

Referring now to FIG. 9, improvements of the telecommunication system 200 and associated methods of the present invention over the prior art system 11b include the elimination the computer systems and personnel associated with prior art design processes, functions, and systems set forth above with respect to FIGS. 3 and 5 for analog and digital designed services. The system 200 also provides new and improved nondesign processes and systems that allow prior art designed services to be treated as nondesigned services. The invention further allows for information associated with the STE unit to be propagated on the service request, stored in the computer memory of various computer systems, and updated or erased, as needed.

In general, the system 200 includes a computer data processing network having a plurality of computer memory means for data storing of information relating to the telecommunications company customers, facilities, equipment, and service requests such as service orders and repair or maintenance requests. The computer network of system 200 also includes a plurality of computer data processing means which perform input, processing, storage, output, and control functions to accomplish a sequence of operations on the information stored in the computer memory means. FIG. 9 illustrates the preferred embodiment of the computer network associated with the invention, including a plurality of computer systems having computer memory means and data processing means which are designated by rectangular blocks. The operation of these functional blocks is discussed more fully below.

It is important to recognize that the functions and operations of these blocks define the invention, rather than the invention being defined by the particular systems or methods employed. Certain functions and operations discussed below could be performed by other computer systems not set forth in the preferred embodiment and still fall within the scope of the invention if these systems perform in a substantially similar manner to the systems discussed with respect to the preferred embodiment. When required, the system 200 also can employ the services of an order taker person, an inside frame technician, an outside technician and an assignment specialist person to perform any work associated with a service order. These telecommunications company personnel are designated by ovals in FIG. 9.

The system 200 of the present invention differs from the prior art system 11 in that the design processes, functions, systems and associated personnel are required in the prior art system 11 to process all service orders relating to prior art designed services. In contrast, the system 200 of the present invention uses improved "nondesign" processes, functions and systems to process and complete all service order requests for any locally switched analog or digital services. The system 200 eliminates prior art designed services, since with system 200, all prior art locally switched designed services are processed using nondesign processes, functions, and computer systems, instead of the prior art design processes, functions, and computer systems. Accordingly, since all locally switched services are processed using improved nondesign processes, functions and computer systems under the system 200, all such services are referred to in the following discussion of system 200 as nondesigned services. This definition eliminates the distinction made in the prior art between designed and nondesigned services by classifying such services as nondesigned. For example, service order requests relating to special services such as local two-way Private Branch Exchange (PBX) trunks, direct outward dialing (DOD) trunks, direct inward dialing (DID) trunks, wide area telecommunications services (WATS), CENTREX® central office lines, and network data lines are processed using the nondesign processes of the system 200. These six special services represent the majority of service order requests processed by telecommunications companies which were processed using design processes under prior art systems 11b.

The system 200 shown in FIG. 9 sets forth nondesign processes, functions, and computer systems used for processing any service request relating to installation of any locally switched analog or digital service across a cable pairs 202. The system 200 provides that the loop loss is maintained within an acceptable range at the network interface 218.

More specifically, when the telecommunications company receives a request from a customer to install an analog or digital service, a person 252 usually referred to as an "order taker" accesses a business and sales support computer order entry system 254 to prepare a service order. As mentioned in the discussion of prior art system 11, service order refers to a packet of computer information that contains data essential to establishing, updating, maintaining, billing and disconnecting all customer service offerings. The service order is also used to convey information and data to various telecommunications company personnel including technicians and specialists so they can perform necessary manual and record work to complete the installation of the requested service.

As in the prior art, all information included in the service order is arranged into logical groupings of related data called sections. Typical sections of a service order include: identification (identifies information such as the service order telephone number, order number, due date); listing (includes directory listing of customer name and address); control (contains dates for the installation of special services); directory (contains information for delivery of phone books); traffic (includes information for a telephone recording when a customer moves or changes telephone numbers); billing (sets forth billing name and address, and billing and credit information); remarks (includes information regarding installation instructions or other miscellaneous data); service and equipment (includes USOCs, FIDs, action codes, and/or quantities associated with the service provided by the telecommunications company); statistics (contains information about the actual completion of the service order); and assignment (includes information relating to inside and outside facilities used to provide working service to the customer premise and the facility address). Each of these sections of the service order may also include subsections or field such as a remarks field which may include additional information or instructions relating to that particular section.

Depending on the nature of the requested service and the configuration of the system 200, the computer order entry system 254 is typically either a direct order entry data processing system, an Easy Access Sales Environment (EASE) data processing system of Southwestern Bell Telephone Company, a Customer Access Billing System Minimal Input Generation (CMIG) data processing system which is known in the art, or an Exchange Access Control and Tracking (EXACT) data processing system sold by Bell Communications Research, Inc. (Bellcore). The computer order entry system 254 performs input, processing, storage, output and control functions on data used to generate a service order. Alternatively, a customer may input a request through a customer direct access computer order entry system.

The order taker person 252 or customer inputs customer information into the computer order entry system 254 such as the customer's name and phone number (if applicable), the customer's address, and the type of service requested. Either the computer order entry system 254 or the order taker person 252 accesses a computer data processing system known in the art such as Premises Information System (PREMIS) 256 that is sold by Bell Communications Research, Inc. (Bellcore), and contains address-based information stored in associated databases in its computer memory. The information stored in PREMIS 256 includes customer service address, the central office serving each address, the type and designation of the NE 236 serving that customer address, and the types of services provided by the central office serving that address. PREMIS 256 assists in generating a service order by validating the customer's address, and verifying any telecommunications company services currently associated with that customer address.

PREMIS 256 then transmits the appropriate address-based information to the computer order entry system 254 or the order taker person 252. The computer order entry system 254 data processes the customer information input by the order taker person or customer and address-based information received from PREMIS 256 into the service order format, or the order taker person 252 accesses PREMIS 256 and manually inputs information from PREMIS 256 into the computer order entry system 254, depending upon the configuration of the system 200.

As in the prior art, if a telephone (line) number assignment is required for installation of a new service, the computer order entry system 254 accesses PREMIS 256 to retrieve a list of available telephone numbers. More specifically, PREMIS 256 selects the list of available telephone numbers from a pool of available numbers stored therein based upon the wire center which includes the customer premise 212. PREMIS 256 transmits this list to the computer order entry system 254 for use in preparing and processing the service order. The order taker person 252 selects and assigns a particular telephone number from this list to the service order. Those numbers that are not selected are stored in PREMIS 256 as part of the available pool of numbers to be used for subsequent service orders. Typically, PREMIS 256 retains the selected line number in the pool with an indication that the number has been selected and is no longer available. When the service order is completed and the requested service installed, PREMIS 256 receives a copy of the completed service order, and PREMIS deletes the number associated with the completed service order from the pool of numbers.

Typically, a clerk located in a line number assignment center monitors the pool of available numbers for each wire center that are stored in PREMIS 256, and downloads additional telephone or line numbers as needed to PREMIS 256 from either a COSMOS computer system 258a or a SWITCH® computer system 258b (referred to collectively as COSMOS/SWITCH 258 and discussed in greater detail below) via a Consolidated Work Manager (WMC) computer interface system 260. In general, COSMOS/SWITCH 258 is a computer data processing system that performs input, storage, processing, output and control functions on data relating to central office equipment and facilities. COSMOS/SWITCH 258 maintains information stored in its computer memory indicating all available telephone numbers utilized by the NE 236 located in central office 206. Both COSMOS and SWITCH are known in the art and sold by Bell Communications Research, Inc. (Bellcore).

When the order taker person 252 retrieves the screen in the computer order entry system 254 to negotiate a due date on which the service can be installed, a list of available installation dates and appointments are presented. The available dates and appointments are transmitted to the computer order entry system 254 from a Due Date Availability System (DUDAS) 266 via a Service Order Processor (SOP) computer system 268. DUDAS 266 is a dynamic, on-line, real-time, computer data processing system used to manage the appointment dates and times. The SOP system 268, discussed in greater detail below, can be any computer data processing system used for data processing the service order. In the preferred embodiment, the SOP 268 is a real-time computer data processing system known as Service Order Retrieval and Distribution (SORD) system 268 of Southwestern Bell Telephone Company, although any SOP or comparable system(s) used to perform the substantially similar functions as set forth below can be used instead of SORD.

Figure 12:
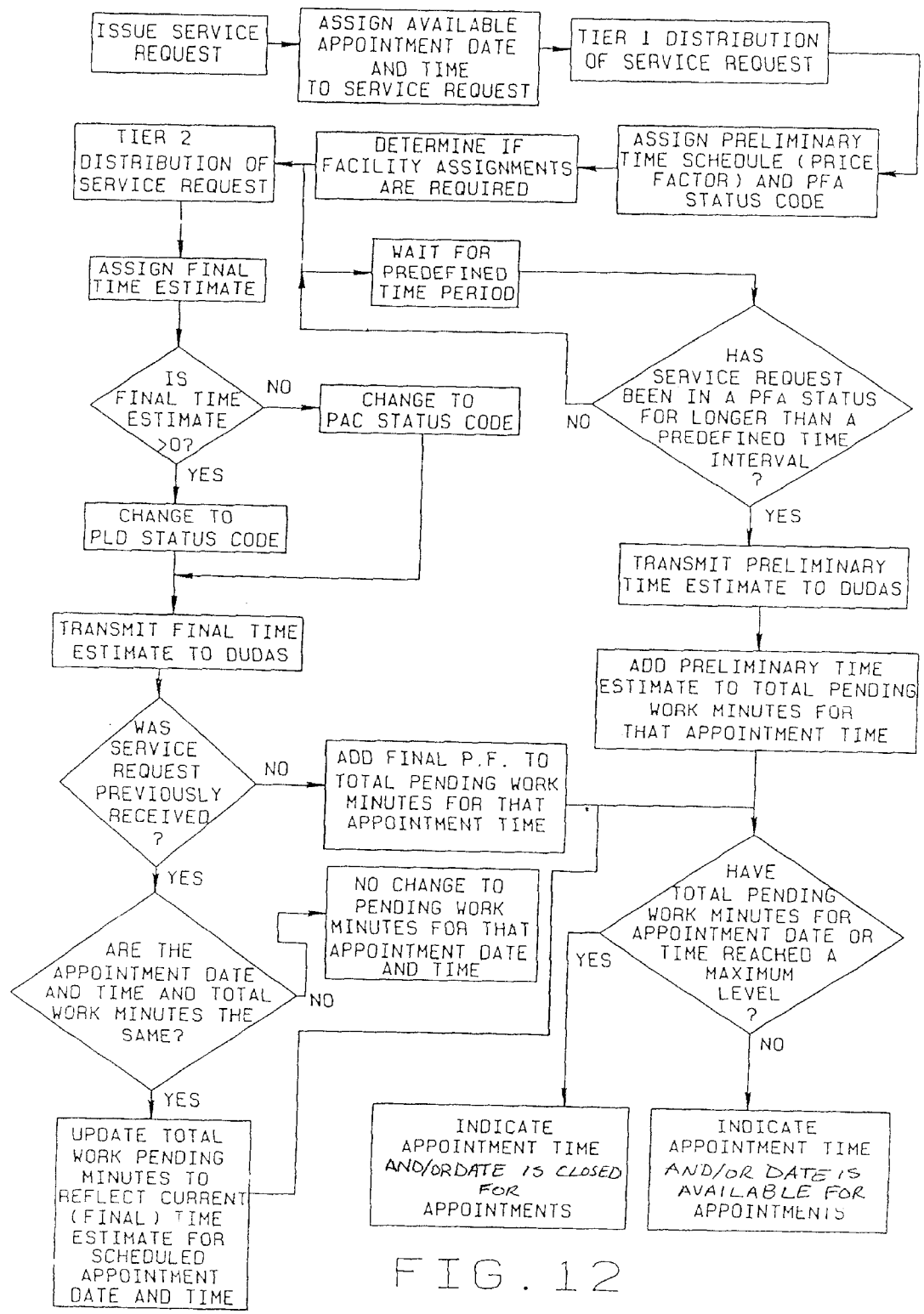
FIG. 12 is a flow chart illustrating the telecommunication system and method of the present invention for assigning an available appointment date and time to a service request for installation of a telecommunication service on a local loop.
Figure 13:
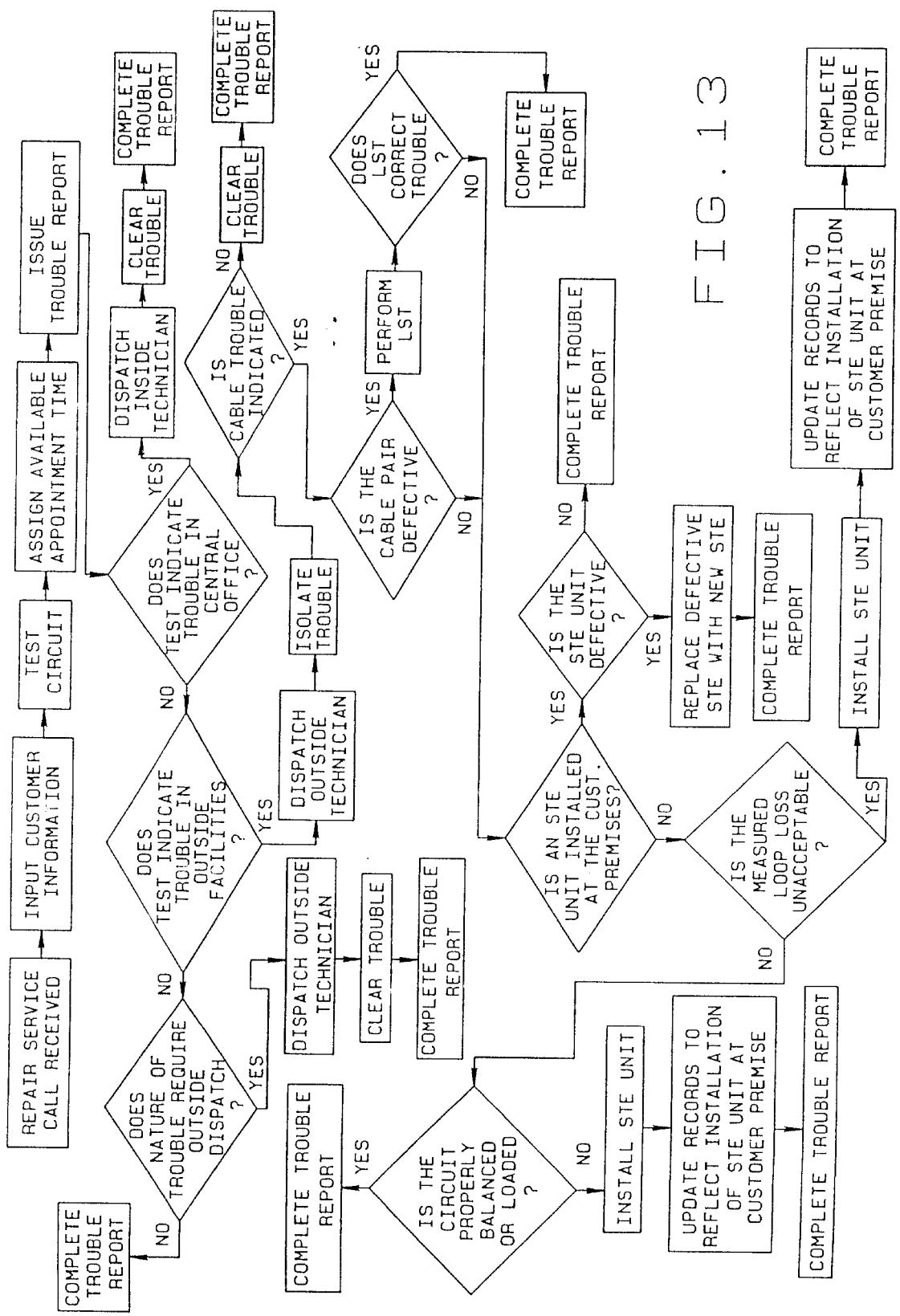
FIG. 13 is a flow chart illustrating the telecommunication system and method of the present invention for processing a service request relating to repair of a local loop used to provide any locally switched nondesigned service to a customer premise.

Since all service orders are processed as nondesigned services under the system 200, the computer order entry system 254 inputs a message into the SORD system 268, requesting an available due date and appointment time for installation of the nondesigned service based on the availability of an outside technician 244. In this situation, request for the due date differs from the prior art system 11a. In the system 200, the SOP 268 obtains the due date from DUDAS 266, not from the FMSN 73 as required in the prior art system 11a. DUDAS 266 has information tables stored in its computer memory that maintain current records indicating the amount of time in relationship to the number of outside technicians 244 available to work on a particular date and time for each geographic area corresponding to all wire centers. DUDAS 266 can be used to schedule appointments for both installation and repair requests. FIG. 12 generally illustrates various functions performed by computer data processing systems of the present invention to maintain updated records reflecting the availability of technicians to perform tasks associated with service requests relating to installation, maintenance or repair.

A Work Force Administration/Dispatch Out (WFA/DO) (sold by Bell Communications Research, Inc.) computer data processing system 270 (discussed more fully below) continuously inputs information into the computer memory of DUDAS 266 for each service order WFA/DO 270 receives, indicating the amount of time required to work and complete each service order for each day. DUDAS 266 calculates and data processes this information to maintain up-to-date records indicating the availability of qualified outside technicians 244 to work any new requests for installation of nondesigned services on a particular date or time. If a qualified technician 244 is available for service installation for a particular date and/or time, DUDAS 266 transmits a message to the SOP 268 indicating the technician 244 is available and the time is open. If a technician 244 is not available for a date and/or time, DUDAS 266 inputs a message to the SOP 268 indicating that the specific date or time is not available (i.e., closed for appointments). The SOP 268 then inputs information into the computer order entry system 254 indicating the availability of the date and/or time for appointments for a predetermined range of days (e.g., the next 28 days).

More specifically, when WFA/DO 270 receives a copy of the service order as part of the Tier 1 distribution (pending assignments) (discussed below), WFA/DO 270 analyzes the service order to determine the type of service order it received (e.g., new connect, change feature associated with service, disconnect existing service, move from one address to another address, prewire order, record order to change company records, or conversion order). As will be appreciated by those with ordinary skill in the art and discussed in greater detail below, WFA/DO performs a multitude of functions including establishing a job type using tables stored in WFA/DO based on information associated with the service order such as the class of service (e.g., business or residence), Universal Service Order Codes (USOCs), Field Identifiers (FIDs) and pair gain systems (such as SLCS). The job type indicates the basic type of work to be performed to complete the service order. As will be discussed below, the job type of the present invention is an enhanced job type that typically includes five characters where the first character indicates the job (e.g., installation, repair, routine, or maintenance job) and the second character indicates the class of service (e.g., residence, business, special, video service). Other characters associated with the job type indicate the type of service provided (e.g., video, ISDN, exchange, facility cable) and the nature of work to be performed. A special fourth or fifth character associated with the enhanced job type indicates when the requested service may require installation of an STE unit. As will be discussed below, WFA/DO is used to schedule available outside technicians for dispatch. DUDAS is used to set priority for appointments requiring field work performed by outside technicians.

As will be discussed in greater detail below, it is conventional practice in the telecommunication industry to classify the transfer of information associated with processing a service order into one of three tiers. Tier 1 (or NET 1) typically refers to the initial general transmission of information relating to the service order to all computer systems before any facility assignments or work related functions are performed. In Tier 1, all computer systems are notified of the existence of a service order which may require data processing functions by each system. Tier 2 (NET 2) distribution of the service order occurs after various computer systems discussed below determine whether facility assignments are needed, and if so, assigned by the computer systems to the service order. Generally, Tier 2 distribution occurs within a relatively short time interval after the Tier 1 distribution (e.g., thirty minutes).

When WFA/DO receives the Tier 1 distribution, WFA/DO 270 assigns a preliminary factor price indicating an estimated time to complete the order if technician dispatch is required based upon the class of service. The preliminary factor price or estimated time is based upon tables stored in WFA/DO indicative of the time required to install that type of service and the average number of service installations for that type of service that require technician dispatch. For example, if it is estimated that it takes one hour to install the type of service associated with a service order based on past experience, and 50% of that type of service requests require dispatch of a technician to perform field work, the factor price or estimated time stored in WFA/DO's tables is 30 minutes for that class of service. The average number of service installations requiring technician dispatch for a type of service is based on past records and statistical analysis maintained by a computer system known in the art, such as, for example, a HART computer system of Southwestern Bell Telephone Company. Information associated with USOCs, FIDs, and classes of service are used by HART to perform many types of statistical analysis and generate records.

Based on the class of service, the preliminary factor price is put on the service order in WFA/DO 270 along with a status code such as "pending facility assignment" (PFA) status code. A computer system such as a TaskMate computer system 272 queries WFA/DO 270 to determine which service orders having a PFA status code and a certain job type have been stored in WFA/DO 270 for longer than a predefined time interval (e.g., one hour or three hours). TaskMate 272 retrieves from any service order that satisfies these criteria information including the service order number, the wire center designation, the preliminary factor price (estimated time), the due date and appointment time, and sends this information to DUDAS 266.

When Tier 2 distribution of the service order is received by WFA/DO, WFA/DO 270 examines the service order to determine exactly the work needed to be performed by a technician to activate the requested service. Prior to the receipt of the assignment information, WFA/DO is not able to determine exactly what work must be performed to activate the service, since certain information relating to inside and outside facilities (such as whether a drop wire is already connected to the customer premise, or whether a jack needs to be installed) is unknown. After Tier 2 information is received, WFA/DO 270 determines a more precise or exact final time estimate for work to be performed based on information associated with the class of service, USOCs, and FIDs using tables stored in WFA/DO 270. WFA/DO 270 then assigns to the service order the final time estimate. Based upon the final time estimate, WFA/DO 270 changes the status of the service order from pending facility assignment (PFA) to a status code such as pending load (PLD) or pending auto-completion (PAC). More specifically, when the final time estimate is greater than zero minutes, the PLD status code is assigned, indicating dispatch of an outside technician is needed to complete the service request. When the final time estimate is zero minutes, no field work needs to be performed by the outside technician and the status code is changed to PAC. When WFA/DO 270 changes the status code from PFA to the new code such as PLD or PAC, WFA/DO 270 is triggered to send to DUDAS 266 the final time estimate and other information including the service order number, the wire center designation, due date and appointment time.

When DUDAS 266 receives information indicating either the final time estimate or preliminary time estimate, DUDAS 266 examines the service order number and wire center designation to determine if DUDAS 266 received this information previously. When the preliminary time estimate is sent to DUDAS 266, DUDAS 266 updates its records indicating the total available time in that geographic area for that date and time based upon the preliminary factor price if DUDAS 266 previously has not received the information. In the preferred embodiment, DUDAS 266 adds the preliminary factor price to all other pending work minutes in that geographic area (wire center) for that date and time until a predetermined maximum limit is reached and the date or time is closed. DUDAS 266 also updates records stored in DUDAS 266 to reflect the information received from WFA/DO 270. DUDAS 266 then sends notification to SORD 268 indicating the availability of appointment dates and times.

It is important to note that the Tier 1 preliminary factor pricing is only used when a Tier 2 distribution is not received by WFA/DO 270 within a predetermined time interval after the service order is statused as pending facility assignments (PFA). This may occur when problems arise in SORD with preparing the service order, or problems arise in LFACS 284 (discussed below) or COSMOS/SWITCH 258 with assigning inside or outside plant facilities (e.g., no available cable pair, customer address does not match address records, or no available switch port).

If DUDAS has previously received this information, then WFA/DO 270 would have received this information as part of a Tier 1 distribution when TaskMate 272 transmitted the information from WFA/DO 270, or as part of a Tier 2 distribution (e.g., for a correction order, the service order number has a suffix code added that incrementally increases each time a correction order issues).

When information indicating the final time estimate is received by DUDAS 266, DUDAS 266 searches its computer memory for the service order number and wire center designation to determine if DUDAS 266 received information relating to that service order previously from TaskMate 272 (Tier 1) or as part of a prior Tier 2 pass. If the service order number and wire center designation were not previously received, DUDAS 266 updates its records indicating the total scheduled time in that geographic area for that date and time based upon the final time estimate. In the preferred embodiment, DUDAS 266 adds the final time estimate to all other pending work minutes in that geographic area (wire center) for that date and time until a predetermined maximum limit is reached and the date or time is closed. DUDAS 266 also updates records stored in DUDAS 266 to reflect the information received from WFA/DO 270. DUDAS 266 then sends notification to SORD 268 indicating the availability of appointments based on available work force. SORD 268 then passes information to the computer order entry system indicating the availability of appointment dates and times. As long as an appointment date and time is open (technician is available), the order taker person is able to schedule appointments during that time interval. When the total time available is exhausted (or exceeded), DUDAS 266 sends notification to the computer order entry system via SORD 268 that the date or time is closed. The available time for a set time interval or date is continuously updated. If an appointment is canceled, DUDAS 266 adjusts the available time for the time interval in which the appointment was previously scheduled so as to make that time available for another appointment.

If the service order number and wire center designation were previously received by DUDAS 266, DUDAS 266 examines and compares the previous time estimate, due date, wire center, date and time to see if there are any deviations or changes in the prior information in view of the current information just received by DUDAS 266. If there is no change in the information, DUDAS does not adjust its records. If there are any changes, all changed (superseded) information is withdrawn from the cumulative records maintained by DUDAS 266, and all new information is input to these records. In other words, if there is a change in the date, appointment time, and/or time estimate, DUDAS 266 changes or adjusts its records to make the prior date and/or time available. In the preferred embodiment, DUDAS 266 subtracts the superseded appointment time from the pending work minutes, and adds the updated actual time estimate and/or inputs the current information in its computer memory. Therefore, appointments that were previously closed may become available if there is a change in the preliminary time estimate, due date and/or appointment time. The updated information is transmitted by DUDAS 266 to SORD 268, and SORD 268 stores this information in tables stored in its computer memory.

Based upon the information transmitted by DUDAS 266, SORD 268 data processes this information to continually update records stored in its computer memory indicating whether appointments are open, closed, unavailable (not offered), or the time falls on a holiday, and transmits this information to the computer order entry system 254 to assist the order taker person 252 in scheduling appointments. The appointment times can be defined as any time interval (such as A.M. and P.M. appointments where the A.M. and P.M.

time interval can extend between any predefined time limits, or divided into two hour increments). Appointments that are designated as closed or unavailable can be overridden so that appointments can be scheduled for these closed or unavailable time intervals. Election to override this type of designation could be made in emergency situations, for installations or repairs requiring immediate attention, or for other unexpected reasons. If an appointment is scheduled during a time interval designated as closed or unavailable, SORD 268 adds a FID to the service order indicating the due date or appointment time was overridden by that particular order taker person when DUDAS 266 determined the time was closed or unavailable. The FID can be used by a computer system known in the art, such as, for example, a HART computer system of Southwestern Bell Telephone Company to perform statistical analysis to determine information such as whether a particular order taker person is abusing his or her discretion by repeatedly ignoring these time designations for nonemergency situations, or the ability of the work force to process these types of service orders when the time interval is designated closed or unavailable.

The computer order entry system 254 or order taker person 252 also transmits a message into a computer system, such as Business Office Support System (BOSS) 274 that is known in the art, requesting information relating to the customer's credit history and records of service(s) previously installed at the customer premise 212, if necessary. BOSS 274 is a data processing system that maintains current customer billing and service records in its computer memory. BOSS 274 accesses its computer databases to obtain the requested information, and then inputs this information into the computer order entry system 254. The computer order entry system 254 data processes this information into the service order, if required.

After the computer order entry system 254 gathers and processes the necessary information to generate a service order, the computer order entry system 254 inputs this information into the computer memory of the SOP 268. The SOP 268 data processes this information and generates a service order. It is also possible to bypass the computer order entry system 254 such that the order taker person 252 gathers and inputs all customer information directly into the SOP 268, and the SOP 268 generates the service order. A copy of the service order is stored in the databases associated with the SOP 268 until the service order is completed.

As in the prior art, each service order includes a plurality of Universal Service Order Codes (USOCs) and Field Identifiers (FIDs) that are assigned to the service order by the order taker person 252. The USOCs and FIDs are used by the system 200 to process the service order. The USOCs include information indicating many parameters to be considered in installing the requested service for a particular subscriber loop or circuit. These parameters typically include service and equipment information relating to the class and grade of service the customer requested, how the service will be used, and what equipment needs to be installed. FIDs provide information identifying a multitude of system components such as TN for "telephone number," CA for "cable," and PR for "pair."

In addition, the system 200 can be configured as known in the art such that order taker person 252 enters into the computer order entry system 254 or the SOP 268 a Common Language Circuit Identification (CLCI)® (a registered trademark of Bell Communications Research, Inc.(Bellcore)) service code corresponding to the particular type and characteristics of service requested by the customer. These service codes are industry standards used nationwide that provide a universal definition indicating the service provided to the customer. For example, service codes that may be assigned by the order taker person 252 when there is a request for installation of a new service processed using the system 200 of the present invention include: TK for local two-way PBX trunk services, DO for direct outward dialing (DOD) services, CL for CENTREX® central office line services, and ND for network data line services. If the service is existing, the computer order entry system 254 retrieves the service code from the database stored in the computer memory of BOSS 274 that contains the customer service records.

While the preferred embodiment of system 200 uses a combination of the service codes and USOCs to process a service order, it is also possible to configure system 200 such that the service codes are eliminated from the service order and only USOCs are used. Service codes are used to designate the type of service, and USOC codes are used to designate the class and grade of service to be provided to the customer premise or the equipment used to provide the service. In the present invention, information indicating the type of service installed across the cable pair is not needed to processing the service order using system 200. However, information indicating the class and grade of service provided to the customer premise is needed to process the service order using system 200. Service codes are traditionally used to designate services that are processed using the TIRKS® design and review processes. Service codes are not used to trigger billing, but instead used to provide a common language code that is used by telecommunications companies to indicate TIRKS® review is required. Since the system 200 does not require TIRKS® design review, it is not necessary to include service codes. Billing codes (such as the CQ4 USOC discussed with respect to the prior art system 11) can be used to indicate the service provided requires a 4½ dB circuit. Since the type of service is not needed to processes the service order under system 200, class of service codes and USOCs can be used in place of service codes. However, service codes are used in the preferred embodiment.

As is known in the art, the order taker person 252 also inputs an action code for work to be performed for the service and equipment associated with the USOCs and FIDs. The action code is a single alphabetic character that indicates the activity applicable to a specific service order entry. For example, action codes that can be input into the service order by the order taker person 252 include I for "installation," C for "change" and T for "to," O for "out" and R for "recap."

As mentioned above, the SORD system 268 as used in the preferred embodiment is a real-time computer data processing system which controls the preparation and distribution of service orders, and maintains a direct access file of pending orders. Several computer subsystems, modules and databases are associated with, and are an integral part of, the SORD system 268, such as a Request Processes (REQ) system and a Queued for Distribution (QFD) system. In the SORD system 268 as used in the preferred embodiment, the REQ system edits and verifies information contained in the service order to determine if the information is in the correct format, and determines if a service order contains the appropriate USOCs and FIDs indicating a customer request for a particular service. Based on the information relating to the service order request, the REQ system also determines which other systems in the computer network will receive copies of the service order.

The SORD system 268 is programmed to operate differently than the prior art SORD system 71, in that the QFD system of the present invention does not assign critical dates for any service order. In the preferred embodiment of the system 200, the SORD system 268 or order taker person 252 does not propagate the ADSR code on the service order for any services, as required for prior art designed services. However, the system 200 can be configured to allow the ADSR code to be manually entered by the order taker person 252 for certain prior art designed services, if desired.

Under the system 200 of the present invention, the order taker person 252 inputs a new FID, into the computer order entry system 254 or directly into the SOP system 268. The new FID is preferably referred to as "TDNR" (meaning TIRKS® Design Not Required), for customer requests relating to any new service installations where the class and grade of service is required to be less than 8½ dB. The computer order entry system 254 is programmed to prompt the order taker person to input this TDNR FID, if forgotten. Alternatively, the SOP system 268 can assign this TDNR FID to the service order via the REQ system. The TDNR FID becomes a permanent part of the customer's record. TDNR will be used in the system 200 so long as prior art designed facilities are in existence and maintained by a telecommunications company. In other words, so long as service codes are used to designate the type of service, the TDNR FID should be used. If the class of service is used instead of the service codes as discussed above, then the TDNR FID is unnecessary.

TDNR is used to designate where the customer records are maintained for repair purposes and subsequent order activity. In the prior art system 11, these records could be located in databases associated with TIRKS® 113, WFA/C 115, NSDB 111b, or LMOS 111a. In the preferred embodiment of the system 200, all customer records reside in LMOS 312a. Alternatively, the customer records can be moved to NSDB 312b and WFA/C (not shown). In this situation, LMOS 312a can also be used to store the customer records, or the system can be eliminated. TDNR allows for continued use of service codes on the service order, and prevents the service order from being sent to the prior art TIRKS® for review and design. Therefore, under system 200, the services are segregated into two categories: (1) services previously installed using prior art design processes as discussed above with respect to prior art system 11b, and (2) locally switched services installed using the nondesign processes of the system 200. Those services installed, maintained and repaired using the nondesign processes of the system 200 are processed more efficiently in that such processing is faster, cheaper, and less labor intensive than the prior art system 11.

Services installed using prior art design processes may include any service requiring connection using interoffice tie pairs and facilities (not locally switched). If the inventory of interoffice facilities is maintained in TIRKS®, such services are still processed using prior art design processes, not the system 200 of the current invention. Alternatively, the assignment and inventory of interoffice facilities can be moved from TIRKS® to SWITCH® and LFACS so that services requiring connection through one or more central offices may be installed using the nondesign processes of the present invention. Services requiring interoffice facilities include, but are not limited to, foreign exchange services, secondary CENTREX® systems located outside the primary serving office, and dedicated facilities between two customer premises located in different wire centers. Therefore service orders requiring interoffice facilities may or may not be processed using the nondesign processes of the present invention, depending upon whether the interoffice facilities are assigned from and inventoried in TIRKS® or SWITCH® and LFACS. While the discussion of the preferred embodiment relates to service orders that are locally switched and do not require interoffice facilities, it will be appreciated by those skilled in the art that the invention can be extended to include services requiring interoffice facilities if those facilities are assigned from and inventoried by LFACS and SWITCH®.

In the system 200 of the present invention, the REQ or QFD modules of SORD automatically populate a unique USOC on service orders containing the TDNR FID to indicate that an STE unit may need to be installed at the customer premise for the requested service. Alternatively, the USOC can be input on the service order by the order taker person 252, and verified by the REQ/QFD module. The USOC is defined based on the type of equipment that may be needed for the requested service. For example, the first three characters of a five character USOC can be "STE" to designate an STE unit may need to be installed. The fourth character is preferably either "A" for analog service or "D" for digital service. The fifth character is preferably either "M" for a manually resettable STE unit, "S" for a semi-automatically resettable STE unit, or "A" for a fully automatically resettable STE unit. If the fourth and/or fifth character is unknown at the time the service order is prepared, a wild card character such as "X" can be used to designate unassigned characters. In the discussion that follows, this USOC is referred to generally as STEXX, unless otherwise indicated, where XX can be any combination of the above-described characters.

As will be discussed in greater detail below, if and when an outside technician installs an STE unit at the customer premise, the technician can access SORD 268 via a technician access system (TAS) 276 and a technician access unit (TAU) 278 to update or correct the STEXX USOC to reflect the type of unit installed and the nature of the service provided. The technician will need to update the USOC if an X was assigned as the fourth or fifth character, or if an inaccurate character was used when the USOC was assigned by the SORD system 268 based on the equipment actually installed. Similarly, if the USOC is assigned to a service order and the outside technician determines no STE unit needs to be installed, the technician can remove the USOC from SORD 268 via the TAS 276 and TAU 278.

The SORD system 268 or the order taker person 252 can input the USOC "STEAX" or "STEDX" for all service orders having the TDNR FID, and then have the technician update the USOC to identify the fifth characters (or delete the USOC) based upon the type of STE equipment installed. If fully automatically resettable STE units are widely used throughout a telecommunication company, the SORD system 268 can be configured to input STEAA or STEDA. Likewise, the particular USOC input on the service order can be based upon the service code or the requested service. For example, if the service order requires installation of a manually resettable STE unit at the customer premise for analog direct inward dialing (DID) service, the USOC input on the service order is STEAM. As will be appreciated based on the discussion below, the order taker person 252 can input a STEXX USOC when the records indicate a STE unit was left at the customer premise after service was disconnected (i.e., a ;S.T.E remarks entry is present in the remarks field of the facility address associated with the assignment section of the service order).

Alternatively, the system 200 can be configured such that a line enhanced USOC code, such as CQ4, can be processed by certain computer systems as an equipment code. As known in the art and discussed in the prior art, certain inputted USOCs and FIDs are used by other computer systems in processing the service order. As in the prior art, a USOC such as CQ4 can be input when conditioning is needed for an ND circuit to provide a 4 dB loop loss. When the service order passes to the Assigning SOAC (discussed below), the CQ4 USOC triggers tables in the Assigning SOAC to recognize and translate this USOC as a line class code, indicating the line class needs conditioning or outside facilities assigned by LFACS or SWITCH®. The USOCs, FIDs and action codes are also associated with billing codes used by the billing system such as CRIS (discussed below) to determine billing rates for the service provided. A USOC such as CQ4 can be used not only to trigger tables in the Assigning SOAC to recognize and translate this USOC as a line class code, but also to trigger the Assigning SOAC to recognize and translate this USOC as an equipment code that requires notification to be sent to WFA/DO for possible dispatch of an outside technician. In other words, use of the USOC assigned to the service order could be expanded beyond its prior art use as a line class code and a billing code, so as to be used as an equipment code indicating an STE unit may need to be installed at the customer premise. This changes the prior art definition and handling of the USOC as used by the Assigning SOAC. In the prior art, the conditioning code is not transmitted to WFA/DO since the USOC has no impact on the dispatch of outside technicians.

However, the use of the enhanced line conditioning code to represent the billing code, line class code and equipment code is not preferred in the invention. The preferred embodiment uses the STEXX USOC to indicate only the type of equipment used to condition the line. The billing code and line class code used in the preferred embodiment are treated as they are in the prior art, and the equipment USOC code (STEXX) is added to the service order. The preferred embodiment allows the communications company to install and track the STE equipment without billing the customer for line enhancement in situations such as when the loop loss exceeds an acceptable range on a circuit that does not typically require conditioning (e.g., POTS circuit), or when an unloaded cable pair having an associated unacceptable loop loss is used to provide an analog service.

Under the new system 200 of the present invention, the SORD system 268 transmits a copy of the service order to Facility Assignment and Control Systems (FACS) 280. FACS 280 includes a plurality of on-line computer data processing systems that interact with each other to perform input, processing, storage, output, and control functions on data relating to inside and outside telecommunications company facilities, inventory and equipment that can be used for a particular customer to provide the requested service to a particular customer premise. While several "assignment" functions performed by FACS 280 are present in the prior art FACS 79, many of the computer systems have been programmed or configured to operate differently than those used in the prior art system 11. As will be discussed in greater detail below, the computer data processing systems comprising FACS 280 include: COSMOS/SWITCH 258, Loop Assignment and Control Systems (LFACS) 284, Assigning Service Order Analysis and Control (Assigning SOAC) 282, Tandem Service Order Analysis and Control (Tandem SOAC), PREMIS 256, LOMS/PAWS 288, and WMC 260.

As will be discussed more fully below, FACS 280 includes a plurality of Assigning SOACs 282 where each Assigning SOAC 282 is used to data process information relating to facilities associated with a particular wire center.

The REQ and QFD systems associated with SORD 268 determine if multiple Assigning SOACs 282 are needed to process a service order. If only one Assigning SOAC 282 is needed (e.g., interoffice facilities are not needed), SORD 268 transmits a copy of the service order directly to the appropriate Assigning SOAC 282, as shown in FIG. 6. If two or more Assigning SOACs 282 are required (e.g., facilities are located in two or more wire centers and interoffice facilities are required), SORD 268 transmits a copy of the service order to the Tandem SOAC to determine the appropriate Assigning SOACs 282 needed to process the service order. The Tandem SOAC then transmits a copy of the service order to the appropriate Assigning SOACs 282. Since the vast majority of service orders do not require interoffice facilities, the system 200 as shown in FIG. 9 applies to the majority of service orders. In the present invention, all service orders containing the TDNR FID are sent directly to the Assigning SOAC 282 by SORD. This differs from prior art system 11b which required all service orders relating to prior art designed services to be processed using the Tandem SOAC 81 regardless of whether interoffice facilities are required.

The Assigning SOAC system 282 is used to gather the additional information needed to process the service order. The Assigning SOAC 282 is a computer data processing system that performs input, processing, storage, output, and control functions on data contained in the service order. In general, the Assigning SOAC 282 interprets, validates, and decomposes information received from other computer systems. The Assigning SOAC 282 distributes, retrieves and gathers information to and from other computer systems that perform outside plant facility assignments, central office facility assignments, and inventory functions. In other words, the Assigning SOAC 282 is programmed to analyze certain information contained in the service order such as the customer's address and the wire center servicing that particular address. Based on files stored in an Assigning SOAC database, the Assigning SOAC 282 determines if outside plant facilities are required, and, if so, then determines which of many Loop Facility Assignment and Control Systems (LFACS) 284 contains items such as information relating to cables 204 and cable pairs 202 servicing the customer's location. The Assigning SOAC 282 then transmits to the appropriate LFACS 284 a copy of the service order containing information such as the customer address, the type of service requested, and the TDNR FID from the service order.

LFACS 284 is a data processing computer system that performs input, processing, storage and output control functions to accomplish a sequence of operations on data relating to all cable pairs 202 and cables 204 that extend to various locations in a geographic area or wire center. LFACS 284 maintains records in an associated database of all attributes associated with a particular outside cable 204 and cable pair 202, such as its location within a particular cable 204, whether the pair 202 is loaded or unloaded, and whether the pair 202 is drop connected through (CT). Based on these records and the type of service requested, LFACS 284 then selects an appropriate facility address terminal, cable 204 and cable pair 202 to provide the requested service to the customer premise 212. However, as will be further discussed below, with the present invention it is no longer problematic (as it was in the prior art system 11) if the LFACS 284 selects a cable pair 202 based upon outdated or inaccurate loading attributes for the selected cable pair 202, such as whether the cable or pair is loaded or unloaded. The cable 204, cable pair 202, and associated attributes of cable pair 13 (collectively referred to as outside plant facility assignments) are then transmitted by LFACS 284 to the computer memory of the Assigning SOAC 282.

In the system 200 when the TDNR FID is associated with the service order, LFACS 284 is programmed to input into the assignment section of the service order a FID referred to as a special service marking (SSM) FID (or a special service marking/special service provisioning (SSM/SSP) FID) that permanently is associated with the assigned outside plant facilities. The SSM code is used to indicate all locally switched circuits that were not installed using the prior art design processes under prior art system 11b (i.e., prior art ADSR circuits). Eventually all locally switched prior art designed circuits will be eliminated through attrition or when economically feasible. As will be discussed below, the SSM FID also is stored in a special provisioning (SP) section of the line records stored in LMOS when the service order is distributed on a Tier 3 basis. As will be discussed in detail below, the SSM code is used when cable throws are created to indicate a STE unit 223 potentially exists at the customer premise.

As in the prior art, the Assigning SOAC 282 also determines whether central office facilities are required, and, if so, then determines which of many COSMOS (Computer System for Mainframe Operations) 258a or SWITCH® 258b computer systems (referred to collectively as COSMOS/SWITCH 258) contains the central office facility information, such as switch ports and the cable pair 202 point of termination on the MDF 230 within the central office 206 servicing the customer premise 212.

As mentioned above, COSMOS 258a and SWITCH® 258b are computer data processing systems that perform input, processing, storage, output, and control functions to accomplish a sequence of operations on data relating to items such as the location of each terminating cable pair 202 and switch port 234 within each central office 206. In general, COSMOS/SWITCH 258 supports inventory, assignment, and administration of central office facilities, inventory, and equipment. The system 200 can be configured to use either COSMOS 258a or SWITCH® 258b. SWITCH® 258b is a newer system that is known in the art and sold by Bell Communications Research, Inc. (Bellcore) to replace COSMOS 258a. Once the appropriate COSMOS/SWITCH system 258 is selected, the Assigning SOAC 282 transmits a copy of the service order to the appropriate COSMOS/SWITCH system 258. This information is used by COSMOS/SWITCH 258 to select the central office facilities and equipment that will be used for installation of the requested service.

More specifically, COSMOS/SWITCH 258 is used for data processing information relating to central office operations such as MDF 230 records containing terminating cable pairs 202, line equipment, telephone numbers, and tie pairs. Based on the information contained in the service order, COSMOS 258a or SWITCH® 258b is programmed to access its appropriate database, and determine the point of termination on the MDF 230 in the central office 206 corresponding to the selected cable pair 202. COSMOS/SWITCH 258 also determines the location of an available switch port for the NE 236. The locations of the point of termination on the MDF 230 and the switch port 234 are referred to collectively as part of the central office facility assignments. The central office facility assignments are then transmitted by COSMOS/SWITCH 258 to the Assigning SOAC 282. As will be discussed in more detail below, the locations of the point of termination on the MDF 230 and the available switch port 234 are used by an inside frame technician 286 to install a jumper wire 232 connecting the switch port 234 to the point of termination for the outside cable pair 202.

As discussed above in the prior art system 11, if LFACS 284 or COSMOS/SWITCH 258 determines a problem or inconsistency exists based on the information stored in their respective computer memories, such as inconsistent records or a data mismatch, LFACS or COSMOS/SWITCH 258 transmits a message requesting manual assistance to the Assigning SOAC 282. When the Assigning SOAC 282 receives this request for manual assistance (RMA), the Assigning SOAC 282 then transmits a message requesting assistance to a LAC Internal Operations Management System (LOMS). The system 200 can be configured to use a Provisioning Analysis Work Station (PAWS) system instead of LOMS. PAWS and LOMS are known in the art and sold by Bellcore. PAWS is a more efficient data processing system that was developed to replace LOMS. Therefore, LOMS and PAWS a re referred to collectively as LOMS/PAWS 288. In general, LOMS/PAWS 288 refers to a computer data processing system that analyzes the request, and then distributes the request to either a facility assignment specialist person 290 or to a FACS Internal Resolution System Technology (FIRST) computer system 292 for resolution. As in the prior art, FIRST 292 is an artificial intelligence expert system such as that of Southwestern Bell Telephone Company. FIRST 292 emulates the transactions and decisions typically made by a facility assignment specialist person 290.

If LOMS/PAWS 288 determines that FIRST 292 is capable of correcting the problem, LOMS/PAWS 288 transmits the request including the error message to FIRST 292 for resolution and correction. FIRST 292 is used to provide for computerized handling and resolution of certain problems associated with service order requests that LFACS 284 or COSMOS/SWITCH 258 determines should be handled manually by a facility assignment specialist person 290. As mentioned above, FIRST 292 is an artificial intelligence (expert) system that emulates the transactions and decisions typically made by a facility assignment specialist person 290 to resolve requests for manual assistance (RMAs) generated by LFACS 284 or COSMOS/SWITCH 258. FIRST 292 is also used to provide consistency and integrity of information stored in LFACS 284 or COSMOS/SWITCH 258 computer database. For example, FIRST 292 attempts to resolve requests for manual assistance based upon problems arising when LFACS 284 is unable to find a particular street, or determines an inconsistency exists between the customer name, address or phone number. If FIRST 292 is able to resolve the problem, FIRST 292 accesses the LFACS 284 or COSMOS/SWITCH 258 computer database to update or correct the information stored therein.

If FIRST 292 is not able to resolve the problem or if LOMS/PAWS 288 determines the problem is beyond the scope of FIRST's 292 capabilities, the message requesting assistance is input from LOMS/PAWS 288 to the facility assignment specialist person 290 via a computer printout or a computer monitor screen. The facility assignment specialist person 290 then analyzes the error message and manually resolves the problem. For example, the resolution of the problem may require correction of the service order, updating and/or correcting LFACS 284 or COSMOS/SWITCH 258 databases, etc.

As discussed in the prior art system 11, after COSMOS/SWITCH 258 determines the necessary central office facility assignments, that information on assignments is then transmitted to an inside frame technician 286 in one of two ways, depending upon whether COSMOS 258a or SWITCH® 258b is used. If COSMOS 258a is used in the system 200, COSMOS 258a transmits the central office facilities assignments a copy of the service order and request for installation of a jumper wire to the frame technician 286 via a computer screen or monitor.

If SWITCH® 258b is used in the system 200, SWITCH® 258b inputs the service order into a computer controlled Frames Operation Management System (FOMS) 294 which is known in the art and sold by Bellcore. FOMS 294 is a computer system that stores the service orders in its computer memory until a date or time that corresponds to the due date. On the set date or time, FOMS 294 transmits the facility assignments and request for installation of the jumper wire 232 to the frame technician 286 via a display screen or a computer printout. In the preferred embodiment of the system 200, the SWITCH® computer system 258b is used.

Upon receiving the notification from FOMS 294 or COSMOS 258a, the frame technician 286 installs the jumper 232 from the point of termination on the MDF 230 to the switch port 234. The frame technician 286 then logs onto a Frame User Assignment System Access (FUSA) computer system 296 if SWITCH® 258b is used in the system 200, or directly into COSMOS 258a. FUSA 296 provides asynchronous access to a selected set of SWITCH® system 258b transactions in a way that is compatible with FOMS 294 input. The frame technician 286 inputs into the computer memory of either FUSA 296 or COSMOS 258a information indicating that the jumper 232 installation is complete. FUSA 296 transmits this information to SWITCH® 258b. COSMOS/SWITCH 258 updates and stores this information in its appropriate database in its computer memory.

When the Assigning SOAC 282 receives the outside plant facility assignments and the central office facility assignments, the Assigning SOAC determines which computer systems need to receive information relating to the service order to process and complete the installation of the requested service. As known in the art, the Assigning SOAC data processes information relating the service order to generate parsed service orders typically referred to as a SOAC image or SMIG for each downstream computer system involved in processing the service order. Each SMIG contains the necessary information that will be used by the particular downstream system receiving the SMIG, and is prepared in a format readable by that system. An image copy of the service order is appended to each SMIG in case additional information is required. If a particular system does not need the service order, the system discards the service order and retains the SMIG. In the following discussion of the present invention, the image copy of the service order and SMIG are referred to collectively as the service order.

As known in the art, once the Assigning SOAC 282 receives the outside plant facility assignments and inside central office facility assignments, the Assigning SOAC 282 determines if the NE 236 is involved with the service request. If the NE 236 is required, the Assigning SOAC 282 transmits information indicating the customer's telephone number and other attributes associated with the service order such as the type of service requested to a computer memory management system called a MARCH computer system 298. The MARCH computer system 298 formulates this information into computer commands referred to as translation packets in a format readable by the NE 236. The MARCH system 298 stores the translation packets in its computer memory until the due date. On the due date, the MARCH system 298 transmits the translation packets to the NE 236. The NE 236 inputs an acceptance message to the MARCH system 298 acknowledging receipt of translation packets.

As discussed above in the prior art system 11 and in the present invention with respect to DUDAS, it is conventional practice in the telecommunications industry to classify the transfer of information associated with processing a service order into one of three tiers, namely Tier 1, Tier 2 or Tier 3. As discussed above, in Tier 1, all computer systems are notified of the existance of a service order which may later require data processing functions by each system. A Tier 2 distribution of the service order is triggered in one of two situations: 1) when assignment information is required and generated by LFACS and/or COSMOS/SWITCH indicating what facilities are required to provide the requested service, and 2) when the Assigning SOAC determines assignment information is not required from LFACS or COSMOS/SWITCH®. Tier 3 (or NET 3) refers to the transmission of completion information to all computer systems indicating that the service order is complete, and the requested service and associated equipment has been installed.

As used in system 200, Tier 1 (or NET 1) distributions include the initial transmission of the service orders from the SORD 268 to the Assigning SOAC 282, and then from the Assigning SOAC 282 to the computer memories of LFACS 284 and COSMOS/SWITCH 258. This differs from Tier 1 as used in the prior art systems 11b used for prior art designed services because the new system 200 does not use the Tandem SOAC to process the service order for locally switched services when facilities associated with only one wire center are involved.

As in prior art nondesign processes, Tier 1 also includes the transmission of a message (referred to as "Message 1") from the Assigning SOAC 282 to the Work Force Administration/Dispatch Out (WFA/DO) system 270. The WFA/DO system 270 is a computer data processing system that sorts, manipulates, processes, stores, inputs, outputs, and controls data relating to the work load and dispatching of outside technicians 244. Message 1 notifies WFA/DO 270 that a pending service order exists for which WFA/DO 270 may be required to dispatch an outside technician 244. When WFA/DO receives Message 1, the service order is job logged and statused with a code such as pending facility assignments (PFA) indicating that WFA/DO is waiting notification in the Tier 2 distribution of whether facility assignments are required.

When WFA/DO receives the Tier 2 distribution of the service order, WFA/DO 270 analyzes the nature of each service order and the associated tasks to be performed, and dispatches an appropriate and available technician, if required, who meets the qualifications to perform the necessary work to complete that job. As in the prior art, WFA/DO is programmed to determine whether an outside technician needs to be dispatched, and if so, the particular technician best suited for that job, based on the following operations: (1) route the service order to determine which dispatch center is responsible for handling the service order to see that the work is completed; (2) map the service order to determine in which geographic area associated with the dispatch center the job is located (based on the customer address), and which manager, supervisory group and technician crew is associated with the particular area; (3) price the service order to determine how much time (in minutes), if any, is associated with the job to perform the work function; and (4) screen the service order to determine whether a field visit by an outside technician is needed based upon the time assigned when pricing the service order. If a technician does not need to be dispatched, WFA/DO changes the status code from PFA to pending autocomplete (PAC). If a field visit is necessary, WFA/DO changes the status code from PFA to pending load or pending dispatch. If manual assistance is needed to dispatch, WFA/DO changes the status from PFA to pending screen.

WFA/DO also establishes a job type that indicates the basic type of work to be performed on the service order. The invention differs from the prior art in that the job type assigned to the service order by WFA/DO is an enhanced job type when the requested service may require the installation of an STE unit at the customer premise. Based on the STEXX USOC associated with the service order, the enhanced job type includes a special 4th or 5th character indicating an STE unit may need to be installed or may be presently located at the customer premise. For example, the enhanced job type may be IBEAS which stands for an Installation, Business, Exchange, Analog, STE work type. While the fifth character is S in the preferred embodiment, it is possible to use any character in the fourth or fifth position to indicate a technician needs to be dispatched to determine whether an STE unit needs to be installed. The use of the special fourth or fifth character allows the job type to be refined to a USOC level. As will be discussed below, the special character can also be used, if desired, to route these types of service orders to certain designated technicians who work these types of orders.

The enhanced job type allows for more efficient dispatch of the outside technicians when compared to technician dispatch for installation of prior art designed services. As stated earlier, prior art system 11b requires dispatch of an outside technician for every service order having an ADSR FID since the technician is needed at the customer premise to assist in testing the circuit with the tester, and in aligning the circuit with the tester and central office switching technician when a customized amplifier is installed. In such prior art situation, the dispatch is based on the service code (e.g., TK, ND, DO), not the class of service. It is assumed in the prior art that any circuit that has that service code requires dispatch of an outside technician. However, this assumption is often false, and an outside technician is dispatched when he or she is not needed. In the present invention, the outside technician is dispatched based upon the work to be performed as indicated by USOCs, FIDs, and action codes.

As in the prior art, WFA/DO first evaluates the type of job to determine the first character of the job type (I for installation, M for maintenance or R for routine). Since the ADSR FID is not used for any locally switched services installed using the system of the present invention, WFA/DO evaluates the class of service (not the service code) to generate the second character of the job type which indicates the service order relates to a nondesigned special, residence, business or coin service. While the service code remains on the service order, it is not considered in creating the job type since WFA/DO processes the service order as a nondesigned order based on the class of service. The third character in the job type further defines the job (e.g., whether the job relates to cable trouble, ISDN, exchange, fiberoptic or video). In the preferred embodiment of the invention, the fourth character can be based on information such as field identifiers used in the pricing and typing tables of WFA/DO. The special fifth character (such as "S") is used when an STE unit may need to be installed at the customer premise. The special character can also be used, if desired, to route these types of service orders to certain designated technicians who work these types of orders.

After establishing the job type, WFA/DO prioritizes or weights the service order to determine the order of processing and dispatching based upon the urgency with which the service order should be completed. For example, higher priority levels are typically associated with emergency situations or missed appointments, or can be established such that all service orders relating to business customers are processed before residential customers.

WFA/DO 270 also performs date and time calculations to determine information such as when the job must be started to satisfy the due date promised to the customer, the time (minutes) remaining until the due date, and whether special access is required at the customer premise for installation of the service (e.g., technician must be at customer premise between 8 a.m. and 10 a.m.). In general, tables stored in the computer memory of WFA/DO include information indicating time required to perform tasks associated with various USOCs, FIDs, and action codes, based on past experience. In the present invention, the tables stored in WFA/DO are updated to include information indicating the amount of time required to test the line, determine whether an STE unit 223 is needed, and install an STE at the customer premise 212. The tables also include information indicating the time needed to remove an STE from the customer premise and change an STE unit at the customer premise. A work load manager may adjust date and time calculations for a particular job when overtime work needs to be performed to satisfy a due date or the job needs to be started before the scheduled due date to satisfy the due date. If the work load manager changes the date and/or time calculations for a particular job, the changed information is automatically transmitted to DUDAS 266 so that DUDAS can update its records to reflect the scheduling changes.

A work request is created in WFA/DO (in a usable format for WFA/DO) based on information associated with the service order and gathered in steps (1)–(4), the job type, and date and time calculations, indicating necessary information to dispatch a proper technician at the proper time to perform the necessary work to complete the service order.

Based on information contained in the work request, WFA/DO 270 performs force and work load selection when dispatch of an outside technician is required to determine which technician will work the service order. WFA/DO evaluates the geographic area in which the job is located to determine which supervisory group serves this area. WFA/DO then determines which technicians within the supervisory group have a technician profile that corresponds to the particular job type associated with the service request. For example, if the job type is IBEAS, a technician having a profile of IAS indicating the technician can perform tasks associate with any Installation of Analog services that may require installation of an STE unit at the customer premise would be selected by WFA/DO, along with technicians having the profiles such as IBS or I***S (where * can be any character). For those technicians whose profiles match the job type, WFA/DO determines which days and hours these technician work, and which are available for this particular job.

As in the prior art nondesign system 11a, if WFA/DO 270 determines that no tasks need to be performed by an outside technician, then WFA/DO 270 tests the cable pair for a new installation to ensure the requested service is working properly via a Mechanized Loop Testing (MLT) computer system 300. More specifically, WFA/DO transmits a list of telephone numbers to MLT 300 for testing. The MLT system 300 accesses the cable and pair on the MDF to conduct a series of tests. The MLT system 300 verifies the condition of the loop and characterizes any trouble by performing numerous tests under computer control and transmits the test results to WFA/DO 270. For example, the MLT system 300 determines if the jumper(s) was installed by the frame technician, and whether the cable pair tests defective.

If a trouble condition is not indicated, WFA/DO 270 automatically completes the service order and notifies the SORD 268 that the service order is complete. The use of autocompletion of the service order from WFA/DO 270 to SORD 268 for locally switched services that require no field work is limited in the prior art to only prior art nondesigned services (e.g., POTS and coin) processed using prior art system 11*a*, and is not available for prior art designed services processed using prior art system 11*b*. Service orders relating to prior art designed services are completed manually in WFA/C by the tester regardless of whether dispatch of an outside technician is required. In the prior art system 11*b*, WFA/C then notifies TIRKS® that the service order is complete. As discussed above with respect to prior art system 11*b*, a computer information, such as an "orders completed yesterday" (OCY) file, is transmitted from TIRKS® to SORD listing the orders that were completed the previous day using the prior art design processes. The invention extends the use of autocompletion of the service order from WFA/DO to SORD in this situation to all service orders relating to any locally switched service, including prior art designed services.

If WFA/DO 270 determines that an outside technician needs to be dispatched, WFA/DO 270 selects an available outside technician 244 based upon the factors set forth above. When an outside technician accesses WFA/DO via a technician access unit (TAU) 278 and a technician access system (TAS) 276 (discussed below) to request a job assignment, the technician inputs an employee code which is used by WFA/DO to identify the technician requesting a job. WFA/DO then determines the most suitable job for that technician based upon the factors discussed above. As in the prior art nondesign system 11*b*, the tables stored in WFA/DO can be configured to dispatch for certain action codes, USOC codes, and/or FIDs. For example, if the action code associated with a service order is "I" for installation and the equipment USOC is STEAA, an outside technician can be dispatched.

When WFA/DO 270 determines the best job match for the technician, WFA/DO transmits a copy of the service order to technician via the technician access unit (TAU) 278 and system (TAS) 276. WFA/DO then changes the status of the job from "pending load" or "pending dispatch" to "dispatched."

The TAS 276 is a computer data processing system that is designed to assist the outside technician by performing functions such as transferring information and data between WFA/DO 270 and the outside technician 244 to obtain new or current job information from WFA/DO, return jobs, or close out jobs. As in the prior art, the TAS 276 allows the technician to communicate with other computer systems such as LFACS 284 to perform a cable pair change for a line and station transfer (LST)(discussed below), the MLT system 300 to request mechanized loop tests, and LMOS to examine customer line records. Examples of TASs known in the art include a Technician Access Unit (TAN) sold by Bellcore, a Craft-Access system sold by AT&T, an Universal Technician Remote Access (ULTRA) system of Southwestern Bell Telephone Company, or a Remote Force Access System (RFAS) of Southwestern Bell Telephone Company.

As will be discussed in greater detail below, the TAS 276 employed in the system 200 of the present invention also communicates with LFACS to add or remove a remarks entry in the facility address preferably referred to as ;S.T.E. when a STE unit is left at the customer premise after service is disconnected. In addition, the present invention allows for the TAS 276 to communicate directly with SORD to modify or change the service order. More specifically, the TAS 276 can change any portion of the service and equipment (S&E) section of the service order stored in the SORD system, including correcting, updating or removing the USOC used to designate that an STE unit may need to be installed (e.g., STEXX or STEAS). In this situation, the technician access unit also completes the service order in SORD (see discussion below).

As in the prior art, the outside technician accesses the TAS 276 using the TAU 278. The TAU 278 can be a portable hand-held unit or handset having a dual tone multifrequency key pad or any asynchronous device with dual tone multifrequency capabilities, or a microcomputer or laptop computer that provides data processing functions which allow for the transfer of information and data between the TAS 276 and the outside technician 244. Examples of TAUs known in the art include a Craft-Access unit sold by AT&T, a Melard unit, and a Random Colleague device.

When the technician 244 logs into the TAU 278 and requests a new job, the TAU 278 accesses a TAS 276, which, in turn, accesses WFA/DO 270 and requests a new job or information on an existing job. WFA/DO 270 transmits a copy of the service order to the TAU 278. A copy of the service order appears on the screen of the TAU 278 for the selected technician 244. The outside technician 244 then travels to the customer premise 212 to perform the tasks required to complete the service order.

This system 200 is much more efficient than the prior art system 11*b* used to process service orders relating to locally switched prior art designed services which typically required transmission of information to and from the Tandem SOAC 81, TIRKS® 113, NSDB 111*b*, TOS 135, PICS 127, LOGIC 129, WFA/C 115, and WFA/DI 123, as well as the services of a design engineer 121, a tester 133, a MDC technician 131, and an inside switching technician 125, all before the service order is transmitted to the outside technician 103 from WFA/DO via the TAU and TAS. In the system 200 of the present invention, all of these above-mentioned systems, technicians and testers are eliminated for processing of all service orders relating to locally switched services such that the information is transmitted directly from the Assigning SOAC 282 to WFA/DO 270 and then to an appropriate outside technician 244 via the TAU 278.

More specifically, when the technician arrives at the customer premise, the technician 244 conducts a series of tests. If the cable pair 202 is defective (e.g., short, grounded, crossed, or open), the technician 244 performs a Line and Station Transfer (LST) to a different cable pair within the cable 204 using the TAS 276 (via the TAU 278) to access LFACS 284. In this situation, LFACS 284 updates the service order and all associated systems requiring the information indicating the new cable pair including WFA/DO 270. As in the prior art system 11*a*, if LST affects the point of termination on the MDF, different central office equipment must be assigned by SWITCH®. In this situation, LFACS sends notification to SWITCH® via the Assigning SOAC indicating that the office equipment will change. The frame technician is notified via FOMS to change the jumpers 232 based upon the new cable pair.

The technician 244 also checks for dial tone, performs ring-back tests and noise analysis. The technician also measures the loop current at the network interface 218 to determine if a proper amount of current is being supplied to the customer premise 212 from the central office power source 248. Typically, the current measured at the network interface 218 should be approximately 20 mA to 23 mA to obtain a ringing tone. If insufficient current is supplied to the network interface 218, the signaling is out of limits, and further tests must be conducted to identify the source of the problem and correct the current supply problem before deciding whether the STE 223 should be installed. As is well known to those skilled in the art, the service order is typically referred to an outside plant engineer for review to determine if a regulator ("reg." unit) should be installed at the central office 206 to overcome insufficient current for analog services.

If analog or digital service is requested and sufficient loop current is being supplied to the network interface 218 from the central office 206, the loop loss is then measured by the technician 244. The technician then determines whether the loop loss measured is appropriate for the requested service. If the loop loss is acceptable for the requested service (8½ dB for POTS and 4½ dB for certain nondesigned special services), the STE unit 223 is not installed.

If the loop loss exceeds acceptable levels (8½ dB for POTS and 4½ dB for certain nondesigned special services), the technician installs a STE unit 223 on the network side of the network interface. For outside installation, the STE can be wired between the network side of the network interface and a protector 216 that can be contained within the housing 222 located outside the customer premise as shown in FIG. 7. For inside installation, the STE can be installed between the network side of the network interface and a terminal strip connected to a protected terminal interface 242 (or protector 216 (not shown)) located inside the customer premise as shown in FIG. 8.

If the loop loss exceeds 10 dB for an analog nondesigned special service request, the technician 244 performs a line and station transfer (LST) to replace the cable pair 202 on the spot, and then retests the cable pair 202 to determine whether the loop loss still exceeds 10 dB. If the loop loss still exceeds 10 dB, the loop is out of limits and further tests must be conducted to identify the source of the problem. If the loop loss exceeds 10 dB for POTS, the technician can perform a LST or install a STE unit at the customer premise to provide a loop loss within an acceptable range.

When the network interface is located outside the customer premise as shown in FIG. 7, the technician 244 connects the STE unit 223 between the protector and the network side of the network interface. Wires 224 can be used to connect output terminals of the protector 216 to input terminals of the STE unit 223. A second pair of wires 304 connects the output terminals of the STE unit to terminals associated with the network side of the network interface. The network side of the network interface is effectively coupled to the customer side of the network interface via conductors 224. Terminals associated with the customer side of the network interface are then connected to CPE 220 via customer wiring 226.

When the network interface is located inside the customer premise (e.g., PBX customers), the STE 223 is installed inside the customer premise 212 as shown in FIG. 8. The cable 204 generally extends into the customer premise, and the cable pair 202 is connected to metallic connection points associated with a protected terminal interface 242. A first pair of wires 306 connects terminals of the protected terminal interface 242 (or a protector if the terminal interface is unprotected) to input terminals of the STE 223. A second pair of wires 308 connects output terminals of the STE 223 to terminals associated with a network side 218a' of the network interface 218. The network side 218a' is connected to the customer side 218b' via wiring or bridge clips 221'. Terminals associated with the customer side 218b' of network interface 218 are connected to customer premise equipment 220 such as a PBX via customer wiring 226.

Once the STE 223 is installed, the loop loss is automatically maintained within the preselected range for the service provided across the cable pair 202. When the technician 244 completes the tasks at the customer premise 212, the technician 244 logs into the TAS 276 via the portable TAU 278, and inputs completion information (Tier 3) in response to a series of questions such as information indicating the length of time needed to perform regulated or deregulated work, whether an LST was performed, whether a drop-wire was present or needed to be installed, whether the service order related to a new installation or a reinstallation, etc. If the technician inputs information indicating an STE unit was installed and no change needs to be made to the STEXX USOC (e.g., STEAA was originally populated on the service order and correctly identifies the type of STE unit installed), then the TAS 276 transmits this information along with all other completion information to WFA/DO 270. WFA/DO 270 data processes this information to complete the service order, and then transmits a completed service order to the computer memory of the SORD system 268.

If the technician inputs information indicating an STE unit was not installed, the TAS 276 accesses the SORD system 268 directly, and removes the STEXX USOC code from the S&E section of the service order. The TAS 276 inputs all other completion information into the statistics section of the service order, and completes the service order in SORD. The TAS 276 then accesses WFA/DO, and instructs WFA/DO to complete the service order in WFA/DO 270. The TAS 276 also transmits a message to WFA/DO indicating that WFA/DO is not required to transmit completion data to the SORD system.

Similarly, if the technician needs to change or update the STEXX USOC because the USOC originally populated does not accurately identify the unit installed, then the TAS 276 accesses SORD directly to update or correct the USOC stored in the S&E section of the service order. For example, if a USOC for a fully automatically resettable STE unit was originally indicated (STEDA) but manually resettable STE unit is actually installed by the technician (STEDM), TAS 276 would access SORD to correct the USOC to indicate the type of STE unit installed. The TAS 276 inputs all other completion information into the statistics section of the service order in SORD, and then completes the service order in SORD. The TAS 276 then accesses WFA/DO, and also completes the service order in WFA/DO. However, the TAS 276 instructs WFA/DO not to transmit the completion information to SORD since the service order has already been completed in SORD.

Regardless of whether the STE unit is installed at the customer premise, the SSM flag designation is not removed from the assignment section of the LFACS 284 computer memory. The SSM FID also is a permanent part of the special provisioning (SP) section of the customer's line records stored in LMOS indicating this is a special service circuit, regardless of whether the STE 223 is installed.

The SORD 268 data processes the completion information (received from the TAS 276 or WFA/DO), and inputs the completed service order to the computer memory of a billing system 310, such as a Customer Record Information System (CRIS) or a Customer Access Billing System (CABS). The billing system 310 is a computer data processing system that inputs an appropriate charge on the customer's account for installation of the service, and generates bills for that customer based on the completion information data. The billing system 310 uses computer data processing to process the completion information data, and inputs an appropriate charge on the customer's account for installation of the service. The billing system transmits the completion information to BOSS 274 to update the customer records stored in its computer memory. The SORD 268 also inputs a notification message to LFACS 284 and COSMOS/SWITCH 258 through the Assigning SOAC 282 that indicates the circuit is working.

In addition, SORD 268 inputs a copy of the completed customer service order into the computer memory of a Loop Maintenance Operations System (LMOS) 312*a* or a Network Services Data Base (NSDB) computer system 312*b*, depending on the configuration of the system 200. LMOS and NSDB, referred to as LMOS/NSDB 312, are data processing systems that create and/or update and store customer line records including information associated with the type of service provided, when the service was installed, outside plant facilities and equipment, cables and pairs employed, the customer name, address, telephone number, the SSM indicator (if applicable), central office facilities, etc. LMOS/NSDB 312 store the customer line record information in their respective computer memories which may be accessed at a future time if maintenance or repair work is needed for the circuit. LMOS 312*a* is typically used in telecommunications companies to store customer line records in its computer memory relating to services installed using nondesign processes. As discussed earlier, NSDB, WFA/C and TIRKS® are typically used in prior art system 11*b* to store records relating to services installed using prior art design processes. The preferred embodiment of the invention uses LMOS and/or NSDB to store records relating to all locally switched nondesigned services processed using the system 200, including locally switched special services. NSDB 312*b* is preferably only used to inventory records relating to locally switched ISDN services to maintain records relating to channel assignments within the facility (pipe) and prior art designed special services. TIRKS® and WFA/C are not used in the system 200 of the present invention. The system 200 can be configured such that all nondesign records are also stored in NSDB along with design records.

The entire installation and processing of service request relating to any locally switched service (including prior art designed service) using the system 200 can be accomplished on the same day the service is requested. The period of time required to process the service order and provide the requested service is limited only by the availability of outside dispatch, when needed. The system 200 presents a much faster and more economical method of installing service requests relating to locally switched special services than used in the prior art system 11*b*. Furthermore, the system 200 improves upon the prior art nondesign system 11*a* by allowing all service requests relating to any locally switched service, including prior art designed services, now to be processed using the improved nondesign systems and methods of the present invention. The invention also allows for special line conditioning equipment (STE units) to be used at the customer premise, and provides a system for identifying, tracking and processing information relating to such equipment when processing a service request using only the improved nondesign processes.

In the system 200 of the present invention, a loaded or unloaded cable pair can be assigned by LFACS. If an unloaded cable pair is selected by LFACS for a nonspecial analog (e.g., POTS) or digital service, a TDNR FID will not be associated with the service order by SORD and the SSM FID will not be populated by LFACS. Since the order taker person 252 would not know that an unloaded cable pair will be assigned by LFACS at the time the service order is prepared, the order taker person 252 will not input the TDNR FID or the STEXX USOC. Similarly, the SORD system will not input the STEXX USOC in the S&E section of the service order in this situation. Nonetheless, an STE unit may need to be installed to maintain the loop loss within the desired range since the cable pair is unloaded. However, as discussed above, the STEXX USOC is used to create the enhanced job type which triggers the dispatch of an outside technician by WFA/DO to determine if an STE unit needs to be installed at the customer premise. As will be discussed below, the presence of the STEXX USOC is also used to indicate whether an STE unit is existing at the customer premise when service is disconnected and needs to be removed.

To overcome this apparent obstacle, the system of the present invention can be configured in one of following manners such that the STE USOC is input in the S&E section. In one embodiment, LFACS 284 is programmed to generate a request for manual assistance (RMA) when an unloaded cable pair is available to be assigned to a service order requesting analog services and the resistive zone (RZ) exceeds a specified zone (e.g., exceeds RZ13). As discussed above, the request for manual assistance is sent from LFACS to LOMS/PAWS via the Assigning SOAC. LOMS/PAWS preferably is programmed to transmit the request to FIRST 292 in this situation. FIRST 292 is programmed to examine the service order sent to LFACS 284 to determine if the service order is for installation of a nondesigned service and, if so, whether an STEXX USOC is present in the S&E section of the service order. If the STEXX USOC is present for a nondesigned special service request, FIRST accesses LFACS and assigns the unloaded cable pair to the service order. If the STEXX USOC is not present, FIRST 292 accesses SORD 268 directly to generate a correction order to input an STEXX USOC in the S&E section of the service order. When LFACS receives the corrected service order, LFACS 284 is programmed to generate a request for manual assistance (RMA) when an unloaded cable pair is available to be assigned to a service order requesting analog services and the resistive zone (RZ) exceeds a specified zone (e.g., exceeds RZ13). As discussed above, the request for manual assistance is sent from LFACS to LOMS/PAWS via the Assigning SOAC. LOMS/PAWS preferably is programmed to transmit the request to FIRST 292 in this situation. When FIRST receives the corrected service order including the STEXX USOC, FIRST assigns the unloaded cable pair to the service order, and transmits the assignment information via LFACS to the Assigning SOAC for processing as discussed above.

Alternatively, LOMS/PAWS 288 can transmit the RMA to the assignment specialist person 290. In this situation, the assignment specialist person accesses SORD 268 to issue a correction order to add the STEXX USOC to the S&E section of the service order. The assignment specialist person 290 also accesses LFACS 284 to assign the unloaded cable pair to the service order.

In another embodiment of the invention, if an unloaded cable pair is assigned by LFACS 284, and if when the technician installs an STE unit 223, the TAS 276 can then access SORD 268 to input an STEXX USOC in the S&E section of the service order. In this situation, the technician also inputs completion information into the SORD system via the TAS to complete the service order. The TAS also transmits the completion information to WFA/DO 270 to complete the service order in WFA/DO. A notifier also is sent to WFA/DO 270 from the TAS 276 indicating that WFA/DO 270 does not need to pass the completion information on to SORD 268 since the service order already was completed in SORD.

If the service order relates to a request to disconnect a service provided across circuit having an STE unit installed thereon, the service order is processed using the systems set forth above and shown in FIG. 9. When the service order is transmitted to WFA/DO 270, WFA/DO determines an STE unit is installed at the customer premise based upon the STEXX USOC associated with the service order. WFA/DO and its associated tables can be configured either to dispatch an outside technician to retrieve the unit 223 via the TAS 276 and TAU 278, or to automatically complete the service order without dispatching the technician to retrieve the STE unit 223. While the STE units are preferably removed by the technician at the time of disconnect, a detailed discussion follows explaining the possible configurations of system 200 if the telecommunications company desires to leave the STE unit at the customer premise 212 after the service is disconnected.

If the tables associated with WFA/DO 270 are configured to generates a "no field work" (NFW) order, no field work is performed by an outside technician at the time service is disconnected. In this situation, an installation control center (ICC) clerk must access either the TAS 276 or LFACS 284 to input information indicating the STE unit 223 was not removed from the customer premise 212 when the service was disconnected to the customer premise.

In one configuration, WFA/DO is programmed to assign all disconnect service orders having a special fourth or fifth character associated with the job type (such as the character "S" indicating an STE unit is installed) to a fictious crew number. More specifically, when WFA/DO prices the job, WFA/DO preferably assigns one minute to the service order for these job types to avoid autocompletion of the service order. These service orders are pooled and assigned a job type that directs the service order to the fictious crew. In this situation, the installation control center (ICC) clerk preferably logs into WFA/DO via the TAS 276 (such as ULTRA) and a TAU 278 using the fictious crew number, and inputs completion information in response to a series of questions that would otherwise be answered by an outside technician 244. The completion information input by the ICC clerk includes information indicating the equipment is left in at the customer premise 212. Since the STE unit 223 is not retrieved from the customer premise, the TAS 276 accesses LFACS to extract information stored in the remarks field of the facility address associated with the assignment section of the service order. The TAS adds a remarks entry such as ";S.T.E." to this information, and then repopulates the extracted information and the ;S.T.E. remarks entry in the remarks field of the facility address associated with that customer address. The ;S.T.E. remarks entry becomes a part of the LFACS database which can be used for future removal of equipment left in at the customer premise after disconnect. The TAS 276 then transmits the clerk completion information to WFA/DO 270, and WFA/DO completes the service order. WFA/DO transmits the completed service order to SORD 268 for normal Tier 3 distribution as discussed above. Alternatively, the ICC clerk can directly access LFACS 284 to input the remarks entry such as ;S.T.E. in the remarks field of the facility address associated with the service order, and either complete the service order in WFA/DO and SORD, or restatus the service order for no filed work (PAC) such that the service order is automatically completed in WFA/DO and SORD.

In a second possible configuration, WFA/DO can be configured so that no time is assigned to the particular job type associated with the disconnect service order when technicians are not dispatched to retrieve STE units. In this situation, the disconnect service orders are sent automatically to a pending automatic completion (PAC) file associated with WFA/DO with a special handling code. The ICC clerk accesses WFA/DO to retrieve a listing of job types associated with NFW disconnect service orders having the special handling code indicating STE equipment exists at the customer premise. The ICC clerk then can accesses LFACS, and inputs into the computer a remarks entry such as ;S.T.E. in the remarks field of the facility address associated with assignment section of the disconnect service orders. WFA/DO automatically completes the service order, and transmits the completed service order to SORD for normal Tier 3 distribution as discussed above.

At a later time, LFACS can generate a paddle report based upon certain information or criteria including the ;S.T.E. remarks entry associated with the facility address, indicating STE units exist at particular addresses where service has been disconnected. This report, preferably referred to as a RMKSSTE report or a "STE left-in-equipment" file or inventory record report, is then given to an outside technician who can travel to the listed addresses to remove the STE units left at the customer premise at the time of disconnect. After the technician recovers the units, the technician can mail the completed report to the assignment specialist person 290. The assignment specialist person 290 manually updates the LFACS database by removing the ;S.T.E. indicator from the facility addresses corresponding to those locations where the STE units were removed. Alternatively, the technician can access LFACS via the TAS 276 to remove the ;S.T.E. remarks entry. After the technician removes the unit in this situation, the technician inputs the address exactly as it appears on the report into the TAS via the TAU, the TAS transmits information indicating this particular address to LFACS, and a transaction is executed in LFACS 284 to remove the ;S.T.E. indicator from remarks field of the facility address associated with the assignment section of the service order.

If the tables stored in WFA/DO are configured to dispatch an outside technician when the service is disconnected, the technician then has the option of removing the STE unit and completing the service order, or completing the service order without removing the unit. The TAS 276 is programmed to query the technician as to whether the STE unit is removed when the technician completes the service order. If the STE unit is removed, the service order is completed in the manner discussed above where the technician inputs the completion information into WFA/DO 270 via the TAS 276 and TAU 278, and then WFA/DO 270 transmits the completed service order to SORD 268 which, in turn, distributes the completed service order to LFACS 284, COSMOS/SWITCH 258, the billing system 310, BOSS 274 (via the billing system), and LMOS (or NSDB) 312.

If the STE unit 223 is not removed by the technician, the technician access system 276 (e.g., ULTRA) accesses LFACS 284 to input a remarks entry such as ";S.T.E." in the remarks section of the facility address. More specifically, the TAS accesses LFACS to extract information stored in the remarks field of the facility address associated with the service order. The TAS adds a remarks entry such as ";S.T.E." to this information, and then repopulates the extracted information and the ;S.T.E. remarks entry in the remarks field of the facility address associated with the assignment section of the service order. Those STE units that are not removed when service is disconnected can be recovered at a later time by an outside technician. A paddle report (RMKSSTE report) is generated based on information stored in LFACS indicating where the STE units are located. The paddle report is then sent (via mail, fax, printer, etc.) to the outside technician, and the technician then travels to the customer premises to recover the STE units. As mentioned above, after the technician recovers the units, the technician can mail the completed report to the assignment specialist person 290. The assignment specialist person 290 manually updates the LFACS database by removing the ;S.T.E. indicator from the facility addresses corresponding to those locations where the STE units were removed. Alternatively, the technician can access LFACS via the TAS 276 to remove the ;S.T.E. remarks entry. After the technician removes the unit in this situation, the technician inputs the address exactly as it appears on the report into the TAS via the TAU, the TAS transmits information indicating this particular address to LFACS, and a transaction is executed in LFACS 284 to remove the ;S.T.E. indicator from remarks field of the facility address associated with the assignment section of the service order.

If a service request for a new installation is received for a customer premise where a STE unit is installed that was not retrieved after a prior service was disconnected, the ;S.T.E. remarks entry will appear in the facility address remarks (RMKS) field in the assignment section of the service order. If a dispatch is made to the customer premise, the technician accesses LFACS via the TAS using the TAU to remove the ;S.T.E. entry from the RMKS section. The technician also accesses SORD via the TAS using the TAU and adds the STEXX USOC code to the S&E section of the service order to update the customer line records to reflect the presence of the STE unit at the customer premise.

If it is not desired to dispatch a technician to verify the installation of the STE unit, tables associated with WFA/DO can be configured to generate a "no field work" order" (no minutes assigned to the service order) so that the service order is automatically completed in WFA/DO.

In this situation, FIRST is configured to generate a computer report on a programmable basis from LFACS that indicates all working services having the ;S.T.E. remarks entry in the facility address. FIRST then removes the ;S.T.E. indicator from the facility address records stored in LFACS for those circuits that are providing working service. FIRST accesses SORD to issue a records order with an action code indicating a STEXX USOC must be input into the customer line records maintained by LMOS/NSDB. In this situation, the fourth and fifth characters of the USOC are XX since an unidentified STE unit is installed at the customer premise. If and when the STE unit is later identified by a technician (e.g., when processing a repair trouble report or if the technician is dispatched for installation), the technician can correct the STEXX USOC to properly reflect the type of unit installed at the customer premise by using the TAS to access SORD to update the USOC and complete the related service request.

IV. MAINTENANCE AND REPAIR PROCESSES

Figure 10:
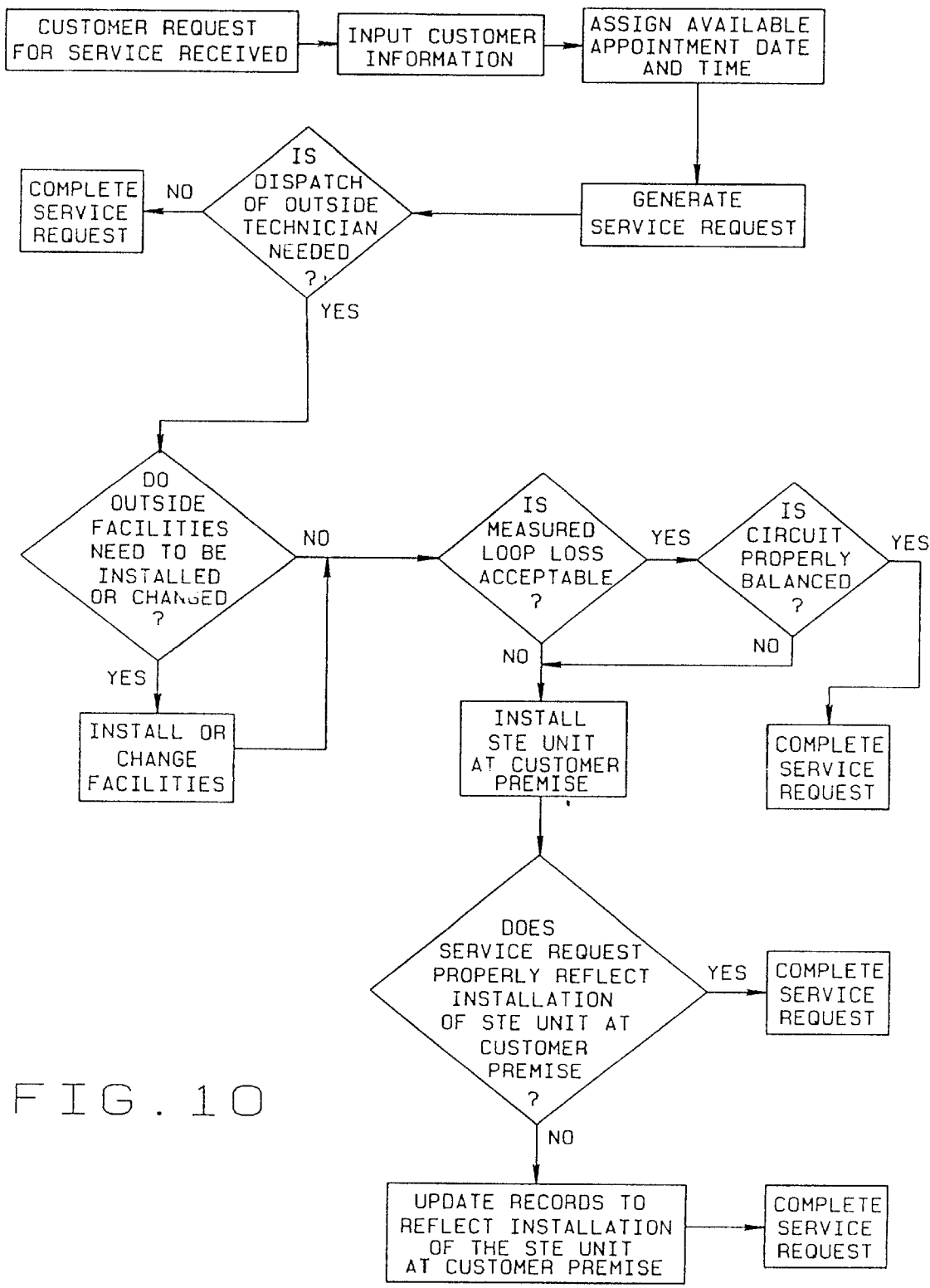
FIG. 10 is a flow chart illustrating the telecommunication system and method of the present invention for processing a service request for installation, maintenance or repair of a local loop used to provide locally switched nondesigned service to a customer premise.
Figure 11:
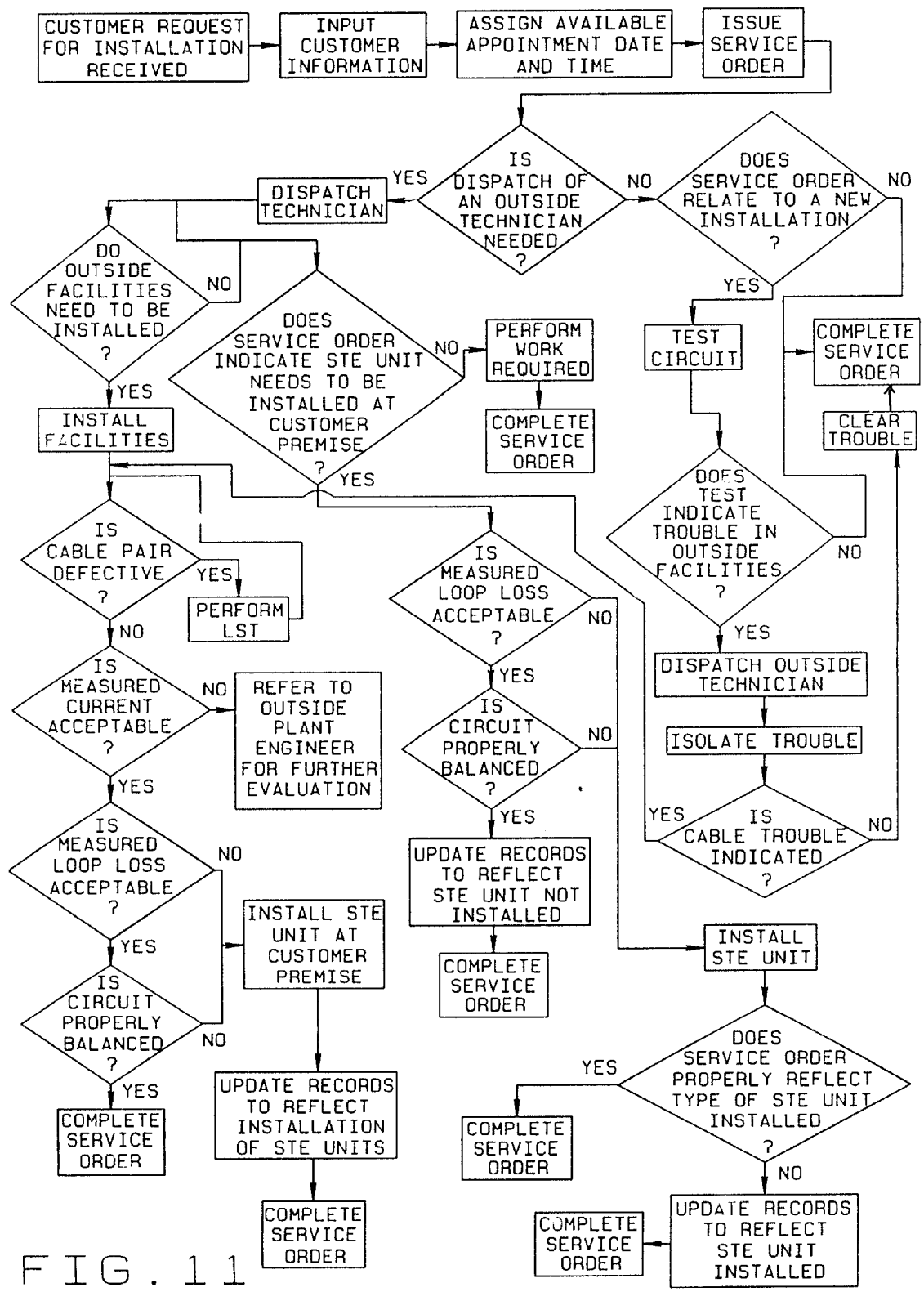
FIG. 11 is a flow chart illustrating the telecommunication system and method of the present invention for processing a service request for installation of a locally switched nondesigned service across a local loop to a customer premise.
Figure 14:
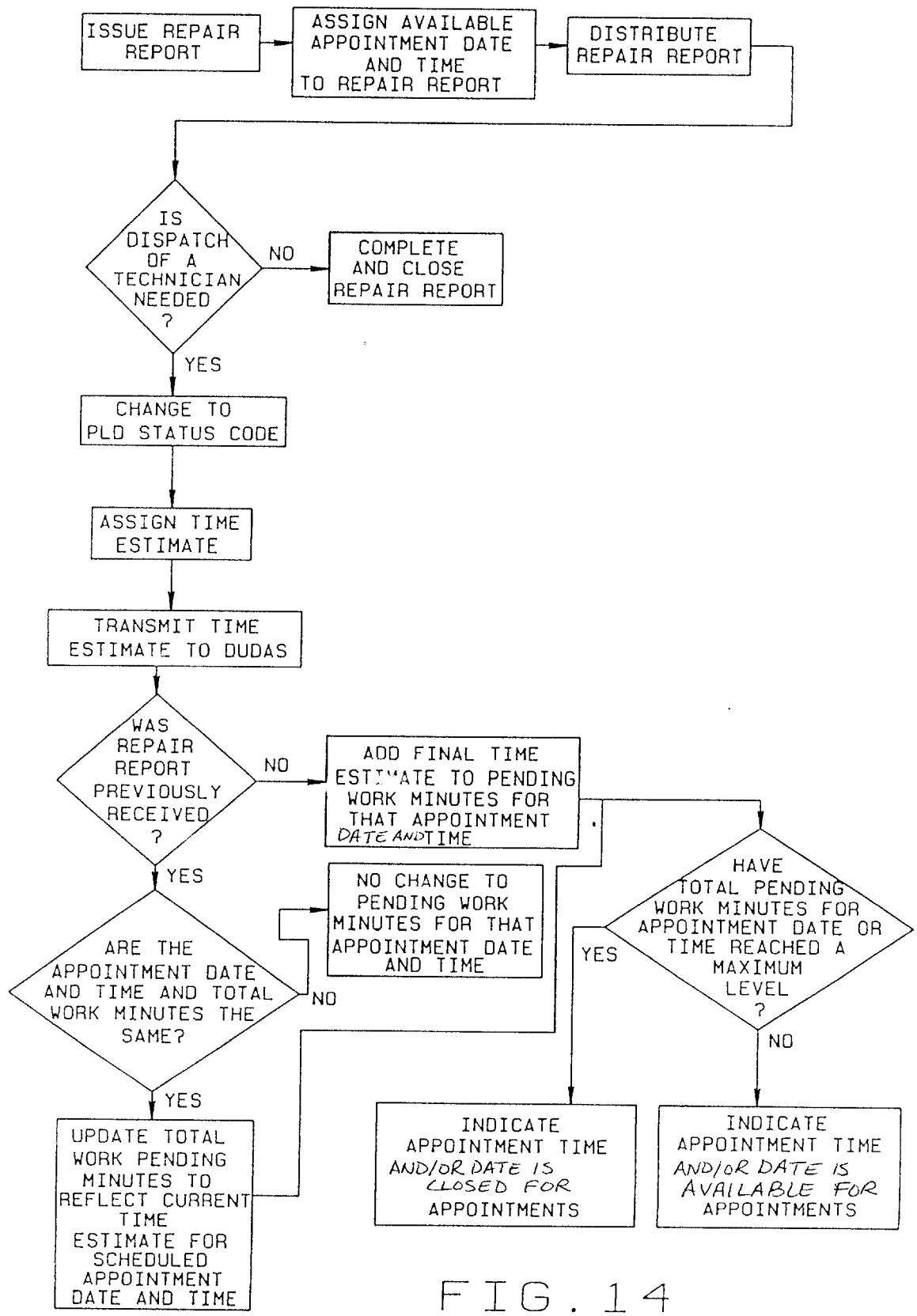
FIG. 14 is a flow chart illustrating the telecommunication system and method of the present invention for assigning an available appointment date and time to a repair report.
Figure 15:
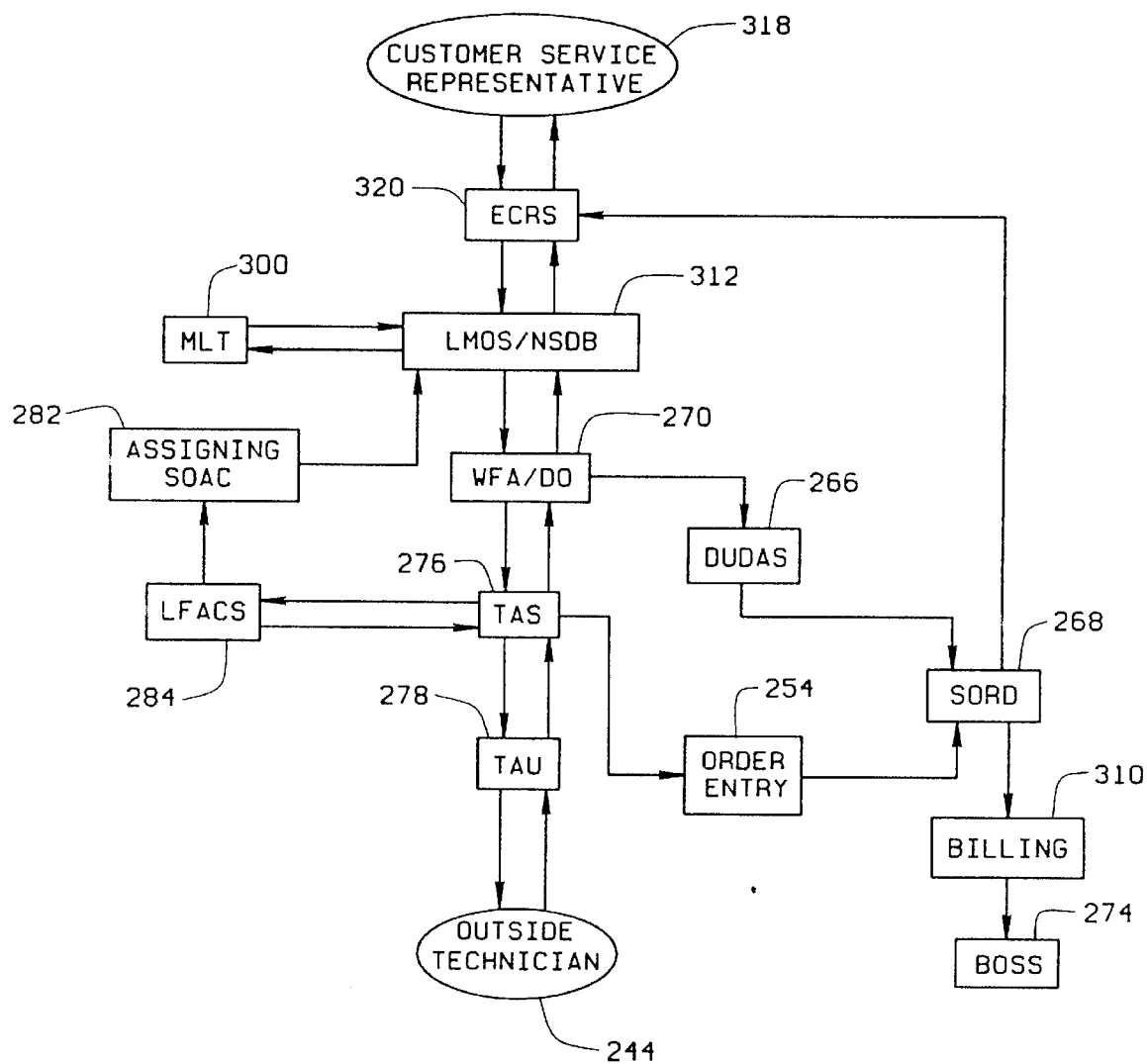
FIG. 15 is a block schematic diagram of the computer network of the present invention used for processing service requests relating to the repair of locally switched telecommunication services.

Turning now to FIGS. 10, 14 and 15, the system 200 of the present invention may also be used for processing data relating to a repair or trouble report founded on a customer complaint regarding a locally switched POTS, coin or special service that was installed using any prior art design process, prior art nondesign process, or the nondesign processes of the current invention. The customer can file a repair report with the telecommunications company by calling a customer service representative (or repair clerk) 318 or through an interactive voice response (IVR) system. The customer service representative or customer (via the IVR system) accesses a computer system such as an Enhanced Customer Reporting System (ECRS) 320 of Southwestern Bell Telephone Company to generate the trouble report. The customer or service representative inputs information such as the circuit number and nature of the problem into ECRS 320. The ECRS system 320 then accesses LMOS or NSDB 312 to retrieve the customer line records for that circuit. ECRS 320 converts information from the customer line records and input by the service representative (or customer) into a usable format for other computer systems handling the trouble report. When a service representative 318 is involved, ECRS 320 displays on a screen associated with the computer system a portion of the customer line records to the service representative indicating certain information such as cable and pair to assist the service representative 318 in gathering information to prepare the report. If the SSM FID appears in the customer line records, ECRS 320 can be programmed to place in the remarks field of the trouble report information such as "possible STE involvement" to alert the service representative and technician of the possibility that an STE unit exists at the customer premise.

ECRS then inputs this information into the computer memory of LMOS/NSDB, and LMOS/NSDB data processes this information to generate a trouble report. Alternatively, the customer service representative can directly access LMOS/NSDB 312 to generate a trouble report. When the SSM FID appears in the customer line records, the customer service representative can place in the remarks field of the trouble report information such as "possible STE involvement" to alert the technician of the possibility that an STE unit exists at the customer premise.

Prior to issuance of the trouble report, LMOS 312a accesses a computer testing system that is known in the art such as the Mechanized Loop Testing (MLT) system 300, and inputs necessary information for testing such as the customer telephone number into the testing system. Based on the information received from LMOS, the testing system conducts preliminary tests on the cable pair (tests each conductor individually and one conductor against the other) for problems such as shorts, grounds, opens, and resistance on the line. When the testing system completes the tests, the testing system transmits test result information to LMOS. LMOS evaluates the test results reported by the testing system, determines the severity of the problem(s), formats the test information, and appends the information to the trouble report. LMOS then passes the trouble report and test results to WFA/DO.

Based on the trouble report and test results, WFA/DO 270 determines whether an outside technician needs to be dispatched. As discussed above with respect to service orders, WFA/DO performs maintenance job logging (service, routing, mapping, pricing, job typing, prioritizing, date and time calculations, and work request creation) and force and work load selection (based on technician availability, travel distance calculations, job weight calculations, and loading support tables) to determine which technician, if any, needs to be dispatched. If a circuit tests open in the central office or otherwise indicates trouble in the central office, an outside technician does not need to be dispatched. In this situation, an inside technician is contacted to correct the problem. If a technician needs to be dispatched, WFA/DO changes the status of the trouble report to a pending dispatch or pending load (PLD) status as indicated in FIG. 14.

As mentioned above when discussing the DUDAS computer system 266, DUDAS can be used to schedule appointments for both installation and repair. While the assignment of the time estimate by WFA/DO differs when processing repair reports when compared to installation service orders (FIG. 12), the functions performed by DUDAS are similar for installation and repair. As shown in FIGS. 14 and 15, when a repair report is issued, ECRS accesses SORD to obtain the next available appointment date and time. This date and time then is assigned to the repair report. The repair report is then distributed by LMOS/NSDB 312 to WFA/DO 270 as discussed above. If a technician does not need to be dispatched, the repair report is completed and closed by an inside technician or WFA/DO. When a trouble report is statused for a field visit in WFA/DO, WFA/DO determines and assigns to the repair report an estimated time (minutes) representative of the average time associated with repair of the type of trouble reported by the customer based on past experience. WFA/DO transmits the estimated time, repair report number, customer telephone number, wire center designation, scheduled appointment date and time, and customer address to DUDAS 266. DUDAS determines if the repair report was previously received (e.g., appointment date or time changed, another report was issued, or customer changes trouble information).

As discussed above with respect to installation, DUDAS 266 keeps track of available technician minutes, and compares the available minutes to the number of minutes already committed as shown in FIG. 14. More specifically, if the repair number and wire center designation were not previously received, DUDAS 266 updates its records indicating the total scheduled time in that geographic area for that date and time based upon the time estimate. In the preferred embodiment, DUDAS 266 adds the time estimate to all other pending work minutes in that geographic area (wire center) for that date and time until a predetermined maximum limit is reached and the date or time is closed. DUDAS 266 also updates records stored in DUDAS 266 to reflect the information received from WFA/DO 270. DUDAS 266 then sends notification to SORD 268 indicating the availability of appointments based on available work force. SORD 268 then stores information in its computer memory indicating the availability of appointment dates and times. In the preferred embodiment, ECRS 320 accesses SORD 268 to obtain the next available appointment date and time. As long as an appointment date and time is open (technician is available), the customer service representative is able to schedule appointments during that time interval. When the total time available is exhausted (or exceeded), DUDAS 266 sends notification to the ECRS system 320 via SORD 268 that the date or time is closed. The available time for a set time interval or date is continuously updated. If an appointment is canceled, DUDAS 266 adjusts the available time for the time interval in which the appointment was previously scheduled so as to make that time available for another appointment.

If the repair report and wire center designation were previously received by DUDAS 266, DUDAS 266 examines and compares the previous time estimate, due date, wire center, date and time to see if there are any deviations or changes in the prior information in view of the current information just received by DUDAS 266. If there is no change in the information, DUDAS does not adjust its records. If there are any changes, all changed (superseded) information is withdrawn from the cumulative records maintained by DUDAS 266, and all new information is input to these records. In other words, if there is a change in the date, appointment time, and/or time estimate, DUDAS 266 changes or adjusts its records to make the prior date and/or time available. In the preferred embodiment, DUDAS 266 subtracts the superseded appointment time from the pending work minutes, and adds the updated actual time estimate and/or inputs the current information in its computer memory. Therefore, appointments that were previously closed may become available if there is a change in the time estimate, due date and/or appointment time. The updated information is transmitted by DUDAS 266 to SORD 268, and SORD 268 stores this information in tables stored in its computer memory.

As discussed above for installation, based upon the information transmitted by DUDAS 266, SORD 268 data processes this information to continually update records stored in its computer memory indicating whether appointments are open, closed, unavailable (not offered), or the time falls on a holiday, and transmits this information to the computer order entry system 254 to assist the order taker person 252 in scheduling appointments. The appointment times can be defined as any time interval (such as A.M. and P.M. appointments where the A.M. and P.M. time interval can extend between any predefined time limits, or divided into two hour increments). Appointments that are designated as closed or unavailable can be overridden so that appointments can be scheduled for these closed or unavailable time intervals. Election to override this type of designation could be made in emergency situations, for installations or repairs requiring immediate attention, or for other unexpected reasons.

If a technician works both installation and repair, the number of minutes associated with both will be accumulated together to determine the next available date and appointment time. Scheduling of appointments for repair tickets is handled in a similar manner as installation appointments, with the exception that ECRS 320 is used to generate the trouble report instead of the computer order entry system 254 that was used to create a service order. If a technician works both installation and repair, DUDAS maintains records stored in its computer memory indicating the technician availability to work on a work request relating to installation or repair. DUDAS data processes the information to determine whether a particular date or time is available for scheduling appointments relating to installation or repair. DUDAS 266 can be configured to send notification to the computer order entry system via SORD and to ECRS 320 directly, or can be sent to ECRS 320 via SORD indicating whether a date or time is open, closed, or unavailable for appointments as shown in FIG. 15.

If a technician is dispatched by WFA/DO (via the TAS 276 and TAU 278), the technician travels to the customer premise to correct the problem associated with the repair report. When the problem is corrected, the technician logs into the TAS 276 via the TAU 278 to input completion information.

If the technician installs an STE unit 223 where an STE unit was not previously installed, the technician inputs completion information including a disposition code (what was done to correct the problem) indicating the STE unit was installed to correct the trouble. For example, the technician can input a disposition code such as 0399 when an STE unit 223 is installed in this situation. The TAS 276 can be programmed to verify that an STE unit was installed when the particular disposition code is entered by presenting the technician with a question to which the technician must respond, indicating whether the STE unit was installed. When the technician verifies that the STE unit is installed, the TAS 276 automatically accesses the computer order entry system 254 to generate a service order at a Tier 3 level that includes the USOC (e.g., STEAM or STEDA) that properly identifies the type of unit installed based upon information input into the TAS via the TAU by the technician by indicating whether the unit is manually, semi-automatically or fully automatically resettable and whether the service and equipment are analog or digital. The computer order entry system 254 accesses BOSS 274 to retrieve customer information associated with customer line records that is needed to generate the service order. The computer order entry system 254 transmits the service order to the SORD system 268. As part of the Tier 3 distribution, SORD 268 transmits the service order to LMOS 312, the billing system 310, and BOSS 274 (via the billing system 310) to update the customer records to include the STEXX USOC indicating that the STE unit 223 was installed at the customer premise 212. If the customer bill increases because the STE unit is installed, the TAS 276 can be programmed to notify the technician so that the technician can then notify the customer that the monthly billing will increase.

If a previously installed STE unit becomes defective and needs to be replaced, the technician installs a new STE unit at the customer premise. The technician inputs completion information including a cause code (what caused the problem) and a disposition code such as 0398 indicating the defective STE unit was replaced to correct the trouble. In this situation, the cause code and disposition code associated with the completion information input by the technician do not trigger the creation of a Tier 3 service order and the computer order entry system is not accessed since the customer line records already reflect the installation of the STE unit. The completion information input by the outside technician into the TAS 276 via the TAU 278 is sent to WFA/DO 270. WFA/DO, in turn, transmits the information to LMOS 312a, and LMOS updates information in its customer line records to indicate information such as the last case of trouble.

The STE unit is capable of correcting problems associated with excessive loop loss, balancing, attenuation, and/or equalization which may be due to improper loading and/or bridge taps. Therefore, the use of the STE unit eliminates the need for cable repair technicians, construction and/or contractors to dig up cables to add or remove loading or remove bridge taps, as required in the prior art in certain situations.

In certain situations, the STE unit may be installed to correct problems that arise when the circuit is not properly balanced or the measured loop loss at the network interface 218 is too low (less than 4 dB) such that the network is overdriven. In this situation, the STE 223 will not need to employ the amplification network discussed above, but instead will only use the balancing network to adjust the gain to balance the line, and offset any impedance mismatch associated with the two wires 202 so that the wires are electrically alike and symmetrical with respect to ground (a common reference point).

If a cable pair 202 is defective, the outside technician 244 accesses LFACS 284 via the TAS 276. LFACS 284 assigns a new cable pair. Based upon the new cable pair assignment, the technician 244 performs a Line and Station Transfer (LST) to the new cable pair. If the loop loss changes by ±1 dB and a manually or semi-automatically resettable STE unit is installed at the customer premise, the STE unit 223 must be reset. LFACS 284 transmits (typically on a nightly basis) a common update file including completion information indicating the new cable and pair to LMOS/NSDB 312 via the Assigning SOAC 282 to update the customer line records to reflect any changes.

The repair processes of the present invention eliminate the need for the outside technician to contact the order taker person 252, and the need to trigger the entire prior art design process in this situation to test the cable pair, adjust the customized amplifier, and update the new cable pair assignment as a prior art designed service. The system for handling repair requests of the present invention eliminates the need for services performed in the prior art (as shown in FIG. 3) by a tester, CPC engineer, and central office switch technician. No customized amplifier is needed at the central office. The repair processes of the system quickly and efficiently restore service to the customer premise.

V. CONSTRUCTION PROCESSES FOR FIELD CABLE THROWS

The invention finds further application in the area of construction systems and processes used for field cable throws and transfers where the outside plant facilities that connect a particular customer premise to the central office are rearranged or changed. As in the prior art, an outside plant engineer prepares cable throw work prints indicating the the specific cable pairs that will be involved in the throw. The plant engineer retrieves an abbreviated cable record report to determine whether prior art designed services exist on the cable pairs effected by the throw by searching the assignment section of LFACS for the ADSR FID. Under the current invention, the outside plant engineer also pulls a report based upon a search of LFACS for the SSM FID located in the assignment records stored in LFACS which provides a list of all facility addresses, the associated outside facilities (cable and cable pair), and the telephone number where an STE potentially exists.

When SSM FID is present, the outside plant engineer directly accesses and reviews the existing customer line records stored in LMOS (or NSDB) 312 to determine whether an STE unit 223 was installed at the customer premise for that circuit, and, if so, whether the STE is manually resettable, semi-automatically resettable or fully automatically resettable. More specifically, the engineer looks for a USOC such as STEAM (STE unit installed for an Analog service that is Manually resettable) or STEDS (M unit installed for a Digital service that is Semi-automatically resettable) associated with these records.

If a manually or semi-automatically resettable STE is installed at the customer premise, the outside plant engineer determines whether the attenuation of each cable pair involved in the throw increases or decreases by ±1 dB. If the attenuation changes by ±1 dB, the outside plant engineer notes on the work prints that a reconnaissance visit is required to reset the STE unit after the throw. This requires a splicing technician to travel to the customer premise to manually reset the unit. If a fully automatically resettable STE unit was installed, the engineer notes on the abbreviated cable report that the STE unit is self adjusting, thereby indicating no visit to the customer premise is required. If a telecommunications company only uses fully automatically resettable STE units, then it would not be necessary to pull a special report based upon the SSM FIDs. As previously discussed, the SSM FID would still be used for repair service requests to provide better appointments for customers receiving special services. In this situation, cable throw service requests would be data processed using prior art construction processes for field cable throws of cable pairs used to provide prior art nondesigned services.

As in the prior art nondesign system, the outside plant engineer forwards the abbreviated cable report and work prints to a construction management center (CMC) and the Loop Assignment Center (LAC). The assignment specialist person 290 at the LAC inputs throw information into LFACS in a pending status, and notifies the central office if the central office is involved. The CMC then schedules the date for the cable throw.

As in the prior art nondesign system, if the cable pair(s) involved in the throw terminates at the MDF 230, then the assignment specialist person 290 sends (via facsimile, mail, etc.) a copy of the cable throw work prints to the central office, since the throw requires rewiring in the central office by the frame technician 286. Since all locally switched services are treated as nondesigned services under the present invention, the frame technician bridges the old cable pair and the new cable pair together with a jumper 232 on the MDF 230 prior to the throw. After the splicer cuts to the new pair(s) and working service is established, the jumper is removed.

Prior to the scheduled date for the throw (typically at least one week prior), the LAC generates throw sheets based upon the work prints, and sends (via facsimile, mail, etc.) the throw sheets to the CMC. The CMC sends (via facsimile, mail, etc.) a copy of the cable report, throw sheets and work prints to an outside splicer.

On the scheduled date, the splicing technician performs the cable throw. The cable splicing technician must travel to the customer premise to reset the STE unit if the work prints indicate a reconnaissance visit to the customer premise is required. If a manually or semi-automatically resettable STE unit is involved, the splicing technician is required to take further action. Since the preferred embodiment of the STE unit resets on any off hook condition, no action is required by the splicer to reset the unit. After the splicer cuts to the new pair(s) and working service is established, the jumper is removed.

The splicer mails completion information to the CMC indicating the throw is complete and the new cable and pair associated with the service. The CMC notifies the assignment specialist person 290 at the LAC of the completed throw, and the assignment specialist person updates records associated with the LFACS 284 database to change the status information associated with the throw from pending to completed.

As in the prior art nondesign system, LFACS 284 transmits (typically on a nightly basis) a common update file including completion information indicating the new cable and pair to the Assigning SOAC 282. The Assigning SOAC notifies LMOS/NSDB 312 to change the customer line records to reflect any changes.

The construction procedures used to perform a cable throw on a cable pair used to provide a special service installed using the system 200 of the present invention are much more efficient and less expensive than the prior art construction procedures used to perform a cable throw on a cable pair used to provide prior art designed services when a customized amplifier is installed at the central office. By including the SSM FID in the LFACS 284 database and the STEXX USOC in the customer line records, the outside plant engineer is able to easily and quickly determine whether an STE unit 223 is installed on the cable pair 202, and, if so, whether the unit is manually, semi-automatically or fully automatically resettable. In contrast to the prior art, there is no need to involve a construction provisioning center (CPC) engineer for design review in the system and method of the invention since it is not necessary to redesign the circuit if the attenuation changes as a result of the throw. The STE unit will automatically compensate for changes in attenuation after it is reset. The prior art TIRKS® computer system is not needed under the present invention since no prior art design processes are performed. Moreover, the inside switching technician used in prior art system 11b is not needed with the present invention since there is no need to realign a customized amplifier at the central office. Likewise, with the present invention the outside technician used in the prior art systems and methods is not dispatched to reset and/or realign the circuit. Also an SSC tester used in the prior art is not necessary with the present invention since the throw does not need to be coordinated with the inside switching technician and the outside technician, and no testing needs to be done to realign a customized amplifier at the central office. The prior art time delay experienced by the splicing technician while waiting for the tester, inside technician and outside technician to test, readjust, and realign the circuit is also eliminated with the present invention.

The foregoing description is set forth only for illustrative purposes of the preferred embodiments only, and is not meant to limit the protection sought with Letters Patent. Numerous variations, within the scope of the appended claims will be apparent to those skilled in the art in light of the foregoing description and accompanying drawings.

Having thus described the invention, what is claimed and desired to be secured by Letters Patent is:

1. A system for processing a service request for installation, maintenance or repair of a local loop maintained by a telecommunications company and providing locally switched telecommunication service to a customer premise, comprising:

(a) computer data processing means for inputting and processing customer information;

(b) computer data processing means for generating a service request based upon the customer information and upon information associated with the local loop including inside and outside plant facilities supporting the local loop;

(c) computer data processing means for assigning to the service request an available appointment time for providing the requested service based upon updated information indicating the availability of qualified outside technicians;

(d) computer data processing means for dispatching an available technician to the customer premise at or before the assigned appointment time to install or repair outside facilities associated with the local loop or to install or replace a special line powered, line conditioning termination equipment on a network side of a network interface associated with the customer premise when loop loss associated with the local loop is not maintained at an acceptable level for the locally switched service provided to the customer premise;

(e) computer data processing means for processing completion information input by the technician associated with tasks performed by the technician to establish working service to the customer premise, including information indicating whether the special line conditioning termination equipment was installed or replaced;

(f) computer data processing means for completing the service request once working service is established at the customer premise;

(g) computer memory means for storing computer information relating to locally switched services provided by the telecommunication company including information indicating whether line conditioning termination equipment is installed at the customer premise; and (h) computer data processing means for creating or updating the computer information stored in the computer memory means based upon information associated with the completed service request.

2. A system for providing a locally switched telecommunication service to a customer premise, improvements comprising:

(a) a local network for providing the locally switched telecommunication service to the customer premise including a network element central office switching system and a local loop extending from a telecommunication company local serving office to a customer premise;

(b) a weather-proof housing mounted on an outside wall of the customer premise;

(c) a network interface having a network side effectively coupled to a company side disposed inside the housing;

(d) a protection device for protecting the local network, the customer premise and customer premise equipment located in the customer premise from excessive voltages disposed inside the housing, and operatively connected between the local loop and the network interface;

(e) a special line conditioning termination device for maintaining loop loss associated with the local loop within an acceptable range at the network interface based upon a class and grade of service associated with the service requested by the customer, the weather-proof housing being adapted to accommodate the special line conditioning termination device therein, the special line conditioning termination device being line powered, and disposed inside the housing and connected between the protection device and the network side of the network interface; and (f) a computer system for processing a customer service request for installation of the locally switched service that is to be provided to the customer premise, said computer system including computer data processing means for dispatching a technician to the customer premise to install the special line conditioning equipment between the protection device and the network side of the network interface inside the housing when the loop loss exceeds an acceptable range based upon the class and grade of service associated with the service requested by the customer, and further including computer memory means for storing computer information relating to the locally switched service provided across the local loop to the customer premise including information indicating the special line conditioning termination device is installed at the customer premise.

3. The telecommunication system as set forth in claim 2 wherein the special line conditioning termination device automatically adjusts the loop loss to maintain the loop loss within the acceptable range whenever the line conditioning termination device detects an off hook condition triggered by the customer premise equipment.

4. The telecommunication system as set forth in claim 2 wherein the local loop is not loaded.

5. The telecommunication system as set forth in claim 2 further including a plurality of local loops extending to the customer premise from the local serving office and a plurality of special line conditioning termination devices disposed inside the housing and connected between the protection device and the network side of the network interface for each local loop.

6. The telecommunication system as set forth in claim 2 wherein the special line conditioning termination device has a weather-proof construction.

7. In a system for providing an analog locally switched telecommunication service to a customer premise, improvements comprising:

(a) a local network for providing the locally switched telecommunication service to the customer premise including a network element central office switching system and a local loop extending from a telecommunication company local serving office to a customer premise;

(b) a weather-proof housing mounted on an outside wall of the customer premise;

(c) a network interface having a network side effectively coupled to a company side disposed inside the housing;

(d) a protection device for protecting the local network, the customer premise and customer premise equipment located in the customer premise from excessive voltages disposed inside the housing, and operatively connected between the local loop and the network interface;

(e) at least one analog special line conditioning termination device for maintaining loop loss associated with the local loop within an acceptable range at the network interface based upon a class and grade of service associated with the analog service, the special line conditioning termination device being line powered, and disposed inside the housing and connected between the protection device and the network side of the network interface;

(f) computer data processing means for generating a service order for installation of the analog locally switched service at the customer premise based upon customer information including information indicating the class and grade of service associated with the service requested by the customer and information associated with the local loop;

(g) computer data processing means for assigning to the service order information when the class and grade of requested service is less than 8½ dB information indicating the special line conditioning termination device needs to be installed at the customer premise;

(h) computer data processing means for dispatching a technician to the customer premise to install the special line conditioning device between the protection device and the network side of the network interface inside the housing when the loop loss exceeds an acceptable range based upon the class and grade of service associated with the service requested;

(i) computer data processing means for processing completion information input by the technician after the special line conditioning termination device is installed;

(j) computer data processing means for completing the service order after installation of the requested service; and (k) computer memory means for storing computer information relating to the analog locally switched service provided across the local loop to the customer premise including information indicating the special line conditioning termination device is installed at the customer premise.

8. In a system for processing a service request for installation of locally switched telecommunication service provided by a telecommunication company at a customer premise, improvements comprising:

(a) computer data processing means for generating a service order based upon customer information including information indicative of a class and grade of service associated with the requested service;

(b) computer data processing means for assigning to the service order an available appointment time for installation of the requested service based upon updated information indicating the availability of qualified outside technicians;

(c) computer data processing means for assigning information to service orders when the class and grade of service associated with the requested service indicates that further evaluation of the service is needed to determine if special line powered, line conditioning termination equipment needs to be installed on a network side of a network interface located at the customer premise for the requested service;

(d) computer data processing means for assigning to the service order information indicating inside and outside plant facilities needed to establish a working circuit from a telecommunication company local serving central office to the customer premise based upon information associated with the service order;

(e) computer data processing means for dispatching a qualified technician to the customer premise at or before the assigned appointment time to establish the working circuit by installing or replacing outside plant facilities or to install the special line conditioning termination equipment;

(f) computer data processing means for processing completion information input by the outside technician associated with tasks performed by the technician to establish working service to the customer premise, including information indicating whether the special line conditioning termination equipment is installed at the customer premise;

(g) computer data processing means for completing the service order after installation of the requested service to the customer premise;

(h) computer memory means for storing computer information relating to locally switched services provided by the telecommunication company to the customer premise including information indicative of whether line conditioning termination equipment was installed at the customer premise; and (i) computer data processing means for creating or updating the computer information stored in the computer memory means based upon information associated with the completed service order.

9. In the system of claim 8 further including computer memory means for storing computer information representative of outside plant facilities potentially having the special line conditioning termination equipment associated therewith, and computer data processing means for assigning to the service order information indicating those outside plant facilities involved in establishing the working circuit that potentially have the special line conditioning termination equipment associated therewith.

10. In the system of claim 9 wherein the information assigned to the service order when class and grade of service associated with the requested service indicates further evaluation is needed, includes information representative of reset functions associated with the line conditioning equipment that may be installed at the customer premise.

11. In the system of claim 10 further including computer data processing means for correcting the reset information if the reset function of the special line conditioning equipment differs from the reset information assigned to the service order.

12. In the system of claim 8 wherein the information assigned to the service order indicating further evaluation of the need to install line conditioning equipment includes information indicating whether analog or digital line conditioning equipment is needed for installation at the customer premise.

13. In the system of claim 12 further including computer data processing means for correcting information assigned to the service order indicating whether analog or digital line conditioning equipment is installed when the assigned information does not accurately reflect the equipment installed at the customer premise.

14. In the system of claim 12 wherein the information assigned to the service order indicating further evaluation of the need to install line conditioning equipment includes information indicating whether the equipment is manually resettable, semi-automatically resettable or fully automatically resettable.

15. In the system of claim 14 further including computer data processing means for correcting information assigned to the service order indicating whether the equipment is manually resettable, semi-automatically resettable or fully automatically resettable when the assigned information does not accurately reflect the equipment installed at the customer premise.

16. In the system of claim 8 wherein fully automatically resettable line conditioning equipment is installed at the customer premise that automatically adjusts loop loss associated with a local loop providing the locally switched service to the customer premise when any off hook condition is detected by the equipment in order to maintain the loop loss within a desired range.

17. In the system of claim 8 further including:

computer data processing means for assigning a preliminary time estimate to the service order when dispatch of an outside technician is required before information indicating inside and outside plant facilities is assigned to the service order;

computer data processing means for assigning a final time estimate to the service request after information indicating inside and outside plant facilities is assigned to the service order;

computer memory means for storing updated computer information relating to total time assigned to all pending service orders requiring dispatch of an outside technician indicating estimated time needed for a outside technician to perform necessary tasks associated with each pending service order;

computer data processing means for including the preliminary time estimate in the total time information stored in the computer memory means when the final time estimate is not assigned to the service order within a predefined time interval;

computer data processing means for including the final time estimate in the total time information stored in the computer memory means;

computer data processing means comparing the preliminary time estimate to the final time estimate when the preliminary time estimate is included in the computer memory means; and computer data processing means for removing the preliminary time estimate from the total time information when the final time estimate differs from the preliminary time estimate.

18. In the system set forth in claim 17, further including computer data processing means for indicating whether an appointment date and time is available for appointments based upon the information relating to total time assigned to pending service orders stored in the computer memory means.

19. In the system of claim 18 wherein an appointment date and time is designated as available for appointments when the total time information stored in the computer memory means is maintained below a predetermined maximum time limit.

20. In the system of claim 19 wherein an appointment date and time is designated as closed for appointments when the total time information stored in the computer memory means is maintained at or above the predetermined maximum time limit.

21. In a system for processing a service request for installation of locally switched telecommunication service provided by a telecommunication company at a customer premise, improvements comprising:

(a) computer data processing means for inputting and processing customer information including a customer name, a customer premise address, telephone number and information indicative of a class and grade of service associated with the requested service;

(b) computer data processing means for generating a service order based upon the customer information;

(c) computer memory means for storing computer information identifying available appointment times and dates for installation of the requested service;

(d) computer data processing means for continuously monitoring information indicating availability of telecommunication company technicians to install the requested service, and updating the information indicating available appointment times and dates;

(e) computer data processing means for assigning to the service order an available appointment date and time for installation of the requested service based upon the appointment information stored in the computer memory means;

(f) computer data processing means for assigning information to certain service orders when the class and grade of service associated with the requested service indicates that further evaluation of whether special line powered, line conditioning termination equipment needs to be installed on a network side of a network interface located at the customer premise for the requested service;

(g) computer memory means for storing computer information relating to inside and outside telecommunication plant facilities maintained by the telecommunication company, and computer data processing means for selecting and assigning to the service order information indicating inside and outside plant facilities for providing the requested service to the customer premise based upon information associated with the service order and stored in the computer memory means;

(h) computer memory means for storing computer information identifying outside plant facilities potentially having the special line conditioning termination equipment associated therewith;

(i) computer data processing means for determining whether an outside telecommunication company technician needs to be dispatched to the customer premise to establish a working circuit between the customer premise and a telecommunication company local serving central office or to install the special line conditioning termination equipment, and dispatching a qualified and available outside technician, when needed to establish the working circuit, to the customer premise at or before the assigned appointment date and time;

(j) computer data processing means for processing completion information input by the outside technician associated with tasks performed by the technician to establish working service to the customer premise, including information indicating whether the special line conditioning termination equipment was installed;

(k) computer data processing means for completing the service order after installation of the requested service to the customer premise;

(l) computer memory means for storing computer information relating to locally switched services provided by the telecommunication company to each telecommunication company customer including customer records indicative of a class and grade of each service provided to a particular customer premise, when each service was installed, inside and outside telecommunication plant facilities used to provide each service, customer name, customer premise address, each associated telephone number, whether line conditioning termination equipment is installed at the customer premise; and (m) computer data processing means for creating or updating the customer records stored in the computer memory means and associated with the customer premise at which the requested service was installed based upon the completed service order.

22. In a system for processing a trouble report relating to repair of a local loop extending from a telecommunication company central office to a customer premise and providing any locally switched telecommunication service, improvements comprising:

(a) computer data processing means for inputting and processing customer information including information indicative of the nature of the trouble;

(b) computer memory means for storing computer customer line record information relating to the local loop including information associated with inside and outside plant facilities supporting the local loop and information indicative of whether special line powered, line conditioning equipment is installed on a network side of a network interface at the customer premise to maintain loop loss associated with the local loop at an acceptable level;

(c) computer data processing and testing means for testing the local loop for problems including shorts, grounds, opens and impedance mismatch;

(d) computer data processing means for generating the trouble report based upon the customer information, test results and customer line record information;

(e) computer data processing means for assigning to the service request an available appointment date and time for providing the requested service based upon updated information indicating the availability of technicians qualified to perform tasks that may be necessary to correct the trouble;

(f) computer data processing means for dispatching a qualified and available technician at or before the assigned appointment time if needed to repair defective outside facilities associated with the local loop or to install or replace a special line conditioning termination equipment at the customer premise when loop loss associated with the local loop is not maintained at an acceptable level for the locally switched service at the customer premise;

(g) computer data processing means for processing completion information input by the technician associated with tasks performed by the technician to correct the trouble, including information indicating whether the special line conditioning termination equipment was installed or replaced;

(h) computer data processing means for completing the trouble report once working service is established at the customer premise; and (i) computer data processing means for creating or updating customer line record information based upon information associated with the completed trouble report.

23. In the system of claim 22 further including:

computer data processing means for assigning a current time estimate to the trouble report when dispatch of an outside technician is required;

computer memory means for storing updated computer information representative of appointment dates and times including information indicating total time assigned to all pending trouble reports requiring dispatch of an outside technician indicating estimated time needed for a outside technician to perform necessary tasks associated with each pending trouble report;

computer data processing means for including the current time estimate in the total time information stored in the computer memory means;

computer data processing means comparing information associated with the trouble report to information stored in the computer memory means to determine whether information relating to the trouble report was previously stored in the computer memory means; and computer data processing means for removing previously stored information from the date and time information stored in the computer memory means when the current time estimate differs from the previously stored information.

24. In the system set forth in claim 23, further including computer data processing means for indicating whether an appointment date and time is available for appointments based upon the information relating to total time assigned to pending trouble reports stored in the computer memory means.

25. In the system of claim 24 wherein an appointment date and time is designated as available for appointments when the total time information stored in the computer memory means is maintained below a predetermined maximum time limit.

26. In the system of claim 25 wherein an appointment date and time is designated as closed for appointments when the total time information stored in the computer memory means is maintained at or above the predetermined maximum time limit.

27. In a system for processing a service order requesting disconnection of an existing locally switched service provided by a telecommunication company central office to a customer premise, improvements comprising:

(a) computer data processing means for generating a service order based upon customer information including a customer name, a customer premise address, telephone number and information indicative of a class and grade of service associated with the requested service;

(b) computer data processing means for assigning information to service orders indicating whether special line powered, line conditioning termination equipment was installed previously on a network side of a network interface located at the customer premise to provide a stabilized loop loss within a desired range for the installed service;

(c) computer data processing means for assigning to the service order an available appointment date and time for disconnecting of the service based upon updated information indicating the availability of outside technicians;

(d) computer data processing means for assigning to the service order information indicating inside and outside plant facilities used to provide a working circuit from a telecommunication company local serving central office to the customer premise based upon information associated with the service order;

(e) computer data processing means for dispatching a qualified and available outside technician to the customer premise at or before the assigned appointment time disconnect and retrieve the special line conditioning termination equipment if the information assigned to the service order indicates the line conditioning termination equipment was previously installed;

(f) computer data processing means for processing completion information input by the outside technician, if dispatched, associated with tasks performed by the technician to disconnect the service provided to the customer premise, including information indicating whether the special line conditioning termination equipment was retrieved;

(g) computer data processing means for assigning to the service order, when the technician does not remove the line conditioning equipment at the time service is disconnected, information indicating the line conditioning equipment remains installed at the customer premise after disconnection of the service;

(h) computer data processing means for completing the service order after disconnection of the service to the customer premise; and (i) computer memory means for storing computer information indicating the customer premises at which line conditioning equipment remains installed after disconnection of service to the customer premise.

28. In the system of claim 27 further including:

(a) computer data processing means for generating a report based upon information, including the information stored in the computer memory means indicating the customer premise where line conditioning equipment remains installed and service is disconnected so that the equipment left in at the customer premise can be retrieved by an outside technician; and (b) computer data processing means for removing from the computer memory means, after the line conditioning equipment indicated in the report is retrieved from the customer premises, the information identifying the customer premises where line conditioning equipment remains installed after disconnection of service.

29. In a method of operating a general purpose digital computer network having data storage memory for processing a customer request for service relating to locally switched telecommunication service provided across a local loop extending from a telecommunication company central office to a customer premise, comprising the steps of:

(a) computer data processing customer information into computer memory including information indicative of the customer request for service and activity to be performed in processing the customer request;

(b) computer data processing generation of a service request based upon the customer information and information associated with the local loop including information indicating when special line powered, line conditioning termination equipment used to provide a loop loss within a desired range potentially is or needs to be installed at the customer service;

(c) computer data processing assignment and storage into computer memory to the service request an available appointment date and time for providing the requested service;

(d) computer data processing determination of whether a technician needs to be dispatched to the customer premise on or before the appointment time based upon information associated with the service request;

(e) computer data processing dispatch of an available technician to the customer premise to install, replace or remove outside facilities associated with the local loop or special line conditioning termination equipment;

(f) computer data processing of completion information input by the technician associated with tasks performed by the technician and including information indicating whether special line conditioning termination equipment was installed, replaced or removed, and storage of that information in computer memory;

(g) computer data processing completion of the service request;

(h) data storing in computer memory of information relating to locally switched services provided by the telecommunication company to the customer premise including information indicating whether line conditioning equipment is installed at the customer premise; and (i) computer data processing update and storage into computer memory information associated with the completed service request.

30. In a method of operating a general purpose digital computer having data storage memory for processing a service request relating to the installation of a locally switched telecommunications service provided to a customer premise at a desired class and grade of service, comprising the steps of:

(a) computer data processing generating a service order based on input to data processing of the requested service to be provided to the customer premise;

(b) computer data processing scheduling of a due date in computer memory for installation of the requested service based upon availability of a qualified outside technician to install the requested service at the customer premise;

(c) computer data processing assigning an identifier to the service order in computer memory when special line powered, line conditioning equipment potentially needs to be installed on a network side of a network interface located at the customer premise to provide the desired class and grade of service;

(d) computer data processing assigning into computer memory a code to the service order indicating special line conditioning equipment is required at the customer premise;

(e) computer data processing assigning into computer memory all necessary inside and outside plant facilities and equipment to the service order to establish a circuit between the customer premise and a telecommunications central office across which the requested service is provided;

(f) data storage in computer memory of information indicating installation of those inside and outside facilities and equipment that are assigned and not previously installed;

(g) computer data processing dispatch of a qualified technician to install special line conditioning termination equipment at the customer premise based upon the identifier and code;

(h) data storing in computer memory information indicating installation of the line conditioning termination equipment when loop loss associated with the circuit does not satisfy the requested class and grade of service;

(i) computer data processing deleting the code from the service order in computer memory when the code is assigned to the service order and the line conditioning equipment is not installed at the customer premise; and (j) computer data processing updating computer memory to accurately reflect whether line conditioning equipment is installed at the customer premise.

31. The method as set forth in claim 30, further including the steps of:

data storing of an entry in the service order in computer memory when the line conditioning equipment is not removed upon disconnection of the locally switched telecommunications service to the customer premise;

computer data processing generating of a report based on the entries indicating those customer premises at which the line conditioning equipment is installed and service is disconnected; and data storing into computer memory information indicating retrieval of the line conditioning equipment from the customer premises where the service is disconnected.

32. A system for providing a locally switched telecommunication service to a customer premise, comprising:

(a) a local network for providing the locally switched telecommunication service to the customer premise including a network element central office switching system and a local loop extending from a telecommunication company local serving office to a customer premise;

(b) a network interface having a network side effectively coupled to a company side;

(c) a protection device for protecting the local network, the customer premise and customer premise equipment located in the customer premise from excessive voltages, and operatively connected between the local loop and the network interface;

(d) a special line powered, line conditioning termination device for maintaining loop loss associated with the local loop within an acceptable range at the network interface based upon a class and grade of service associated with the service requested by the customer, the special line conditioning termination device being disposed and connected between the protection device and the network side of the network interface; and (e) a computer system for processing a customer service request for installation of the locally switched service that is to be provided to the customer premise, said computer system including computer data processing means for dispatching a technician to the customer premise to install the special line conditioning equipment between the protection device and the network side of the network interface when the loop loss exceeds an acceptable range based upon the class and grade of service associated with the service requested by the customer, and further including computer memory means for storing computer information relating to the locally switched service provided across the local loop to the customer premise including information indicating the special line conditioning termination device is installed at the customer premise.

33. A method for providing a locally switched telecommunication service to a customer premise across a local network including a local loop, comprising the steps of:

(a) mounting a weather-proof housing mounted on an outside wall of the customer premise;

(b) providing a network interface inside the housing having a network side effectively coupled to a company side;

(c) providing a protection device inside the housing between the local loop and the network interface for protecting the local network, the customer premise and customer premise equipment located in the customer premise from excessive voltages disposed inside the housing;

(d) installing at least one analog special line powered, line conditioning termination device inside the housing between the protection device and the network side of the network interface for maintaining loop loss associated with the local loop within an acceptable range based upon a class and grade of service associated with the analog service;

(e) computer data processing generation of a service order based upon input to data processing of the requested service to be provided to the customer premise and information associated with the local loop;

(f) computer data processing scheduling of a due date in computer memory for installation of the requested service based upon availability of a qualified outside technician to install the requested service at the customer premise;

(g) computer data processing assigning an identifier to the service order in computer memory when line conditioning equipment potentially needs to be installed at the customer premise to provide the desired class and grade of service;

(h) computer data processing assigning into computer memory a code to the service order indicating special line conditioning equipment is required at the customer premise;

(i) computer data processing assigning into computer memory all necessary inside and outside plant facilities and equipment to the service order to establish a circuit between the customer premise and a telecommunications central office across which the requested service is provided;

(j) data storage in computer memory of information indicating installation of those inside and outside facilities and equipment that are assigned and not previously installed;

(k) computer data processing dispatch of a qualified technician to install special line conditioning termination equipment at the customer premise based upon the identifier and code;

(l) data storing in computer memory information indicating installation of the line conditioning termination equipment when loop loss associated with the circuit does not satisfy the requested class and grade of service;

(m) computer data processing deleting the code from the service order in computer memory when the code is assigned to the service order and the line conditioning equipment is not installed at the customer premise; and (n) computer data processing updating computer memory to accurately reflect whether line conditioning equipment is installed at the customer premise.

* * * * *

UNITED STATES PATENT AND TRADEMARK OFFICE
CERTIFICATE OF CORRECTION

PATENT NO : 5,920,846
DATED : July 6, 1999
INVENTOR(S) : Joan A. Storch, Danny L. Storch It is certified that error appears in the above-identified patent and that said Letters Patent is hereby corrected as shown below:

Col. 38, line 52
 replace "process"
 with --processes--.

Col. 44, line 53
 replace "thorn"
 with --thrown--.

Col. 84, line 43
 replace "(M"
 with --(STE--.

Signed and Sealed this

Twenty-second Day of August, 2000

Q. TODD DICKINSON

Attest:

Attesting Officer

Director of Patents and Trademarks